US010198776B2

(12) United States Patent
Roiniotis et al.

(10) Patent No.: US 10,198,776 B2
(45) Date of Patent: Feb. 5, 2019

(54) SYSTEM AND METHOD FOR DELIVERING AN OPEN PROFILE PERSONALIZATION SYSTEM THROUGH SOCIAL MEDIA BASED ON PROFILE DATA STRUCTURES THAT CONTAIN INTEREST NODES OR CHANNELS

(71) Applicant: THE WASHINGTON POST, Washington, DC (US)

(72) Inventors: Spiro Roiniotis, Washington, DC (US); Vijay Ravindran, Washington, DC (US); Brian Neumann, Washington, DC (US); Thomas Burke, Washington, DC (US); Charles Covey-Brandt, Washington, DC (US); Brandon Thomas, Washington, DC (US)

(73) Assignee: Graham Holdings Company, Arlington, VA (US)

( * ) Notice: Subject to any disclaimer, the term of this patent is extended or adjusted under 35 U.S.C. 154(b) by 282 days.

(21) Appl. No.: 13/624,604

(22) Filed: Sep. 21, 2012

(65) Prior Publication Data

US 2014/0089777 A1 Mar. 27, 2014

(51) Int. Cl.
*H04N 19/00* (2014.01)
*H04N 21/00* (2011.01)
(Continued)

(52) U.S. Cl.
CPC ............ *G06Q 50/01* (2013.01); *G06F 3/048* (2013.01); *G06F 8/38* (2013.01); *G06F 9/4451* (2013.01);
(Continued)

(58) Field of Classification Search
CPC ..... G06F 17/2247; G06F 17/24; G06F 17/211
(Continued)

(56) References Cited

U.S. PATENT DOCUMENTS 5,418,951 A  5/1995 Damashek
5,740,549 A  4/1998 Reilly et al.
(Continued)

OTHER PUBLICATIONS

U.S. Appl. No. 13/624,604, filed Sep. 21, 2012, System and Method for Obtaining and Sharing Information Channels and Content Through Social Media.
(Continued)

*Primary Examiner* — Cesar B Paula
*Assistant Examiner* — Luu-Phuong T Nguyen
(74) *Attorney, Agent, or Firm* — Nixon & Vanderhye, P.C.

(57) ABSTRACT

A data processing system and method delivers an open profile personalization system based on profile data structures that contain one or more interest nodes or channels. The channels can be created or subscribed to by the user, provided by social media friends of the user, and/or suggested by editors of the system. The interest nodes include respective sets of targets and qualifiers, where the targets and qualifiers comprise types of attributes to be used in the filtering of information files for delivery as a result set for the interest nodes. Targets and qualifiers are applied to the types of attributes and available information files to produce a filtered set. Web pages showing personalized results include tools based on content analysis to assist the user in creation and editing of the open profile.

34 Claims, 48 Drawing Sheets

(51) Int. Cl.

| | |
|---|---|
| *H04N 21/472* | (2011.01) |
| *H04N 21/4725* | (2011.01) |
| *H04N 21/4728* | (2011.01) |
| *H04N 21/858* | (2011.01) |
| *G06Q 50/00* | (2012.01) |
| *G06F 17/30* | (2006.01) |
| *G06F 3/048* | (2013.01) |
| *G06F 8/38* | (2018.01) |
| *G06F 9/445* | (2018.01) |
| *G06F 3/0484* | (2013.01) |
| *G06F 3/0482* | (2013.01) |

(52) U.S. Cl.
CPC ...... *G06F 17/30274* (2013.01); *G06F 3/0482* (2013.01); *G06F 3/0484* (2013.01); *G06F 17/3056* (2013.01); *G06F 17/3087* (2013.01); *G06F 17/3089* (2013.01); *G06F 17/30554* (2013.01); *G06F 17/30761* (2013.01); *G06F 17/30766* (2013.01); *G06F 17/30769* (2013.01); *G06F 17/30861* (2013.01); *G06F 17/30864* (2013.01); *G06F 17/30867* (2013.01); *G06F 17/30876* (2013.01)

(58) Field of Classification Search
USPC ........................................................ 715/234
See application file for complete search history.

(56) References Cited

U.S. PATENT DOCUMENTS

| | | | |
|---|---|---|---|
| 5,768,528 A | 6/1998 | Stumm | |
| 6,029,195 A | 2/2000 | Herz | |
| 6,085,229 A | 7/2000 | Newman et al. | |
| 6,460,036 B1 | 10/2002 | Herz | |
| 6,651,253 B2 | 11/2003 | Dudkiewicz et al. | |
| 6,687,696 B2 | 2/2004 | Hofmann et al. | |
| 6,766,362 B1 | 7/2004 | Miyasaka et al. | |
| 6,839,742 B1 | 1/2005 | Dyer et al. | |
| 6,904,463 B1 | 6/2005 | Fadel | |
| 6,981,040 B1 | 12/2005 | Konig et al. | |
| 6,990,633 B1 | 1/2006 | Mlyasaka et al. | |
| 7,031,961 B2 | 4/2006 | Pitkow et al. | |
| 7,089,229 B2 | 8/2006 | Goldman et al. | |
| 7,136,845 B2 | 11/2006 | Chandrasekar et al. | |
| 7,149,704 B2 | 12/2006 | Martin et al. | |
| 7,162,451 B2 | 1/2007 | Berger et al. | |
| 7,181,488 B2 | 2/2007 | Martin et al. | |
| 7,200,801 B2 | 4/2007 | Agassi et al. | |
| 7,346,656 B2 | 3/2008 | Worthen | |
| 7,370,276 B2 | 5/2008 | Willis | |
| 7,386,542 B2 | 6/2008 | Maybury et al. | |
| 7,451,135 B2 | 11/2008 | Goldman et al. | |
| 7,568,148 B1 | 7/2009 | Bharat et al. | |
| 7,730,216 B1* | 6/2010 | Issa ...................... | H04L 67/104 709/214 |
| 7,792,903 B2* | 9/2010 | Fischer ................. | G06Q 10/10 709/205 |
| 7,810,023 B2 | 10/2010 | Brexel et al. | |
| 7,825,940 B1 | 11/2010 | Vieilly et al. | |
| 8,028,237 B2 | 9/2011 | Schmitt | |
| 8,306,922 B1* | 11/2012 | Kunal .................... | G06Q 50/01 705/319 |
| 8,583,683 B2* | 11/2013 | Rathod ............. | G06F 17/30867 707/770 |
| 2002/0016786 A1 | 2/2002 | Pitkow et al. | |
| 2002/0055956 A1 | 5/2002 | Krasnolarov et al. | |
| 2002/0194166 A1 | 12/2002 | Fowler | |
| 2003/0101412 A1 | 5/2003 | Eid | |
| 2003/0217121 A1 | 11/2003 | Willis | |
| 2003/0225745 A1 | 12/2003 | Goldman et al. | |
| 2004/0093327 A1 | 5/2004 | Anderson et al. | |
| 2004/0220926 A1 | 11/2004 | Lamkin et al. | |
| 2005/0102202 A1 | 5/2005 | Linden et al. | |
| 2005/0102282 A1 | 5/2005 | Linden | |
| 2005/0114324 A1 | 5/2005 | Mayer | |
| 2005/0114794 A1 | 5/2005 | Grimes et al. | |
| 2005/0138049 A1 | 6/2005 | Linden | |
| 2005/0177805 A1 | 8/2005 | Lynch | |
| 2005/0193335 A1 | 9/2005 | Dorai et al. | |
| 2005/0204276 A1 | 9/2005 | Hosea et al. | |
| 2005/0222987 A1 | 10/2005 | Vadon | |
| 2005/0240550 A1 | 10/2005 | Armes et al. | |
| 2006/0047701 A1 | 2/2006 | Maybury et al. | |
| 2006/0106792 A1 | 5/2006 | Patterson | |
| 2006/0112085 A1 | 5/2006 | Zijlstra et al. | |
| 2006/0122991 A1 | 6/2006 | Chandrasekar et al. | |
| 2006/0279799 A1 | 12/2006 | Goldman | |
| 2007/0150457 A1 | 6/2007 | Goldman et al. | |
| 2007/0150468 A1 | 6/2007 | Goldman et al. | |
| 2007/0150483 A1 | 6/2007 | Goldman et al. | |
| 2007/0150721 A1 | 6/2007 | Goldman et al. | |
| 2007/0162396 A1 | 7/2007 | Goldman et al. | |
| 2007/0220411 A1 | 9/2007 | Hauser | |
| 2007/0233736 A1* | 10/2007 | Xiong .................... | G06Q 30/02 |
| 2007/0300161 A1 | 12/2007 | Bhatia et al. | |
| 2008/0016462 A1 | 1/2008 | Wyler et al. | |
| 2008/0052742 A1* | 2/2008 | Kopf .................. | H04N 5/44591 725/34 |
| 2008/0235197 A1 | 9/2008 | Allen et al. | |
| 2009/0006974 A1 | 1/2009 | Harinarayan et al. | |
| 2009/0254838 A1* | 10/2009 | Rao et al. ...................... | 715/749 |
| 2010/0299388 A1 | 11/2010 | Bolnick et al. | |
| 2010/0299616 A1* | 11/2010 | Chen ...................... | G06Q 10/10 715/753 |
| 2010/0332583 A1* | 12/2010 | Szabo ............... | G06F 17/30522 709/202 |
| 2011/0030031 A1* | 2/2011 | Lussier et al. ..................... | 726/1 |
| 2011/0078583 A1* | 3/2011 | Chunilal ........... | G06F 17/30867 715/747 |
| 2011/0225293 A1* | 9/2011 | Rathod ............. | G06F 17/30867 709/224 |
| 2011/0265011 A1* | 10/2011 | Taylor .................... | G06Q 50/01 715/751 |
| 2012/0005224 A1* | 1/2012 | Ahrens .................... | H04W 4/21 707/769 |
| 2012/0150598 A1* | 6/2012 | Griggs .................... | G06Q 30/06 705/14.16 |
| 2012/0239763 A1* | 9/2012 | Musil ............................ | 709/206 |
| 2012/0246228 A1* | 9/2012 | Udezue ............... | H04L 12/1859 709/204 |
| 2012/0331063 A1* | 12/2012 | Rajaram ............ | G06Q 50/01 709/206 |
| 2013/0124538 A1* | 5/2013 | Lee ..................... | G06F 17/3053 707/749 |
| 2013/0166391 A1* | 6/2013 | Blow et al. ................ | 705/14.66 |
| 2013/0268973 A1* | 10/2013 | Archibong ............. | G06Q 50/01 725/51 |

OTHER PUBLICATIONS

"Publish/Subscribe: Untapped paid-search opportunity," As I May Think, Toronto Publish/Subscribe System Project, Feb. 20, 2004, 3 pages.
Ahn, Jae-Wook, et al., "Open User Profiles for Adaptive News Systems: Help or Harm?" International World Wide Web Conference Committee, WWW2007, May 8-12, 2007, 10 pages.
Ahn, Jae-Wook, el al., "Personalized Web Exploration with Task Models" International World Wide Web Conference Committee, WWW 2008, Apr. 21-25, 2008, 10 pages.
Amidi, Saeed, "Chase Norlin, Founder, Plxsy.com at Under the Radar, Jun. 7, 2006," Silicon Valley Blog, 3 pages.
Billsus, Daniel, et al., "A Learning Agent for Wireless News Access," IUI 2000, New Orleans, LA, 4 pages.
Das, Abhinandan, el al., "Google News Personalization: Scalable Online Collaborative Filtering," World Wide Web Conference Committee, WWW 2007, May 8-12, 2007, 10 pages.
Dou, Zhicheng, el al., "A Large-scale Evaluation and Analysis of Personalized Search Strategies," World Wide Web Conference Committee, WWW 2007, May 8-12, 2007, 10 pages.

(56) References Cited

OTHER PUBLICATIONS

Eirinaki, Magdalini, et al., "Web Personalization Integrating Content Semantics and Navigational Patterns," WIDM 2004, Nov. 12-13, 2004, 8 pages.
Ferman, A, Mufit, et al., "Content-Based Filtering and Personalization Using Structured Metadata," JCDL'02, Jul. 13-17, 2002, 1 page.
Franklin, Curt, "How Internet Search Engines Work," Sep. 27, 2000, 3 pages.
Gabrilovich, Evgeniy, et al., "Newsjunkie: Providing Personalized Newsfeeds via Analysis of Information Novelty," WWW2004, May 17-24, 2004, 9 pages.
Google Guide, www.googleguide.com, Jun. 2004, 7 pages.
Gruhl, Daniel, et al., "The Web Beyond Popularity, A Really Simple System for Web Scale RSS," World Wide Web Conference Committee, WWW 2006, May 23-26, 2006, 10 pages.
Haav, H-M, el al., "A Survey of Concept-based Information Retrieval Tools on the Web, A. Caplinkas and J, Eder (Eds), Advances in Databases and Information Systems, Proce, of 5th East-European Conference ADBIS*2001, vol. 2, Vilnus Technlka" 2001, pp. 29-41.
Jensen, Mallory, "A brief history of weblogs," Columbia Journalism Review, Sep.-Oct. 2003, entrepreneur.com, 3 pages.
Klapaftis, Ioannis P., et al., "Google & WordNet based Word Sense Disambiguation," Proc. of the 22nd ICML Workshop on Learning & Extending Ontologies, Bonn, Germany, 2005, 5 pages.
Linden, Greg, "People Who Read This Article Also Read . . . " IEEE Spectrum, Mar. 3, 2008, 6 pages.
Luckhardt, Heinz-Dirk, "Approaches to sense disambiguation with respect to automatic indexing and machine translation," Virtuelles Handbuch Informationswissenschaft, http://Is.uni-sb.de/studium/handbuch/Infoling/ambl/general, date unknown, 43 pages.
MacManus, Richard, "Contextual Adverts in Bloglines in 2005," ReadWriteWeb, Dec. 21, 2004, 1 page.
Manber, Udi, et al., "Experience with Personalization on Yahoo," Communications of the ACM, Aug. 2000, vol. 43, No. 8, 5 pages.
McCord, Michael C., "Word Sense Disambiguation in a Slot Grammar Framework," RC23397 2004, 2 pages.
Middleton, Stuart E., et al., "Capturing Interest Through Inference and Visualization: Ontological User Profiling in Recommender Systems." K-CAP '03, Oct. 23-25, 2003, 8 pages.
Mobasher, Bamshad, et al., "Automatic Personalization Based on Web Usage Mining," Communications of the ACM, Aug. 2000, vol. 43, No. 8, 10 pages.
Murray, Robert, "The Symbiotic Relationship Between SEO and PPC," Search Insider, Aug. 10, 2005, 2 pages.
Oard, Douglas W., "SIGIR-97 Tutorial, Cross-Language Information Retrieval," College of Library and Information Services, University of Maryland, College Park, Jul. 27, 1997, 74 pages.
Paik, Woojin, et al., "Applying Natural Language Processing (NLP) Based Metadata Extraction to Automatically Acquire User Preferences," K-CAP'01, Oct. 22-23, 2001, 7 pages.
Pratt, Wanda M., "Dynamic Categorization: A Method for Decreasing Information Overload," A dissertation submitted to Stanford University, Mar. 1999, 194 pages.
Pretschner, Alexander, "Ontology Based Personlized Search," Dissertation submitted to University of Kansas, 1998, 125 pages.
Pretschner, Alexander, et al., "Ontology Based Personalized Search," Proc. 11th IEEE Intl. Conf. on Tools with Artificial Intelligence. pp. 391-398, Chicago, Nov. 1999.
Shet, Amit, et al., "Semantic Content Management for Enterprises and the Web," IEEE, 2003 or earlier, 20 pages.
Takeuchi, K., et al., "Building Disambiguation System for Compound Noun Analysis Based on Lexical Conceptual Structure", In Proceedings of the second International Workshop on Generative Approaches to the Lexicon, pp. 146-153, University of Geneva, Geneva Switzerland, (May 15-17, 2003).
Teevan, Jaime, et al., "Personalizing Search via Automated Analysis of Interests and Activities," SIGIR '05, Aug. 15-19, 2005, 8 pages.
Xu, Yabo, el al., "Privacy-Enhancing Personalized Web Search," International World Wide Web Conference Committee, WWW 2007, May 8-12, 2007, 10 pages.
GB Examination Report dated Jan. 31, 2012, issued in previously filed and related GB Application No. 1018114.7.
International Search Report dated Sep. 1, 2009, issued in PCT/US2009/039358, dated Sep. 1, 2009, 15 pages.
Waern, "User Involvement in Automatic Filtering: An Experimental Study", User Modeling and User-Adapted Interaction, Kluwer Academic Publishers, Do. vol. 14, No. 2-3, Jun. 1, 2004, pp. 201-237, XP019269990, ISSN: 1573-1391.
Copending U.S. Appl. No. 12/417,489, filed Apr. 2, 2009 to Rao et al.
Copending U.S. Appl. No. 13/317,031, filed Oct. 7, 2011 to Rao et al.
Office Action dated Jan. 9, 2014, issued in copending U.S. Appl. No. 12/417,489, filed Apr. 2, 2009 to Rao et al.
Final Office dated May 4, 2012, issued in copending U.S. Appl. No. 12/417,489, filed Apr. 2, 2009 to Rao et al.
Office Action dated Oct. 18, 2011, issued in copending U.S. Appl. No. 12/417,489, filed Apr. 2, 2009 to Rao et al.
Office Action dated May 22, 2014, issued in copending U.S. Appl. No. 13/317,031 to Rao et al.

* cited by examiner

FIG. 20 iCurrent WHAT'S NEW FOR YOU ramana
Invite Friends!  Settings  Help  Sign Out

Share Your 'Behavioral Targeting' Channel

These users are currently following 'Behavioral Targeting'. Invite More Users

| User | Allow Edits |
|---|---|
| ramana | ☒ |
| michael | ☑ |
| bneumann | ☑ |

[Update]

<< Return to 'Behavioral Targeting'

---

| iCurrent, Inc. | How to Use iCurrent | How to Use iCurrent | Back to Top » |
|---|---|---|---|
| About » | 49 Second Video Tutorials » | Get Help from a Person » | |
| Blog » | Frequently Asked Questions » | Give Feedback » | |
| Press » | Take a Quick Tour » | Like Us on facebook » | |
| Jobs » | | Follow Us on Twitter » | |

© 2010 iCurrent   Terms of Service   Privacy

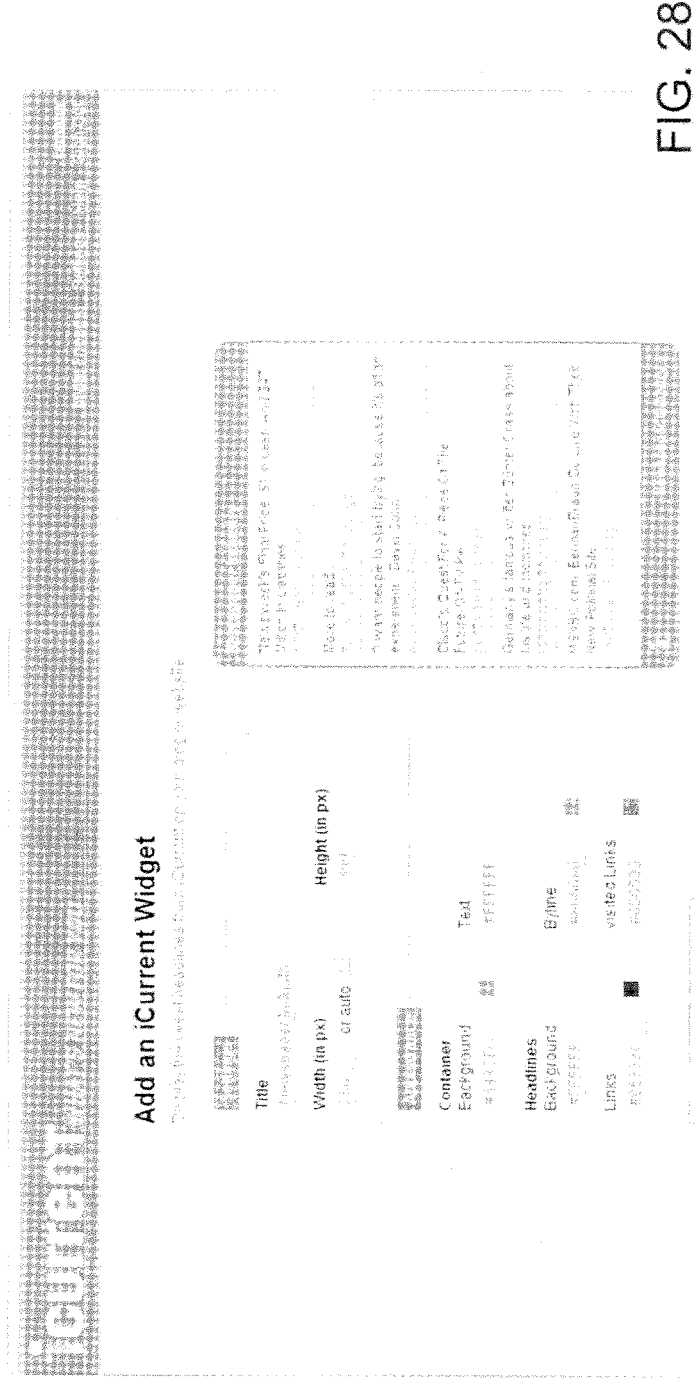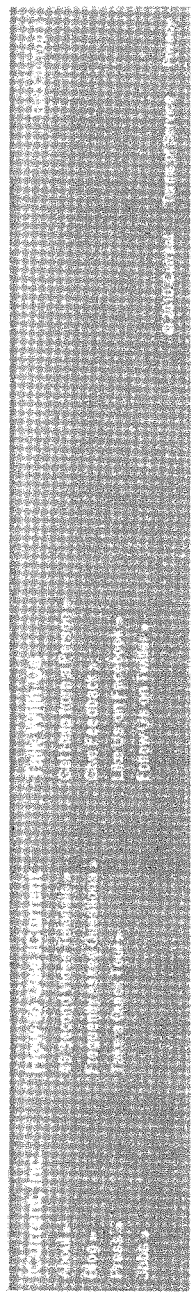
FIG. 28

FIG. 29

FIG. 30 icurrent
WHAT'S NEW FOR YOU f Connect with Facebook | SIGN UP | Learn More  Sign in

NEWS  BUSINESS  SPORTS  SCIENCE  TECH  FAMILY & SOCIETY  HEALTH  EDUCATION  ARTS & ENTERTAINMENT  LIFE & STYLE  RECREATION

| ROCK MUSIC REVIEWS » | GAMING INDUSTRY » | FASHION WEEK » | FILM REVIEWS » |
|---|---|---|---|
| The Pretty Reckless rolls into The Quarter<br>Baltimore Sun 43 mins ago<br>'Gossip Girl' star Taylor Momsen fronts rock group The two-year-old band The pretty Reckless have ... | X-Factor winner Alexandra Burke talks about Wii love, ...<br>GoNintendo 2 hours ago<br>"I remember a couple of months ago I bought my Wii for my family and I to play with - and now ... | No Birkenstocks Here: Eco Fashion Week Proves Being ...<br>shefinds.com 58 mins ago<br>Who says fashion can't be eco-friendly? No longer a mere trend, eco-fashion doesn't mean hemp ... | The great And Powerful Raimi Goes to Oz<br>Time 1 hour ago<br>He may have given up his Spider-Man habit, but that doesn't mean that Sam Raimi had abandoned a ... |
| INDIE MUSIC » | CELEBRITY GOSSIP » | DANCING WITH THE STARS » | MOVIE BOX OFFICE » |
| The Pretty Reckless rolls into The Quarter<br>Baltimore Sun 43 mins ago<br>'Gossip Girl' star Taylor Momsen fronts rock group The two-year-old band The pretty Reckless have ... | Hannibal Lecter Joins the Cast of 'Gossip Girl' [Open ...<br>Gawker 2 hours ago<br>Taylor Momsen dons a mask and gown for a scene in Gossip Girl where she goes on a cannibalistic ... | 'Dancing with the Stars' Week 3 Elimination: Time for ...<br>Buddy TV 2 hours ago<br>During the third week of Dancing with the Stars: The Results Show, Margaret Cho became the latest celebrity struck down by ... | Movie Review: Tamara Drewe<br>Entertainment Weekly 4 hours ago |
| TV » | THE SOCIAL NETWORK » | EMMY AWARDS » | REALITY TV SHOWS » |
| 20 Years Ago This Week: 'Beverly Hills, 90210' debuts<br>Entertainment Weekly 2 hours ago<br>When Fox's Beverly Hills, 90210 launched in 1990, that zip code didn't seem too promising. "The ... | The Social Network's Aaron Sorkin [Interview]<br>Geekadelphia 1 hour ago<br>In anticipation of the opening of The Social Network it was truly a pleasure to interview one of ... | 10/7-10/9: Phoenix Fashion Week at the W Hotel Scottsdale<br>Arizona Republic 2 hours ago<br>Phoenix Fashion Week returns to Scottsdale on Oct. 7-9 at the W Hotel Scottsdale and Residences. ... | 'The Hunger Games': How reality TV explains the YA sensation<br>Shelf Life 4 hours ago |

« Go Back                                                                                                                   See More »

About iCurrent    Blog    | © 2010 iCurrent   Terms of Service   Privacy

FIG. 43 icurrent
*WHAT'S NEW FOR YOU*

Invite Friends! Settings Help Sign Out
ramana

Add an iCurrent Widget
Display the latest headlines from iCurrent on your blog or website.

Copy and paste this code into your HTML webpage.

```
<script src="http://widgets.icurrent.com/v1/widget.js">
</script>
<script>
new IC.Widget({
  title: 'Newspaper Industry',
  type: 'channel'
  cid: '2999',
  version: 1,
  width: 250,
  height: 300,
  appearance: {
    style: 'widget'
    container: {
      background: '#5B8CD1',
      text: '#FFFFFF'
    },
    headlines: {
      background: '#FFFFFF',
      link: '#05137C',
      visited: '#656595',
      byline: '#808080'
    }
  }
}).render();
</script>
```

Show Settings

Newspaper Industry

Let the tablet come! Denmark is prepared, says Berlingske Media's Annemarie Kirk
editorsweblog 1 hour ago A Harsh Verdict or Obama's BP Spill Response
Columbia Journalism Review 38 mins ago Time's Gray goes from Assignment Detroit to DC
Poynter Institute 2 hours ago Sylvie Kauffmann: "The social cloud enriches newspapers, even in an investigative way."
editorsweblog 1 hour ago New York Times Co's Janet Robinson on the paper's plans for paid online content and new...
editorsweblog 1 hour ago Daily Sentinel to charge nonsubscribers for online access
editorsweblog 1 hour ago iC                                    Newspaper Industry »

| iCurrent, Inc. | How to Use iCurrent | How to Use iCurrent | |
|---|---|---|---|
| About » | 49 Second Video Tutorials » | Get Help from a Person » | Back to Top » |
| Blog » | Frequently Asked Questions » | Give Feedback » | |
| Press » | Take a Quick Tour » | Like Us on facebook » | |
| Jobs » | | Follow Us on Twitter » | |

© 2010 iCurrent   Terms of Service   Privacy

SYSTEM AND METHOD FOR DELIVERING AN OPEN PROFILE PERSONALIZATION SYSTEM THROUGH SOCIAL MEDIA BASED ON PROFILE DATA STRUCTURES THAT CONTAIN INTEREST NODES OR CHANNELS

FIELD OF TECHNOLOGY

This application relates to a web based newsreader system and method for retrieving, analyzing and delivering information by combining personal, social and editorial inputs on content and channels to obtain relevant news and information.

BACKGROUND

The Internet is becoming a leading source for news. However, the amount of news available through the Internet is overwhelming. Thus, Internet portals and other websites offer so-called personalization to varying degrees. A great deal of active research is being conducted concerning how to improve personalized access to news and other resources. See, Pretschner et al., "Ontology Based Personalized Search," Proc 11th IEEE Intl. Conf. on Tools with Artificial Intelligence, pp. 391-398, Chicago, November 1999.

Personalization technologies often require creation of a user profile, which is used in the process of filtering information and presenting the filtered information to the user. One common perception in this field is that profile creation should not require significant effort by the user at the risk of alienation and loss of the customer. However, so-called open profiles which include editable user models have been proposed, allowing a user to examine and edit a user profile. See, Ahn et al., "Open User Profiles for Adaptive News Systems: Help or Harm?" International World Wide Web Conference Committee, WWW2007, May 8-12, 2007. In Ahn et al., an editable profile is described based on the display of keywords used in the filtering process. The user is able to add and delete words from the list. Also, the process identifies "top" keywords in articles returned to the user, which enables the user to discover the terms used in the articles, and utilize the information in the process of editing the profile. Ahn et al. found however that his experiment of providing a user the ability to add and remove keywords may harm system and use performance in information retrieval systems. Ahn et al. suggests that user editable profiles might work in systems that have good control over the delivery of cumulative or duplicative articles, which they characterize as good "novelty control", in the filtering of information to deliver to the users. Ahn et al. found evidence that apparent duplicates in filtered results often led users to amend their profiles in an apparent attempt to eliminate the duplicates, but with poor results.

It is desirable to provide personalization technologies based on open profiles which can be modified by users, in a way that improves the results of the information filtering and presentation systems.

U.S. patent application Ser. No. 12/417,489 filed on Apr. 2, 2009 and published as US 2009/0254838 on Oct. 8, 2009 and U.S. patent application Ser. No. 13/317,031 filed on Oct. 7, 2011 and published as US 2012/0096041 on Apr. 19, 2012 are hereby incorporated herein by reference in their respective entireties.

US 2009/0254838 is directed to a system and method that includes a harvesting tier that ingests content via RSS and converts that content into unique system documents. An analytics tier takes the unique system documents and enriches them with meta data extracted from the document content which meta data is then used to match against channels. Channels act as smart filters, and the relevance a document has to a channel is calculated and represented as a relevancy score. Channels are displayed on a user's graphical user interface (GUI) as both a front page view, which is a summary of all the user's personal interests, as well as a channel view, which displays the most relevant documents for a particular interest context.

US 2012/0096041 is directed to a system and method that allows users to edit and share created channels with other users. Both of these referenced and published applications require that a user expressly subscribe to or create particular channels.

SUMMARY

Personalization technology for delivery of news and other information in an exemplary embodiment is based on an open user profile, and supported by sophisticated content analysis and tools that enable a user to quickly and easily take advantage of the content analysis in the creation and refinement of his or her profile. In addition to editing tuning, and sharing information channels in accordance with the above referenced published applications US 2009/0254838 and US 2012/0096041, an exemplary embodiment of the newsreader system and method (Social Reader) described herein provides at least two additional layers or processes involving channels, namely, social media editing and editorial editing. The provision of these additional processes to channel creation and editing enhances the goal of surfacing the most relevant content at any moment in time for a user's particular interest context which yields a better reading experience that is not obvious compared to existing newsreaders which only operate on specific articles or tags. In particular, the user of Social Reader can obtain channel information without the user expressly subscribing to or creating the channel information.

Social media editing involves utilizing an interface such as Facebook Connect to obtain information channels from a user's social media profile. For example, Facebook Connect implementation allows the user to sign onto the system using a Facebook account. In particular, any interests or fan pages that have been "Liked," education, employment and demographic data, is used to subscribe the user to an initial set of matching channels. For example, if the user's Facebook profile lists attending the University of Virginia, residence in Arlington, Va., and that the user "Liked" the Washington Nationals, then the user would be provided with information content associated with "University of Virginia," "Arlington, Va." and "Washington Nationals" channels, among other matching data.

The matching process uses both the literal name of a channel, as well as the underlying targets of the channel (i.e., the Washington Nationals channel may have an underlying target of Davey Johnson, which could match on that if Davey Johnson existed as a Like in the Facebook profile). The attribute targets for a channel are described in the aforementioned published applications and are a key component of the channel concept. The matching also will attempt to match on higher level categories if they can be linked.

A Facebook account is also used to find the user's friends who are also registered users of Social Reader. Each such registered friend will have gone through the initialization process described above. An exemplary embodiment of the herein described Social Reader includes a GUI having display capability for a plurality of core pages including a fully hosted article page, a channel page, a front page, a summary page of all friend's reading activity, and the reading activity of an individual friend, and a trending view for reading activity site-wide.

When a user reads a fully-hosted article on the newsreader system, a read event is captured by Social Reader and is published to Facebook. Facebook uses the read action on a specific article to potentially recommend that specific article to a user's friends on Facebook. Social Reader captures the read event for the specific article, in addition to the channel context that article was read in, as part of recommending the channel or article to other users.

A channel page on Social Reader displays the most relevant articles for that interest context. Additionally, if a user's friends have read any particular articles matched by the channel, it provides a boost to the relevancy score of those articles in the channel view.

A user's front page displays the most relevant content across channels relevant to a user. The referenced published applications were limited to displaying channels that a user had expressly subscribed to or created. Social Reader also includes any channels a user has read content from, in addition to channels and content a user's friends have been reading. Social Reader editors also recommend channels and articles contained therein for particular interest contexts of the user. The personal, social and editorial signals are combined to calculate relevancy for the content shown on a user's front page.

The matching and ranking of content to a particular channel makes use of several scores. The key score is how many of the target attributes of the channel match the extracted attributes of the document. The variables employed as part of this calculation include, but are not limited to: how recently was the article published (a temporal score); how long is the article; who published the article (reputation of the source); and was there media associated with the article (e.g. images). Social Reader includes additional variables for how many friends have read a particular article in the matching set of channel articles.

The matching and ranking of content and channels to a user's front page also uses several scores. As described in the referenced published applications, the variables include, but are not limited to: how often a user has read content from that channel; does the channel have a recent increase in the number of matching articles (the momentum of a channel); in addition to the general relevancy score for the channel. Social Reader includes additional variables for how often a user has read any channel (explicitly subscribed to or not), in addition to any channels a user's friends have been reading (explicitly subscribed to or not).

The content activity of all the friends of a user on Social Reader is available via the Friends Activity view. This is a summary of all the activity of friends who have recently used the application.

The recent activity of a specific friend is available via a recent activity view for that friend. Clicking on an avatar anywhere on the application results in a view of all the content reading activity for that friend.

At the top of any article page and in a dedicated view, the articles that are trending are displayed based on the number of reads by all users on Social Reader. As will be appreciated by those skilled in the art, this uses a standard momentum algorithm that not only uses the total number of reads but the acceleration of those reads within a recent frame of time.

The following description and definitions of basic terms used in association with information channels are provided for the convenience and understanding of the reader.

A data processing system for delivering the service in this exemplary embodiment includes a database storing a plurality of user records. The user records include respective profile data structures that contain one or more interest nodes. The interest nodes in turn include respective sets of targets, where the targets comprise attributes of different types to specify a channel, used in the filtering of information files for delivery of result sets for the interest nodes. The data processing system also includes logic structure that is executable to process the information files and associated metadata in response to a selected interest node to produce a filtered set of information files. The processing applies the targets of the interest node over the attributes of available information files to produce the filtered set, or "channel" data. The data processing system includes logic executable to compose and send executable documents to a user terminal, where the executable documents are rendered to produce a graphical user interface. The executable documents comprise data specifying, a representation of the "channel" data (filtered set of information files), a representation of the targets which define the interest node, and a representation of selectable markup identifying particular types of attributes associated with the filtered set of information files. Upon rendering of the graphical user interface at the user terminal, tools are presented that highlight the attributes and enable the user to select the highlighted attributes and cause messages to be sent to the data processing system for use in refinement of the interest node. The data processing system includes logic to receive these messages indicating the selection of particular markup in the graphical interface at the user terminal, which is executable to modify the selected interest node in response to these messages by, for example, adding a target corresponding to the attributes identified by the particular markup.

"Typed-attributes" (i.e., specified types of attributes) usable as targets in the user profile include entity type attributes that identify entities named in the associated information files, topic type attributes that identify topics from a taxonomy addressed in the associated information files, phrase type attributes identifying keywords or phrases used in the associated information files, concept type attributes identifying concepts that are addressed in the associated information files, and so on. The entity type attributes, topic type attributes, and concept type attributes are extracted from information files using content analysis programs that require analysis requiring linguistic and statistical techniques beyond simply recognizing and indexing words used in the information files. By delivering markup identifying typed-attributes to the user in association with took used for editing an open profile, the user's participation in the creation and refinement of interest nodes in the profile is facilitated and superior personalization results are achieved.

In addition to targets as described above, user profiles include interest nodes in which typed-attributes are used as qualifiers, where a qualifier is an argument used by an algorithm or algorithms for ranking and filtering information files in result sets, or an argument used for composition and delivery of result sets. The executable documents that are used for rendering the graphical user interface include data structures specifying user selectable markup that enable a user to produce messages to the data processing system to add or modify qualifiers in the profile data structure. In one embodiment, user selectable markup-up is provided that allows the user to generate an indication of interest in specific information files represented on the graphical user interface (GUI). In this case, a menu is presented in response to the indication of a selected information file with "recommended" typed-attributes. The menu enables a user to produce messages to the data processing system to modify the selected interest node based on typed-attributes associated with the selected information file, such as by adding, or removing, the highlighted typed-attribute as a qualifier in the selected interest node.

The data processing system also includes structured executable logic instructions for the initiation of interest nodes within a profile data structure. Profile data structures can be characterized as data structures arranged to contain sets of targets and qualifiers. An executable document is presented that includes data structures that specify user selectable markup for generating an indication that a user intends to create an interest node. In the creation of interest nodes, the markup identifying typed-attributes of information files and other tools are leveraged to assist the user to create relevant and useful targets and qualifiers.

An exemplary method for presenting personalized content includes storing information files and associated metadata in computer readable storage, and storing a profile data structure in a database including a plurality of interest nodes that include respective sets of targets. The method includes filtering the information files and metadata using targets in a selected interest node to produce a filtered set of information files by executing a procedure on the data processing, system in communication with the storage and the database. The method includes composing a first executable document using the data processing system. The first executable document is used by a user terminal for rendition of a graphical user interface that includes a representation of the filtered set of information files, user selectable markup identifying typed-attributes represented in the filtered set of information files and a representation of the selected interest node from the profile data structure of the user. The data processing system sends the first executable document on a data network to a user terminal which renders a graphical user interface enabling the user to the return messages to the data processing system. The data processing system modifies the selected interest node and the profile data structure in response to an indication of selected markup by the user. The modification can include adding the typed-attributes identified by the selected markup as a target or qualifier in an interest node. Next, the data processing system composes a second executable document use for rendition of a graphical user interface at the user terminal, based on a modified interest node. The second executable document is returned to the user across the data network and rendered to produce an updated graphical user interface with modified results.

Exemplary embodiments of the first and second executable documents include a first pane displaying a representation of the profile data structure, a second pane displaying a representation of the filtered set of information files, and a third pane including a list of markup identifying typed-attributes represented in the filtered set of information files. Also, embodiments of the first and second executable documents include a status bar indicating the selected interest node.

In composing a second executable document, a new filtered set of information files produced in response to the particular typed-attribute is provided as part of the second executable document along with a second annotation marking the particular typed-attribute that is selectable to cause execution of the program to update the selected interest node with a target corresponding to that particular typed-attribute.

In this manner, a two-phase process is required for updating the interest node that involves first reviewing results provided by the proposed update, and second deciding whether to permanently add the proposed update to the interest node.

The "Channel" produces results filtered based on topics and sources based on a variety of factors. Channels can be used in social use cases whereby people support one another in collecting and making sense of information as matched by a channel. Example social use cases include Collaborative Channels—shared among people in personal, social, or professional groups; Editor/Power User Guided Channels—Editors or Channel Owners(s) define and maintain the channel definition and many users of the system can benefit from a large catalog of well-defined channels; Popularity-weighted Channels—the ranking of matching articles are adjusted based on aggregated clickthrough statistics by users of the channel, which naturally integrates collaborative filtering into the context created by the channel.

Beyond the sharing of the channel as a filtering mechanism for content of interest, shared channels also naturally provide a substrate for annotating or supplementing matched content with additional content that is useful to share in the channel's context. One particularly useful and important case is commenting functionality as applied to matching articles but also at the channel level.

To support these use cases, the channel data structure supports additional data that capture the access rights for additional users of the channel. Such access rights include rights to read and edit channels as well as to invite others or to perform other operations that are supported on channels.

Additional content that is attached to matching, articles or to the channel itself can be stored in additional data structures that are linked to the channel data structure.

In addition, a mechanism that allows a user that is following a channel but doesn't have permission to edit that channel is described. They can effectively edit their own version of the channel without losing much of the benefit of still remaining linked to the original channel.

For example, a user can delete a particular topic that the user is not interested in an editor-managed channel and still have their channel continue to match new topics that an editor adds subsequently. This process is supported by a spawn operation that creates a new channel that is still linked to the original channel.

Other aspects of the technology described herein can be seen on review of the accompanying figures, the detailed description and the claims which follow.

BRIEF DESCRIPTION OF THE DRAWINGS

FIGS. 19-44 show additional screen shots.

FIGS. 46-50 are screen shots illustrating channel obtainment via the methods of FIG. 45.

DETAILED DESCRIPTION

Figure 1:
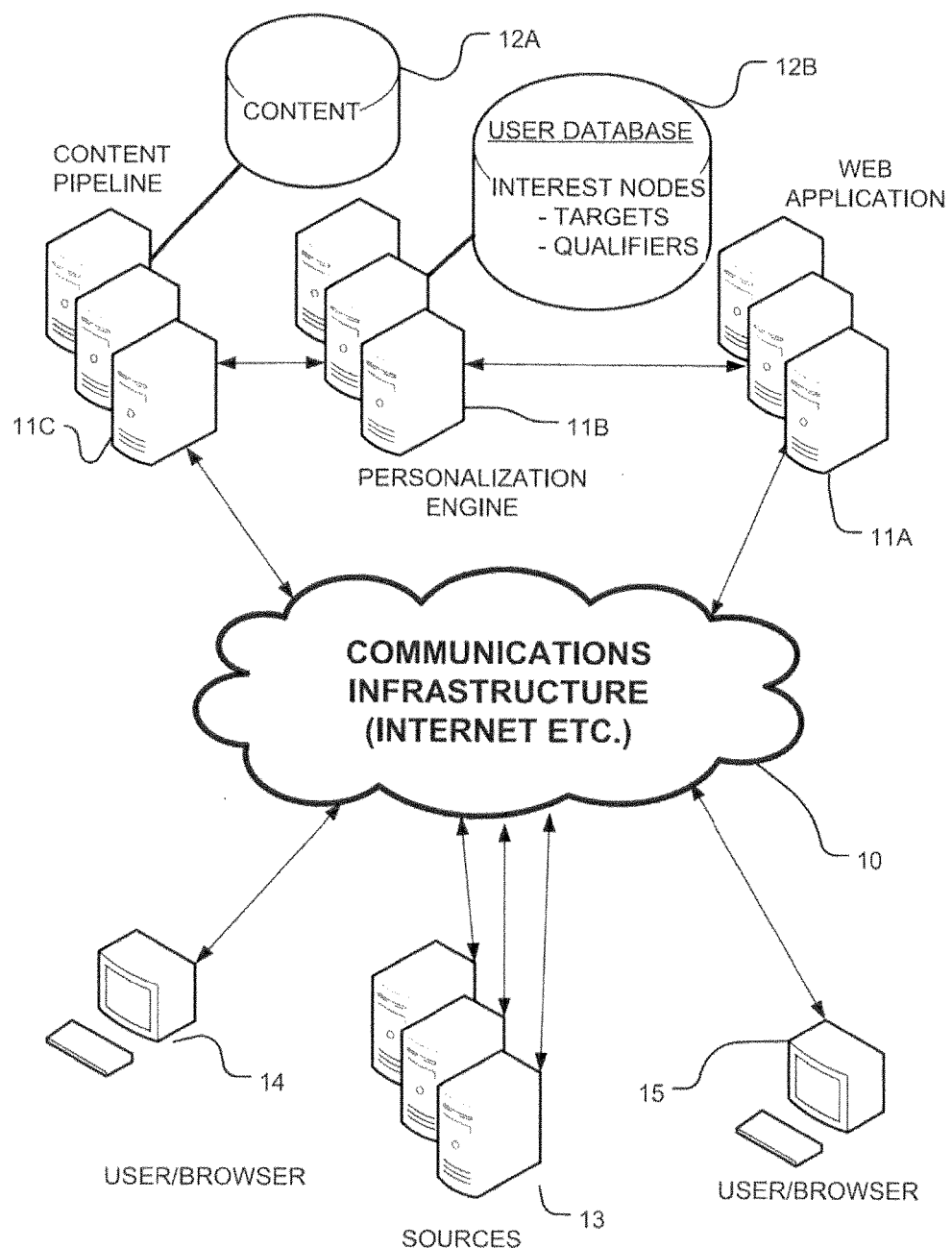
FIG. 1 is a simplified diagram of a deployment architecture for an exemplary personalization system as described herein.

FIG. 1 illustrates a deployment architecture and a technological environment in which the exemplary system described herein can be implemented. A communications infrastructure 10 is shown including media such as the Internet, the mobile phone network, cable or satellite networks, private communication links and networks and so on. A server data processing system, including data processors 11A-C executing a content pipeline 11C, executing a personalization engine 11B, and executing a web application 11A, performs the functions of retrieving, analyzing, personalizing and composing electronic, documents for presenting information files for a user. The data processors 11A, 11B, 11C include access to a database or databases 12A, 12B storing content including parsed and annotated information files and user data, respectively.

In the configuration illustrated, a content database 12A is coupled with and managed by a content pipeline executed by data processors 11C. The content database includes metadata associated with the information files, including typed-attributes usable by the logic executed by data processors 11A, 11B, 11C in the filtering of information files. Information files in a representative system can include text based files, image based files, video files and other content which can satisfy parameters of a user's profile as it is reflected in a profile data structure, and can be obtained via a content pipeline.

A user database 12B is coupled with and managed by a personalization engine executed by data processors 11B. The user database 12B includes user records that store parameters of user accounts, including user profile data structures utilized for personalization of the information files fed to the users. The profile data structures include one or more interest nodes, associated with the user account. The interest nodes comprise targets, which are typed-attributes usable by logic structures executed by data processors 11A, 11B, 11C in the filtering of information files. The interest nodes also comprise qualifiers, which are typed-attributes usable by the logic executed by data processors 11A, 11B, 11C for ranking and further filtering the information files.

In the environment shown, sources 13 of information files provide such files to the content pipeline at data processors 11C via the communications infrastructure 10. Users at terminals 14, 15 utilize browsers, or other application programs, executed on their terminals to interact with a web application executed by data processors 11A. Thus, the terminals 14, 15 display graphical user interfaces by rendering images with mark-up using executable electronic documents, such as web pages implemented using mark-up languages (e.g., HTML) and scripts, composed by the data processors 11A, 11B, 11C, and accept and relay input signals from the terminals 14, 15 to the server data processors 11A, 11B, 11C using protocols such as the hypertext transfer protocol HTTP, or other communication protocols suitable for the processes described herein.

A basic deployment architecture is illustrated in FIG. 1. This deployment architecture is representative of high traffic server farm implementations. The technology can be deployed in a single computer, or in many computers configured as suits a particular embodiment. In the basic deployment architecture illustrated in FIG. 1, a web application comprises logic performed by the data processors 11A which manages communications between the server system and users (e.g. 15), including establishing web sessions using a communication protocol such as HTTP, sending web pages composed with support of the personalization engine 11B, and responding to actions executed by the user which results in messages to the server, for initiation of interest nodes, refinement of interest nodes and in general navigating the information files presented. A profile database in user database 12B stores user profiles that include interest nodes. A personalization engine 11B computes a "node result" for each selected interest node, which includes a filtered set of information files generated using the parameters of the interest nodes. In addition, it generates channel pages based on the node results of selected interest nodes, and other pages. A "front page" format can be used which reflects node results for a plurality of interest nodes using a full user profile. The user operating at terminal 15, for example, reads the front page and channel pages in a browser and produces indications to initiate routines to create and refine interest nodes.

Figure 2:
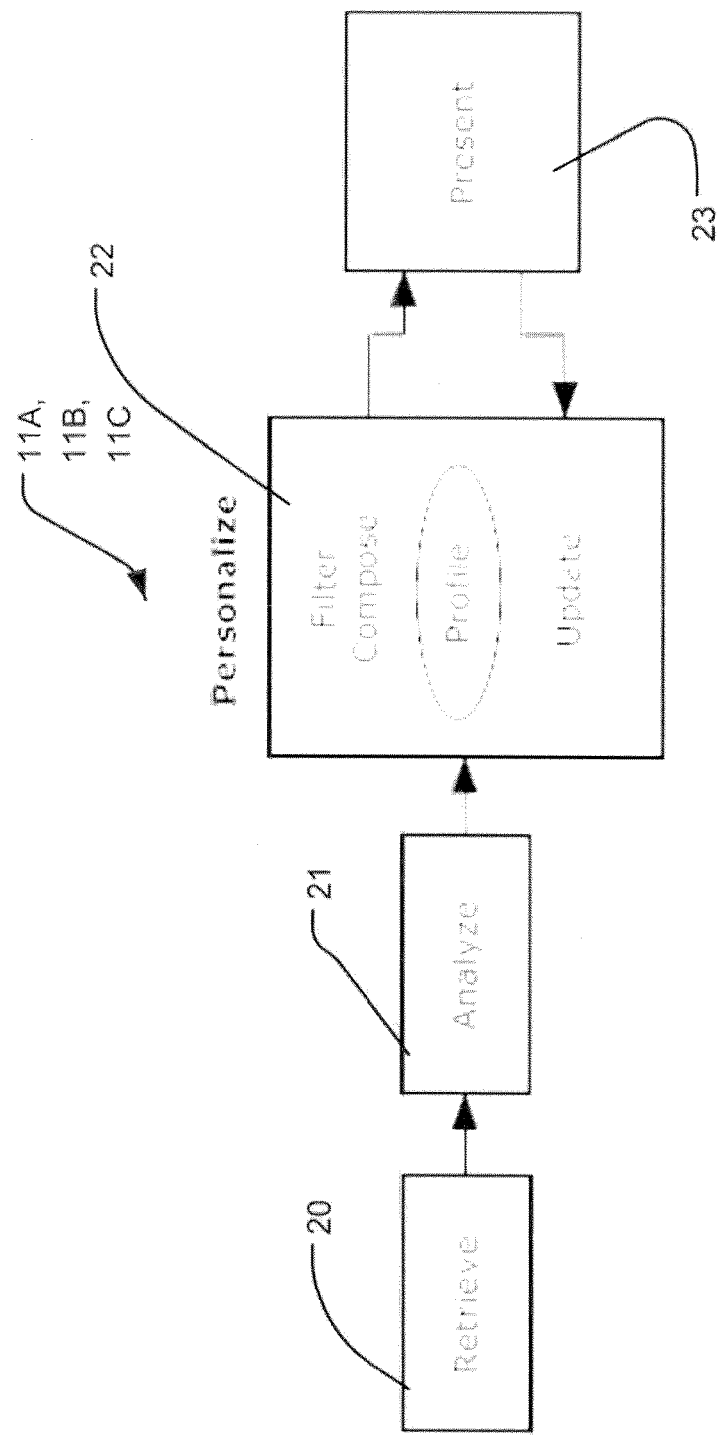
FIG. 2 is a block diagram of logic elements included in a data processing system for performing personalization in an exemplary embodiment.

FIG. 2 is an heuristic overview block diagram of processes performed by the server data processing system 11A, 11B, 11C (referred to collectively as the "server"). The server includes computer implemented processes which retrieve, analyze and deliver information items to users over communication networks. The server includes a retrieve engine including set of retrieve functions (block 20) which retrieve information files from a variety of sources by downloading documents, crawling web sites, processing RSS feeds and so on. The server includes an analyze engine including a set of analyze functions (block 21) which apply linguistic analysis, extraction and classification to the information files collected by the set of retrieve functions (block 20). The set of analyze functions (block 21) adds mark-up including metadata and annotations to the retrieved information files in addition to those obtained from the original sources. Also, the information files are deduped, grouped and linked to facilitate content analysis, matching, and more effective presentation. The server includes a personalize engine including a set of personalize functions (block 22), performing filtering, composing and updating functions in support of a presentation engine including the set of presentation functions (block 23), in addition, the set of personalize functions maintains user profile data structures, described in more detail below, in the database. Using the set of personalize functions (block 22) information files are matched against a user's profile to filter items based on relevance to a given interest. Items and statistics over items are used to compose filtered sets of information files to present to the user based on interests and aggregates of interests. The user profile is updated based on explicit actions by the users as well as assisted actions arising from the linguistic analysis and data carried with the information files, and automatically through machine learning processes.

The set of presentation functions (block 23) composes graphical user interfaces in the form of electronic documents for rendering by user terminals. The graphical user interfaces are rendered and displayed using a browser, e-mail, the SMS communication system or otherwise that include a representation of a filtered set of information files with mark-up to support direct signals from the user to the server 11 in support of maintaining a user's profile data structure. Thus, a user can explicitly signal an update to an interest node within the user's profile data structure to add a specific target to the filtering process, and to cause the filtering process to produce more information about the specific target. The graphical user interface is managed to provide instant value to the user based on such direct signaling, as well as feedback on how use of a specific typed-attribute will affect future results sets.

In the set of analyze functions (block 21), text analytic functions are performed on information files that are collected. These functions produce a rich set of mark-up including metadata fields and annotations that mark key elements, including typed-attributes, within the text of each information file. These metadata and annotations are utilized for matching and presenting information files to the user, and structuring the process of updating the user's interest profile data structure. The typed-attributes included in the metadata and annotations include for example, the following:

Topics—drawn from predefined taxonomies
Entities—Named entities drawn from specified entity types.
Source—the source of the information item e.g. a particular website, publication, or blog
Genre—the genre of the information object e.g. Press Release, Technical Paper, Opinion
Format—the electronic format of the information object e.g. Word, Powerpoint, PDF, Sound
Other key document fields—author, date, title, abstracts or other human-generated summaries Some metadata and annotations are provided by some of the sources of information files, and such metadata and annotations can be parsed and included in marked up information files by the server 11. Information files are stored in a document format in the database suitable for use in the filtering process, such as a format consistent with industry-standard formats such as RSS 2.0, Atom 1.0, and the Universal Feed Parser. For example, the stored, computer readable documents may have a format such as the following:

```
<icdocset>
   <!-- icurrent ID, 10 digits, conforming to XML "ID" type constraints, dt
in "fname format" -->
   <icdoc id="ic:0003848519" version="2.1" dt="2007006-131313>
      <metadata> .... </metadata>
         <content> ... </content>
   </icdoc>
</icdocset>
<metadata>
   <exid>guid://someid</exid>            <!-- Global Unique id;
                                              eg. atom:id/rss:guid -->
                                         <!-- Except for
                                              Moreover, it's their
                                              id. -->
   <url>http://someplace.com/item.html</url>   <!-- The item's url -->
   <title>The Title of the Item</title>   <!-- The Title -->
   <author>The Author</author>           <!-- Author of Item -->
   <source>
      <name>Display Name</name>          <!-- Source Name e.g
                                              "New York Times" -->
      <uri>http://domain.com</uri>       <!-- A URI for
                                              source. -->
                                         <!-- feed: domain prefix
                                              of feed.link. -->
                                         <!-- Moreover: docurl -->
   </source>
   <section>Section Name</section>       <!-- The Section of
                                              Source e.g.
                                              "Business"-->
   <supplier>
      <name>supplier's name</name>
      <supply>feed|site</supply>         <!-- supplier's products
                                              -->
   </supplier>
<!-- Dates all in UTC ISO8601 (YYYY-MM-DDTHH:MM:SS, e.g.2008-
03-31T03:28:00) format --><!-- Accuracy for published and
updated dependent on source or supplier. -->
   <fetched>ISO8601 Date</fetched>       <!-- When fetched from
                                              Web by supplier -->
   <published type="feed|page">ISO8601 Date</published>   <!--
                                              Official pub
                                              date/time. -->
   <updated type="feed|page">ISO8601 Date</updated> <!-- Official
                                              update date/time -->
                                         <!-- type indicates
                                              source of date -->
   <!-- Equivalence groups of various types -->
   <group [type="dupe|event|update"]>ic:0034882741</group> <!-- icdoc/
                                              id of group
                                              representative-->
</metadata>
<metadata>
   <topics>
```

-continued

```
        <topic_path taxonomy_id="1" taxonomy_version="3.4.1">
            <topic name="Energy" id="01003000000">
            <topic name="BioFuel" id="01003002000"
                parent="01003000000">
            <topic name="Algal BioReactors" score="0.2"
id="01003002005" parent="01003002000"/>
        </topic_path>
        <topic_path taxonomy_id="4" taxonomy_version="1.0.0">
            <topic name="National" id="01000" score="0.3"/>
            <topic name="Economy" score="0.2" id="01009"
                parent="01000"/>
        </topic_path>
    </topics>
</metadata>
...
<!-- type=icurrent means we've cleaned and normalized the text -->
<!-- type=feed_article_summary means a cleaned summary from feed -->
<!-- optional origin="feed" means text was taken from the feed file -->
<!-- optional analysis="true" (default is "false"): this content is meant
for analysis -->
<!-- optional display="true" (default is "false"): this content is meant
for display -->
<!-- usage_rights = X : an enum on the usage rights with regard to
displaying the text -->
<!-- image_extraction= 'img_tags':all images in <img> tags should be
extracted, 'rules':some images
<content type="icurrent" language="en" format="text/plain" length="234"
        analysis="true" display="true" usage_rights = "web_feed_text"
image_extraction = 'img_tags'>
    <text>
        ... The content suitable for NLP and other analysis
    </text>
    <!-- Annotations (optional) mark up features within the content -->
    <annotations>
        <entities>
            <entity alias_group="2"
                id="45"
                length="10"
                offset="29"
                relevance="95"
                type="place">
                text>Company, Inc.</text> <!-- The text -->
            </entity>
            <entity>
            ...
            </entity>
        </entities>
    </annotations>
</content>
<content type="original" language="en" format="text/html"
length ="100">
    <text>
        ... The original content from the source
    </text>
</content>
```

The analyze functions represented by block 21 also include categorization, using classification technology to categorize information files into "subjects" or "topics" drawn from one or more taxonomies. The analyze functions provide entity extraction, utilized to label entities within the information files. The analyze functions provide "deduping" to recognize duplicate items that may arise from retrieving information files from multiple sources, and also to recognize updates of items which can be important to support in any information presentation system.

In addition, the analyze functions provide clustering and linking processes. Related information files are grouped and linked to support more effective presentation. For example, the analyze functions can provide same event clustering, by which information files about the same event or happening are annotated as belonging to groups, such as when news items covered by many publications appear in the filtered set of information files. Also, related content clustering is used to group related items by annotating information files as belonging to a group, such as discussions, opinions and analysis articles, and so on within a given time period. This can extend to current hot discussion topics as they arise on blogs and community sites which may be triggered by news events or initial articles within the blogs by individuals. The analyze functions also provide a summarizing process by which information files and groups of information files are summarized to provide more efficient display, minimizing the overhead of consuming redundant and related information.

The personalize functions include maintaining a data structure for a user profile, which explicitly represents one or more of the user's needs or interests. A basic schema including a user profile can be represented as follows:

```
The PROFILE
    is a HIERARCHICAL COLLECTION of
        INTEREST NODEs with a NAME and optional DESCRIPTION
        |
        *_ TARGETs {Required | Preferred | Excluded}
        *_ QUALIFIERs
            including <- LIST of Sources
```

In this data structure, a user's needs or interests are operationalized as computer implemented interest nodes, which can be arranged in a hierarchical tree or otherwise. The interest nodes include parameters for use of the profile referring to a range of needs and interests of the user which can be characterized using typed-attributes. The name and description of a particular interest node can be entered directly by a user. The Interest Nodes are composed of two types of elements, including targets which are typed-attributes indicating the "whats" of interest, and qualifiers which are typed-attributes indicating representing other attributes of interest that affect the ranking, filtering, composition and delivery process. Targets can be classified for use by the matching algorithms as "required" (must be matched in every file of result set), "preferred" (not necessarily matched in all files) and excluded (must not be matched in the files of the result set).

This basic schema also includes a list of sources ("Sources") lists of kinds of typed-attributes ("Targets") which can be used as targets in an interest node.

Targets as used herein are arguments used by the personalize engine, implemented within the profile data structure and associated with specific Interest Nodes. Representative types of targets include entities, topics, phrases, and concepts which can be defined as follows:

Entities identify particular objects in the world. Entities within the entity type attribute are further sub-typed and include both broad entity types like people, companies and products, and narrower or specialized types like sports teams, proteins or pathogens.

Topics identify subject matters. Topics can be drawn from any number of general and specialized taxonomies covering areas of content supported over time. For example, taxonomies can be provided for general interest, business, health, patents, areas of science and so on. Taxonomies can be actively curated to provide further adaptation the filtering process.

Phrases are free-form words, often phrases having more than one word that are entered by a user as they might be entered in a typical search box or selected from displayed text. In general, Phrases may be matched literally or using straightforward transformations like stemming, spelling correction and so on.

Concepts are typed-attributes that have some properties of phrases and some properties of topics, but allowing for a wider range of alternative forms for the concept. Concepts can be matched using a variety of additional related attributes. Unlike phrases, concepts are more statistically important in usage and the news, such as "global financial crisis", "tobacco taxes," "national championships", etc. Unlike topics, concepts are not originated from static taxonomies. Concepts are produced by statistical text analysis of new articles and queries, to identify frequently occurring phrases or other attributes which suggest that the file given the particular concept type attribute is related to a larger concept.

Qualifiers are additional attributes associated with Interest Nodes in the profile data structure. Attributes usable as qualifiers can include both visible or hidden aspects of information files which can satisfy the user's interest as defined by the filtering engine. Qualifiers may be explicitly provided by a user using a graphical user interface, or learned by the system during use. Qualifiers can be used to increase relevance in general and to improve salience and clarity in the composition process by boosting or reducing the weight of certain factors. Qualifiers would be used to model factors related to breadth and depth of interest. Examples of qualification include the fact that the same targets may be in a plurality of interest nodes in different user profiles. However, one user profile may qualify the target by the fact that the user is a specialist in that area and may desire deeper content, such as content from a specialized group of sources filtered by provenance tags, form tags or genre tags. Alternatively, a qualifier might be used to indicate a casual or light interest in a particular interest, such as for example photography. Although a number of articles may match the targets within a casual interest, the filtering and composition functions may pass only information files carrying tags indicating that they are particularly popular, or apply delivery rate functions to allow only the occasional articles for delivery and display.

Qualifiers also include presentation and delivery factors that relate to when the information is requested and where the information is delivered. The electronic documents produced using the result sets are composed using qualifiers that specify the platform to which it is to be delivered. For a full function browser at the user terminal, the web application is used to produce a rich page for large format display, for a cell phone or personal digital assistant browser, the web application is used to produce a reduced result set, or a page layout that is more suited to the small format display, for an instance of the user terminal that involves delivery within a web page, like a Facebook page, a blog, or another specialized cite, the personalization engine can apply the parameters that define the boundaries of the available channel, for an instance operating, via email or another communication protocol, the personalization engine is used to adapt the content appropriately. Likewise, time qualifiers can be used to emphasize different interest nodes, or different targets within an interest node at different times of the day, different days of the week or publication cycles relevant to the interest node and the sources used by the interest node.

The particular interest nodes have a structure that is independent of the manner in which the nodes are created in this example. Typically the name and description of the interest node can be input by the user.

The system can include logic structure that keeps track of the history of the creation and modification of the parameters of interest nodes, the context of the action used for the creation and modification, and the mechanism used for that purpose.

Interest Nodes in the profile data structures can be created using a number of basic approaches. In many cases, the user creates the interest node incrementally and gets feedback as the user updates the interest nodes during future sessions. In a first technique, a user searches for information files related to an interest which the user would like to track. The user may enter targets of any type into a search box on a graphical user interface. The input targets are used by the filtering engine to produce a filtered set of information files, and then to present an instance of the filtered set for display to the user. The user then browses the results, using interactive tools provided by the mark-up in a graphical user interface to add targets to a current basket. The user is given the option to save the basket of targets as a new interest node for future use.

A second technique for creation of Interest Nodes involves using the displayed results of a filtering operation, such as an overview page displaying results from a plurality of information nodes within a user's profile, or a page displaying a set of information items filtered by a chosen interest node, and giving tools to select targets of interest for addition to the corresponding interest node. This method allows a user to personalize generic categories, and/or refine special-purpose categories over time.

The list of sources in the profile data structure is a set of sources that may limit or bias the interest node. A user's interest node is typically not source-constrained. However, in practical settings, a user can confine or bias filter for particular interests by emphasizing or excluding particular sources. Sources can be used as qualifiers that affect the weight given to a particular information file used in ranking the file for selection in the electronic document presented to the user that results from the filtering.

The server provides tools to the user to perform interest node creation and editing by first analyzing the information files included in the filtered set of information files to be presented, to create metadata in the form of typed-attributes which are reflected in characterized information files. In creation of the electronic document used at the user terminal to render the graphical user interface, the server adds markup that tags the typed-attributes within the displayed representations of the information files, and provides summary panes on the graphical user interface in which tag attributes of the filtered set of information files as a whole are listed as markup. The markup on the graphical user interface acts both as a prompt for the user to consider the typed-attributes as a candidate target or qualifier for the interest node, and as a tool which allows the user to automatically add or delete the typed-attribute from the interest node. In this way, interest nodes can be created and refined in the process of reading the pages delivered by the server to the user. They can be initiated using a number of the tools provided by the markup, and further refined immediately and over time as the user chooses.

The server composes an electronic document that is rendered at the user terminal to provide graphical user interface to the user by which the user is provided tools, such as hyperlinks, pop up menus, and the like, using markup and scripts to create and edit the contents of specific interest nodes within the user's profile data structure, by adding and deleting targets and qualifiers. The tools in the graphical user interface facilitate interaction to add and remove targets from an interest node in a user profile data structure. The tools are set up so that they become a natural part of obtaining relevant items and browsing the filtered set of information files currently being presented. Also, the tools are set up to provide additional relevant results in response to the user's steering of the content of interest nodes. In addition to explicit user steering, the server 11A-C may provide additional processes for automatic maintenance of interest nodes including for example the following:

Bootstrapping. Bootstrapping refers to the process of generating or refining one or more interest nodes using some other source of "interest reflecting" data. Any user data that directly states or indirectly indicates the interests of a person is a potential source for creating new Interest Nodes or for nominating targets that the user can add to interest objects. Examples include web history, bookmarks, email, collected documents, biographies, contacts, and calendar items.

Importing, Synchronizing. Other techniques will support ongoing extension of the profile including synchronization of the profile with enterprise or personal systems, use and profile elaboration based on the profiles of users with related interests.

Qualifier Learning. The system "learns" qualifiers, some which may be visible to the user, some which would be hidden by observing the usage clicks during reading and other actions within the system (e.g. keeping an item). This would include Qualifiers that help the ranking process in matching, as well as Qualifiers that may tailor how items are distilled or displayed.

The personalize engine 22 also provides filtering processes. In an example filtering process described here, the filtering consists of three steps. In the first step a set of information files are collected by matching an interest node against an index that includes the content and the metadata fields of information files. The candidate, filtered set of information files is scored and ordered based on relevance to the targets included in the interest node, as is done in typical search engines and enhanced by the processing of the information files and use of profile data structures as described herein. The second step computes an additional set of scores for each information file representing qualifiers for the information files such as authority or liveliness, which can be computed from a variety of available statistics associated as metadata or otherwise related to the information files and content analysis applied to the information files, including provenance, hit counts, timeliness, etc. In a third step the scores are collectively used by an algorithm to generate a small and balanced set of relevant information files to be included in the electronic documents for delivery to the user.

A data structure for representing the filtered set of information files output by the personalization engine 22 in a result set object format as shown below. A data structure for a result set object including an array of documents can be as follows:

```
{
    # populated by search server
    'documents': [<array of documents, see definition below>],
    'nItems': [<count on total matching items (incl. items that grouped), not just this page>],
    'hasMore': <boolean whether there are more documents in the result set>,
    'relatedEntities': <the list of current or 'hot' entities>,
    'relatedTopics': <the list of current or 'hot' topics>,
    'image': <an optional field containing the url to the image to use as the banner strip>
}
```

A data structure having a document object format for the documents in the data structure for the result set can be as follows:

```
{
    # document info
    'id': <id>,
    'title': <title>,
    'url': <url>,
    'expanded': <boolean indicating whether the document should be in an expanded state>,
    'image': <an optional field containing the url to an image for the article>,
    'supplier': <supplier>,
    'supply': <supply>,
    'pubDate': <number of seconds since epoch>,
    'fetchDate': <number of seconds since epoch>,
    'source': {'id': <source id>, 'name': <source name>, 'url': <source url>},
    'content': <marked up content - TODO: format?>,
    'topThings': [ {'id': <id>, 'name': <name>, 'type': <type>}* ],
    'topics': [ {'id': <id>, 'name': <name>}* ],
    'topRelatedDocs': [ {'url': <url>, 'title': <title>, 'sourceName': <source name>}* ],
    'otherSources': [ {'url': <url>, 'sourceName': <sourceName>}* ],
    'numOtherSources': <number of other sources>,
    # user document state
    'tags': [<list of tag names>],
    'starred': <boolean>
}
```

A similar object is created for the rendered instance of the graphical user interface encapsulating the subset of the documents to be used in the display taken from the result set.

The personalize engine 22, including a web application, executes a composition process which takes the filtered set of information files generated by the filtering process, and creates an instance of an electronic document, using HTML, XML or other markup or scripting languages, or combinations of languages, for delivery to the user via a communication infrastructure. The electronic, document is to be used at a user terminal to render a graphical user interface. The composition process selects appropriate metadata and content for each information file in the filtered set to include in a display, and generates mark up objects usable by the user for communication with the server. The display rendered using the electronic document serves a number of coordinated purposes including allowing users to consume the information quickly, demonstrate how the information matches interest nodes in the user's profile and indicate useful typed-attributes suggested or contained by the information to assist modification of the interest node.

The personalize engine 22 passes the filtered set of information files along with the metadata, content and mark up selected and generated by the composition process to the presentation engine 23, which can be implemented with the web application 11A of FIG. 1, an email system or the like. Presentation engine 23 manages interaction with the user via a graphical user interface and the communications infrastructure.

The markup tools enable a user operation which can be referred to as "arrowing." Arrowing refers to a process of the user pointing and clicking on a markup on the presented page, where the markup can identify typed-attributes available as a candidate target, as a candidate qualifier or as other attributes of an interest node within a user profile.

For node creation, the markup enables arrowing of targets and sources on the user's webpage. In this process, the user browses items on an overview page of recent content or a page is organized into pre-existing topic areas. The markup identifies sources and other typed-attributes suitable for use as targets within an information file. If a user clicks or otherwise selects a markup associated with particular attribute, a message is generated to the server identifying the selected markup and an interest node can be created including the attribute associated with that selected markup as part of the profile. The context of the information file can be used to provide additional elements for the initial definition of the interest node. For example, the user can click on typed-attributes used for targets within pages focused on broad categories of news such as politics, sports or entertainment. From these broad categories, additional targets can be included in that interest node or proposed explicitly to the user for inclusion.

Also usable in node creation, the markup enables arrowing of specific information files. In this technique, the user may click on markup associated with a displayed information file, such as a link, associated with the title of the document, to initiate an interest node based on the metadata and content associated with that information file. In response, the system returns an electronic document which can be rendered to display a set of targets and qualifiers which the user can select for addition to the interest node.

The electronic document produced by the server also includes a tool enabling basic searching as a technique for initiating the creation of an interest node. The basic searching tool enables a user to search for items related to an interest which the user would like to track. Any of the target types can be used in the search box on a webpage, which are then returned to the server and used for producing a set, of results. The set of results created as a result of the search is processed and marked up as described above to facilitate refinement of the interest node.

The server may also provide, tools that display existing interest nodes or interest node templates created by others that can be adopted by a user. In another technique for node creation, the server may enable the user to upload information files, or links to information files, from outside the system that reflect an interest of the user. The server may then analyze the information file submitted to mine candidate targets and qualifiers from it. An electronic document is produced at the server which presents the candidate targets and qualifiers to the user with markup to enable interest node creation and refinement.

Figure 3:
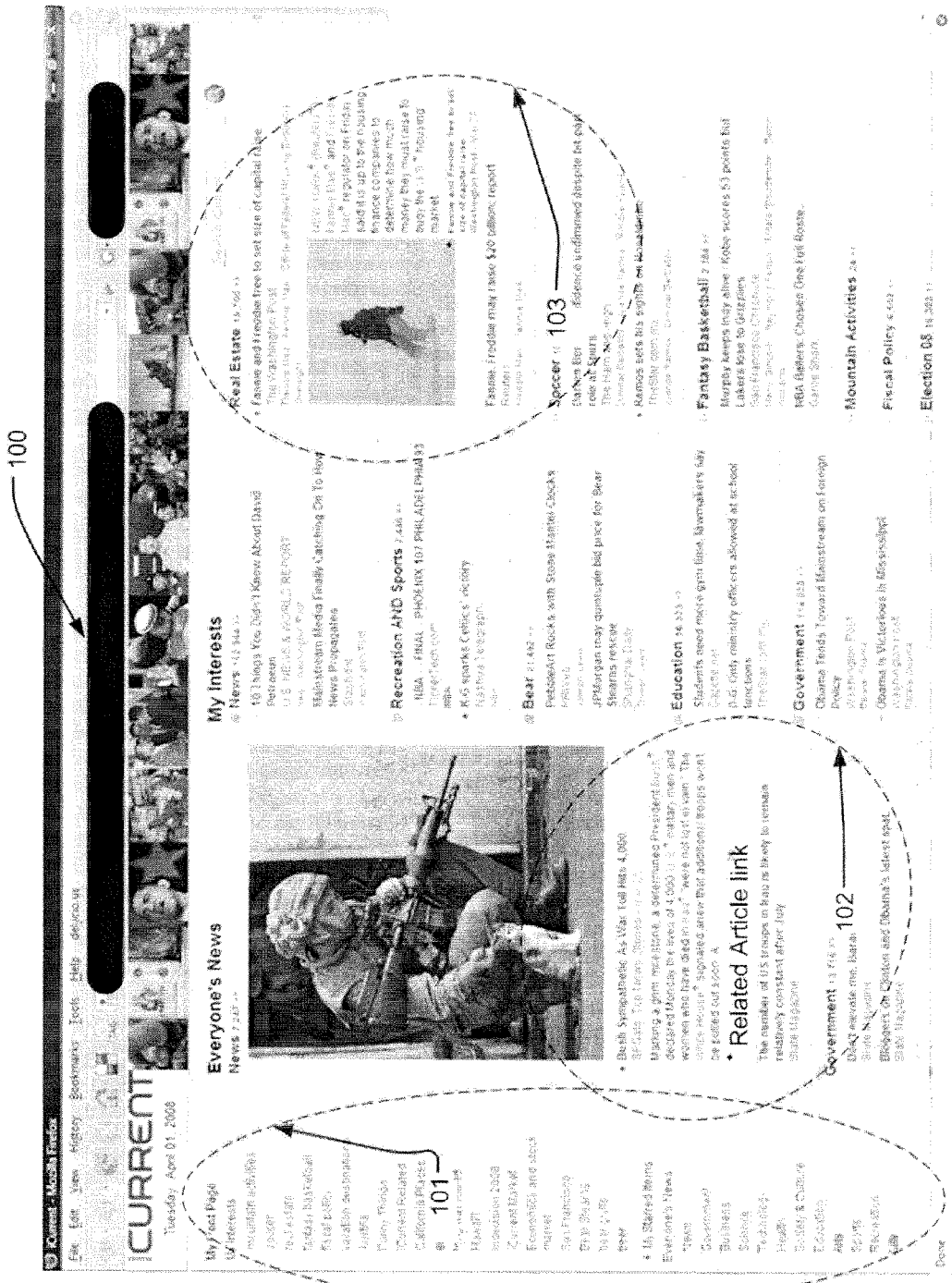
FIG. 3 is an image of a graphical user interface for an "Overview page" rendered using an electronic document produced by a personalization system in an exemplary embodiment.

FIG. 3 is a screenshot for an overview page produced for a specific user, including markup that supports arrowing, as described above. The overview page is rendered on a browser window 100 in this example, based on an electronic document delivered by the web application of the server. The overview page includes a panel 101 on the left listing the interest nodes of the user. The interest nodes can be selected for the front page by the user or they can include all of the interest nodes for the particular user. In this example, there is a first set of interest nodes labeled "my interests" a second set of interest nodes labeled "my shared items" which is not expanded in this view, and a third set of interest nodes labeled "everyone's news". The overview page also includes a column of information files composed under the category "Everyone's News". For example, an article is summarized in the region 102 within the "Everyone's News" region of the window. The summarized article is marked up so that entity type attributes within the text are highlighted, a related article link is provided adjacent the representation of the information file and so on.

The overview page shown in FIG. 3 also includes a representation of a filtered set of information files under the category "My Interests". For example, in the region 103 a summary of an article selected based on the "real estate" interest node is displayed. The summary includes annotations in the form of highlighting of entity type attributes named in the text, such as "Freddy Mac" and mark up in the form of an "up arrow" adjacent the highlighted entities. These two types of mark-up launch different functions as described in more detail below associated with the management of the user's profile data structure and the filtering processes. In addition to the mark-up of text within the displayed summary, topic type attributes associated with the summarized article, such as "Freddy Mac" derived from a taxonomy applied during a analysis process are displayed adjacent the headline for the summary. Coincidentally in this example, the entity type attribute highlighted in the text and the topic type attribute derived from a taxonomy include the same term.

Figure 4:
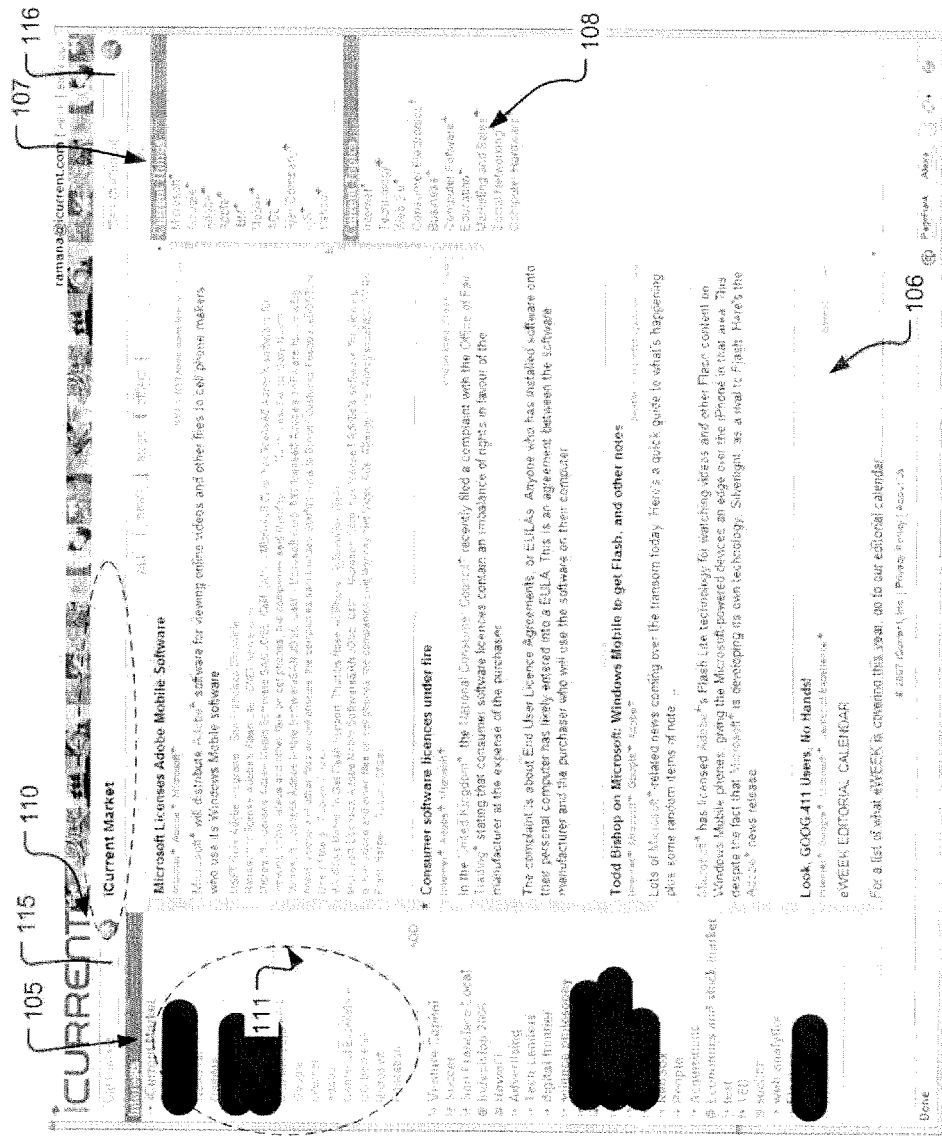
FIG. 4 is an image of a graphical user interface for a "channel page" rendered using an electronic document produced by personalization system in an exemplary embodiment.

FIG. 4 is a screenshot for an instance of a graphical user interface presenting, a filtered set of information files based on a selected Interest Node, which is labeled the "iCurrent Market" in this example. The graphical user interface includes a status bar marked with the current interest node in the region 110. The status bar also includes input region 115 for adding interest nodes (box on the left) and input region 116 for inputting search terms (box on the right) to modify the filtered set produced according to the current selected interest node.

A graphical user interface includes a pane 105 on the left, listing the interest nodes for the current user, and showing a current selected interest node in an expanded format that lists the targets within the interest node in the region 111.

The graphical user interface includes a pane 106 in the center in which summaries of information files selected for presentation are displayed. In addition, the graphical user interface includes a list of entity type attributes in the box 107 labeled Current Things which had been extracted from the filtered set of information files used to produce this representation of the interface. In the box 108 labeled Current Topics, a list of topic type attributes from a taxonomy which had been extracted from the filtered set of information files is presented. The entity type attributes and topic type attributes are include mark up to annotate them on the display by highlighting, and by the use of the "up arrow" symbol, allowing the user to select the mark up to induce functions related to management of the users profile, described in more detail below.

Figure 5:
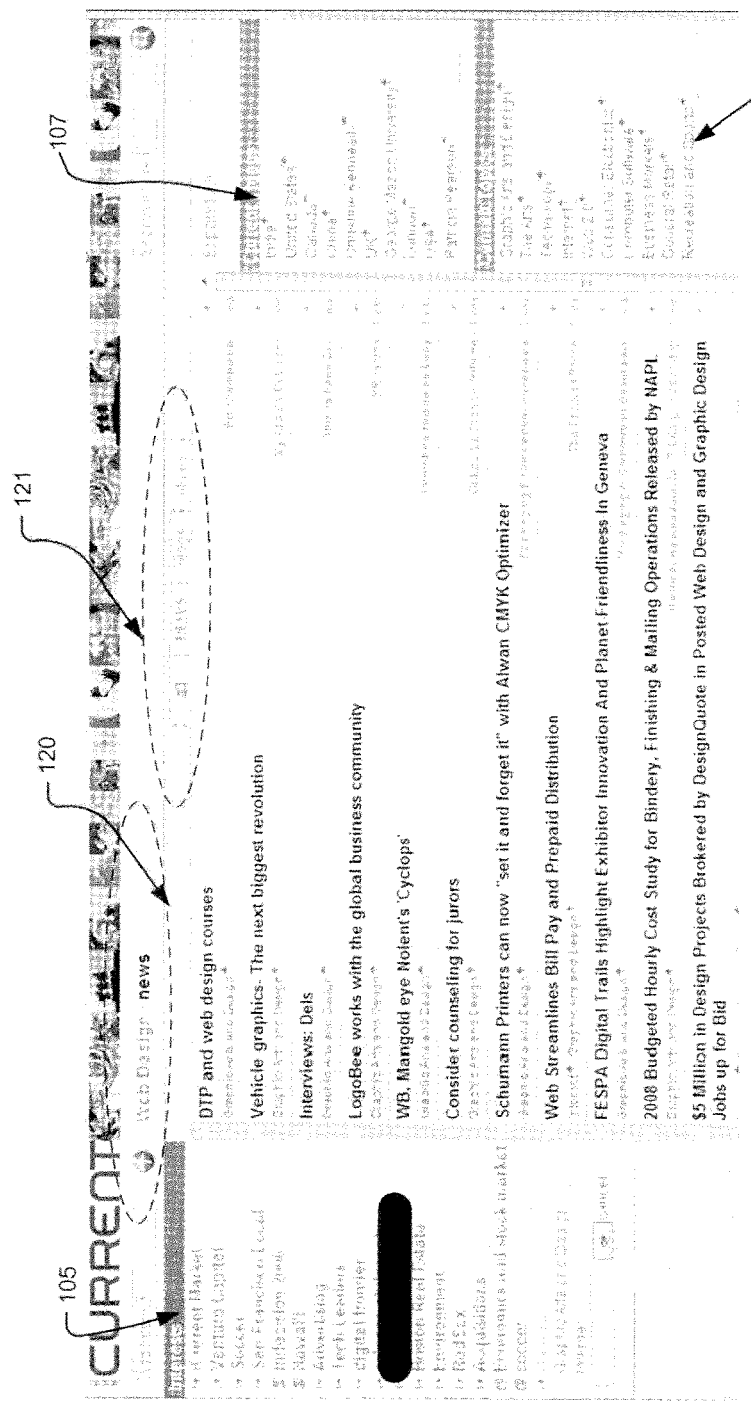
FIG. 5 illustrates another instance of the graphical user interface rendered using electronic document including a pane listing the interests with the current selected interest node shown in a status bar.

FIG. 5 illustrates another instance of the graphical user interface including a pane 105 listing the interests with the current selected interest "Web Design" expanded to show targets within the interest, a pane 107 listing current entities and a pane 108 listing current topics. In this instance of the graphical user interface, the tabs in region 121 are illustrated. In this tab, the filtered set of information files is filtered by a category "news." Also, the status bar 120 showing the current selected interest node also shows how the current selected interest node is modified for the purposes of producing the filtered set of information files represented in this instance of the graphical user interface. The format for presentation of the filtered set of information files in the central pane of a graphical user interface is different than that in other examples provided herein, but can take any useful format.

The status bar 120 shown in FIG. 5 also illustrates a manner in which the status bar is modified if the user enters a search term in the search box on the right side of the status bar, and induces the system to produce a new filtered set of information files modified by the search term. In this case, an instance of the graphical user interface will be created in which the current selected interest node will be displayed in the status bar followed by "/", which is in turn followed by the search terms used for the modification. This provides immediate and constant feedback concerning the manner in which the information presented was produced, facilitating the management of user interest nodes.

Figure 6:
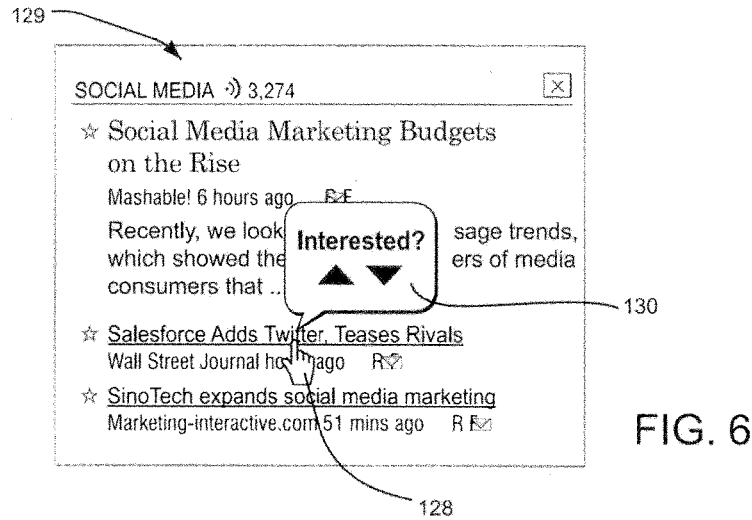
FIG. 6 illustrates a graphical widget produced using an electronic document to indicate interest or not in a selected information file.

For node refinement, electronic document includes markup which in response to a user action that arrows an information file, such as by mousing over markup of the title of the information file, produces a widget includes an indicator (e.g. an up arrow) selectable to indicate interest in the arrowed target or source, and an indicator (e.g. a down arrow) selectable to indicate lack of interest in the arrowed information file. FIG. 6 shows an excerpt 129 of an overview page for example like that of FIG. 3, showing information files selected in response to an interest node entitled "social media". An up arrow/down arrow widget 130 is displayed as the user moves the cursor 128 over markup identifying an information file, such as the tag associated with the title of the information file. The information file shown in FIG. 6 is identified by a title "Salesforce Adds Twitter, Teases Rivals". By mousing over the title, the user invokes the widget 130 which includes an up arrow and down arrow in this example. The widget can take a wide variety of formats including simply yes/no text for example.

Figure 7:
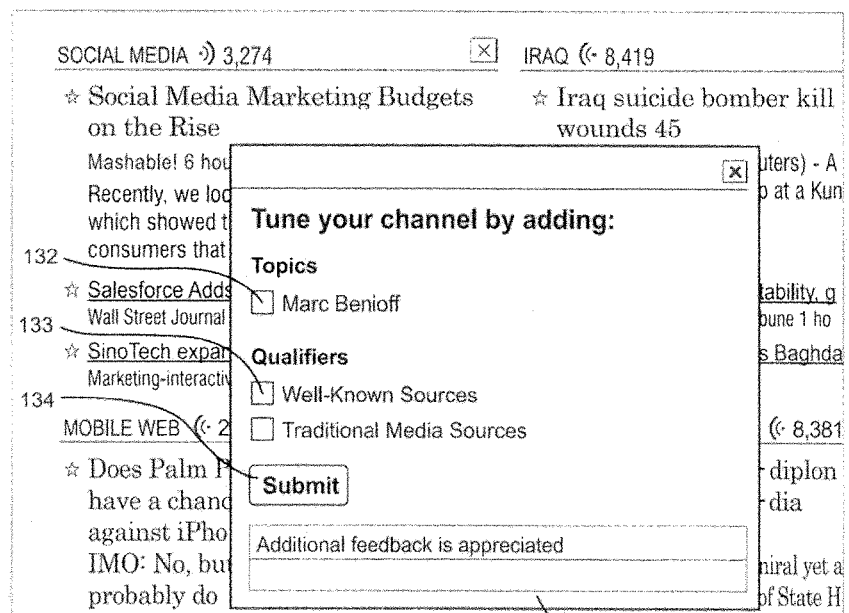
FIG. 7 illustrates a graphical menu produced in response to an indication of interest in a particular file presenting, typed-attributes as recommended topics and qualifiers which can be added as targets or qualifiers in the interest node.

FIG. 7 illustrates a window which is generated if the user clicks on the up arrow in the widget 130 to enable the user to tune the interest node (referred to as a "channel" in this example). In this window, checkboxes are associated with typed-attributes which are associated with the selected information file. Thus, the topic Marc Benioff was identified in metadata associated with the article and a checkbox 132 was provided for indicating interest in the topic. Also, the metadata associated with the article identified qualifiers relating to the source of the article, which in this example is the Wall Street Journal. Because the source is a member of a list of "well-known sources", a checkbox 133 is provided for indicating interest in qualifying the filtering of information files for this interest node according to that list. Likewise, other attributes of the source are listed as potential qualifiers. A "submit" button 134 is provided which the use can click to submit the channel tuning indicated by selected checkboxes.

Figure 8:
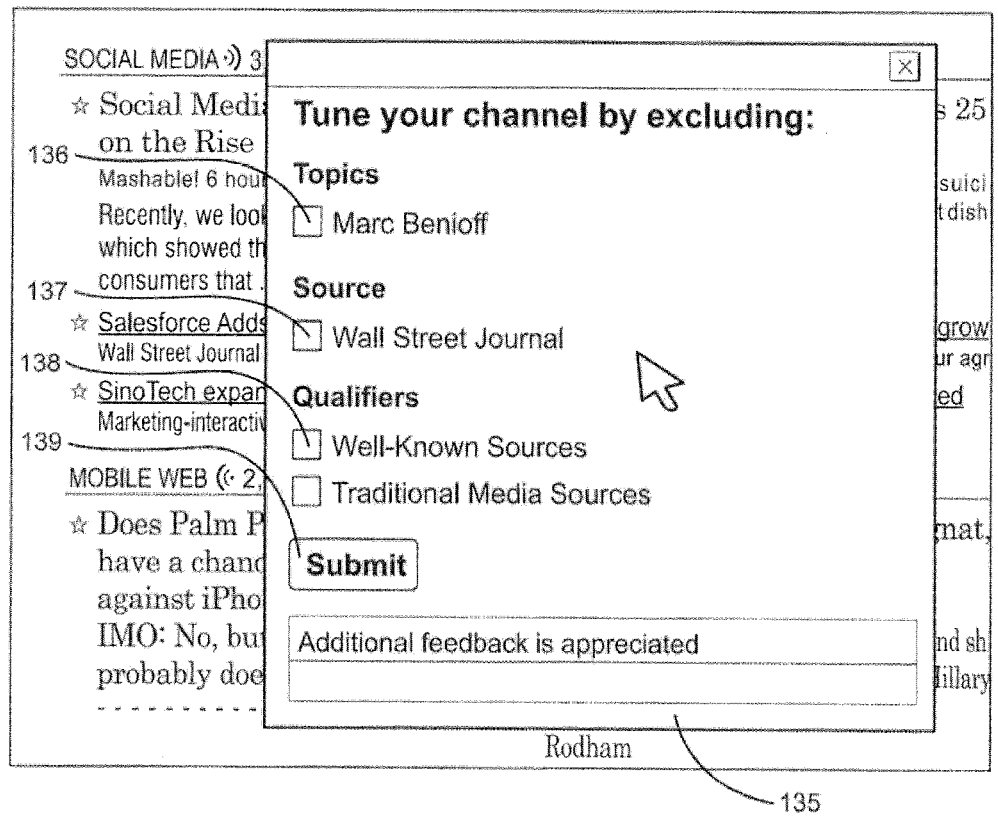
FIG. 8 illustrates a graphical menu produced response to an indication of a lack of interest in a particular file, presenting typed-attributes as recommended topics, qualifiers and the source of the information file which can be removed from the interest node.

FIG. 8 illustrates a window 135 which is generated if the user clicks on the down arrow in the widget 130 of FIG. 6 to enable the user to tune the interest node. In this window, checkboxes are associated with typed-attributes which are associated with the selected information file. Thus, a checkbox 136 is associated with a topic indicated by metadata in the file, a checkbox 137 is associated with a source of the information file, a checkbox 138 is associated with qualifiers associated with the indicate information file and so on. Likewise a submit button 139 is provided by which the user is able to cause submission of the information indicated by the checkboxes for tuning the interest node in the user's profile data structure.

Also, the electronic document used for rendition of the graphical interface includes markup of specific typed-attributes represented by or associated with information files on the page, which in response to a user action that arrows mark up identifying typed-attributes usable as targets, sources or qualifiers on the page produces a widget that includes an indicator (e.g. an up arrow) selectable to indicate interest in the arrowed typed-attribute as a target, source, or qualifier and an indicator (e.g. a down arrow) selectable to indicate lack of interest in the arrowed typed-attribute. By selecting the indicator of interest in the arrowed typed-attribute as a target, source, or qualifier, a message is returned to the server which adds the marked up typed-attribute to the interest node as a target, source or qualifier.

Node refinement is also supported by adding markup to the electronic document which is rendered to present tools that allow interest node editing. The definition of the interest node is displayed to the user, typically at the top of the channel page. The node definition is presented in a block that allows the user to add it directly, adding or removing targets, sources and qualifiers. Automatic completion programs can be utilized to support the editing based on topics, entities, key phrases, concepts and other typed-attributes known to the system.

Node refinement is also supported in some embodiments by adding markup to the electronic document which is rendered to present a set of "recommended" typed-attributes which can be used as targets for sources in an interest node. The recommended list of typed-attributes can be generated using analysis of the information files, the user's profile and node definition, and related or similar user profiles and node definitions known to the system.

For example, the personalization engine can generate a list of typed-attributes which are candidates to add as targets or qualifiers to an interest node. One case of this function is illustrated in FIGS. 6-8 in response to information the arrowing. Candidate typed-attributes can also be listed, and presented as markup on the display, and other settings that do not require user action. For example, recommended entities and topics are listed in the panes 107, 108 of FIG. 4. Thus, lists of recommended typed-attributes can be identified by markup and presented to the user on a page focused on a specific channel or interest node, or when the recommendation is particularly strong based on analysis of the behavior of the user or other parameters in the interest node.

Generally, typed-attributes can be recommended as targets and sources for an interest node profile based on content metadata, usage data captured in the system for the particular user and aggregated over all users, and possibly other data from third-party sources through harvesting and other automated processes. Factors used to determine whether to recommend a typed-attribute include usage, content, editorial ratings, popularity and other users. Some examples include recommending typed-attributes as targets that are common across items matching the channel, that co-occur with existing targets frequently and other information files in the collection, that are associated with existing targets by processes such as efficient editorial review, and that are common and popular in channels across other users, particularly users that have similar interest nodes or profiles.

An algorithm defined by structured instruction logic executed by the server, for example in the personalization engine, can produce the typed-attributes to be presented to the user by processing the metadata associated with the identified information file, and the other information files that are included in the filtered set of information files presented for the current interest node. One algorithm for performing this analysis includes the following:

1) Collect typed-attributes suitable for display in response to arrowing of the information file from the metadata associated with the selected information file.

2) Collect typed-attribute suitable for display in response to arrowing of the information file from metadata associated with other information files in the filtered set.
3) Score the collected typed-attributes from the selected information file, using factors such as a rating based on a measure of effectiveness of the typed-attribute as a qualifier or target in the system, and based on the distinction of the collected typed-attributes from those collected from the other information files in the filtered set.
4) Trim the set of collected typed-attributes based on the scoring to a selected maximum number, such as 3 to 5 targets and 3 to 5 qualifiers.

Figure 9:
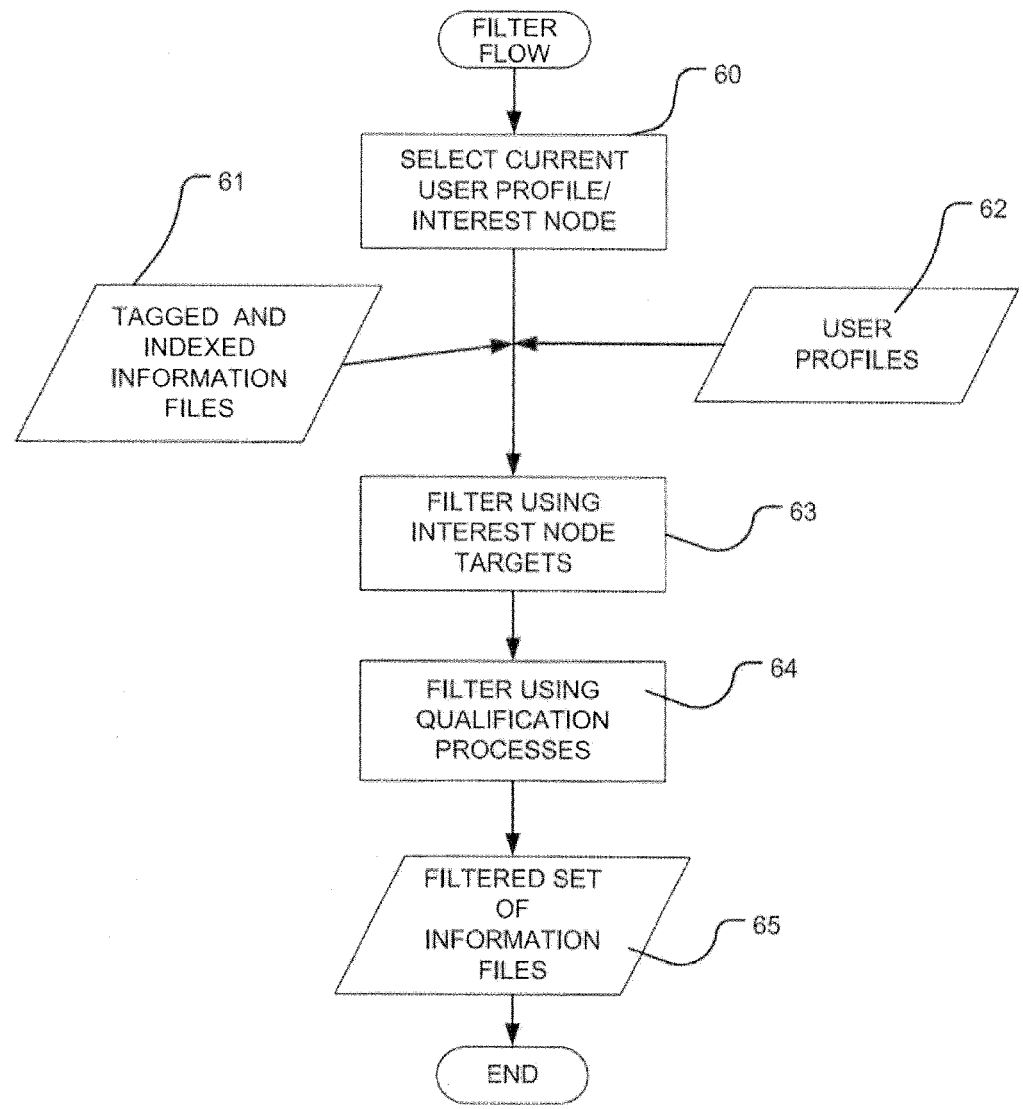
FIG. 9 is a simplified flowchart of a process for producing a filtered set of information files based on user profiles in an exemplary embodiment.

FIG. 9 is a simplified flowchart of executable structured instruction logic implemented by a computer program executed by a server for filtering the metadata and indexed information files in the database, which had been retrieved or delivered from a plurality of sources as shown in FIG. 1. The program begins by selecting a current user profile/interest node in response to a message received by a user, such as generated on completion of a user login protocol in which the user causes a message to be sent to the server selecting an interest node within the user's profile data structure (block 60). The metadata and indexed information files (block 61) and the user profile data structures (block 62) are read from the database or other computer storage. The metadata and indexed information files are filtered using the targets in the selected interest node of the current user profile data structure (block 63). Next, the information files that result from the first step of filtering are further filtered using a qualification process (block 64). Finally, the filtered set of information files is provided to a location in storage for use by following processes in a server (block 65).

Figure 10:
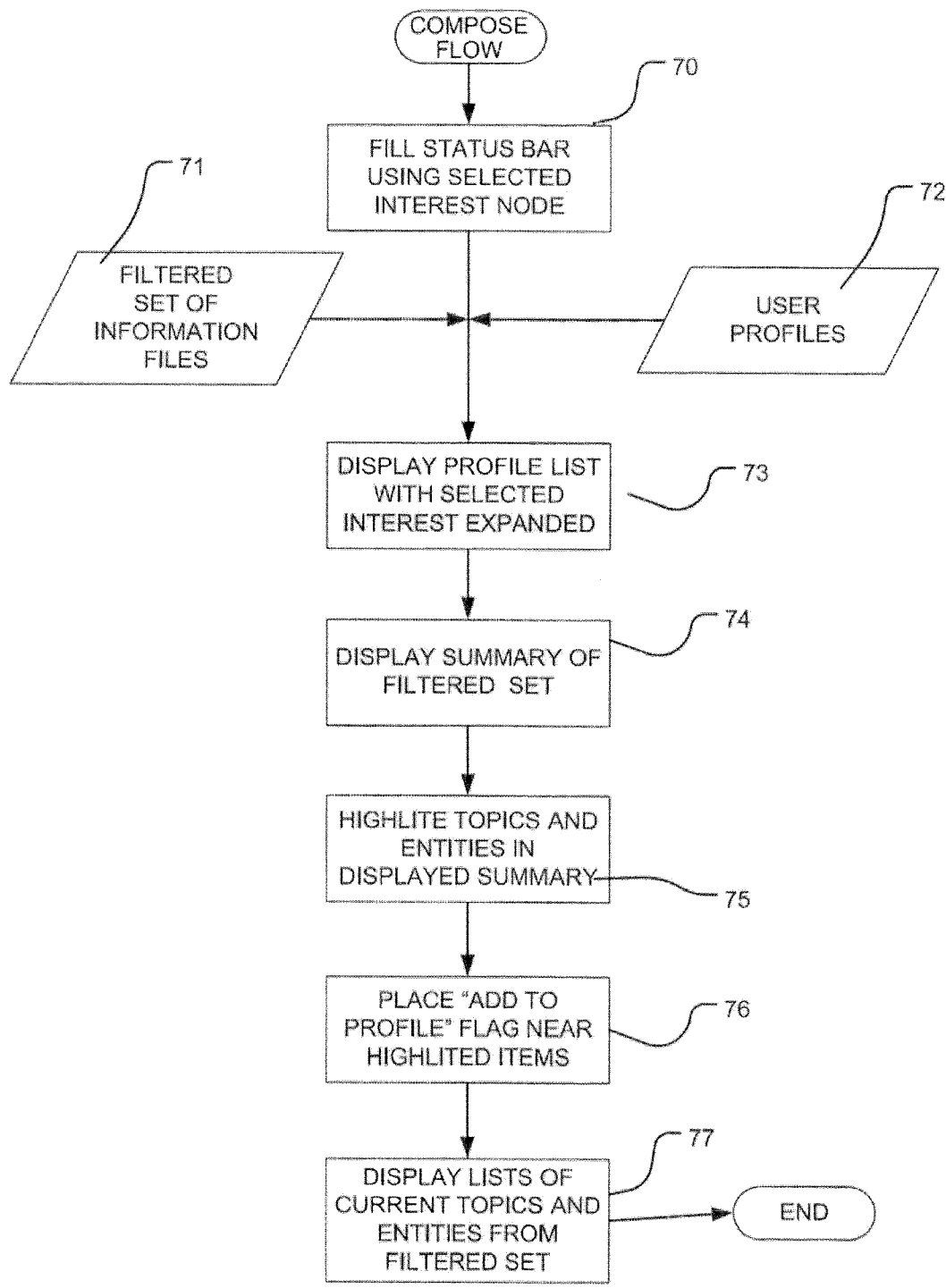
FIG. 10 is a simplified flowchart of a process used for composing an electronic document or presentation of the filtered set of information files and tools used for editing the open user profile.

FIG. 10 is a simplified flowchart of a logic structure implemented by a computer program such as a web application executed by a server for composing an instance of an electronic document to be used at a user terminal for rendition of a graphical user interface. The process begins by filling the status bar using a label for a selected interest node (block 70). The filtered set 71 of information files and the user profiles 72 are processed to provide a list of interest nodes from the user's profile data structure for display, in which the current selected interest node is expanded to show targets within the interest node (block 73). The filtered set 71 of information files is also filtered to provide a summary of the filtered set for display (block 74). Topic type attributes and entity type attributes in the displayed summary are marked up in a first technique by for example highlighting (block 75). In addition, the highlighted topics and entities are marked up in a second technique by placing an "add to profile" flag (up arrow in the Figures) adjacent to highlighted items (block 76). Next, the displayed list of current topic type attributes and current entity type attributes is extracted from the filtered set and presented in current topic and current entity panes on the interface (block 77).

Figure 11:
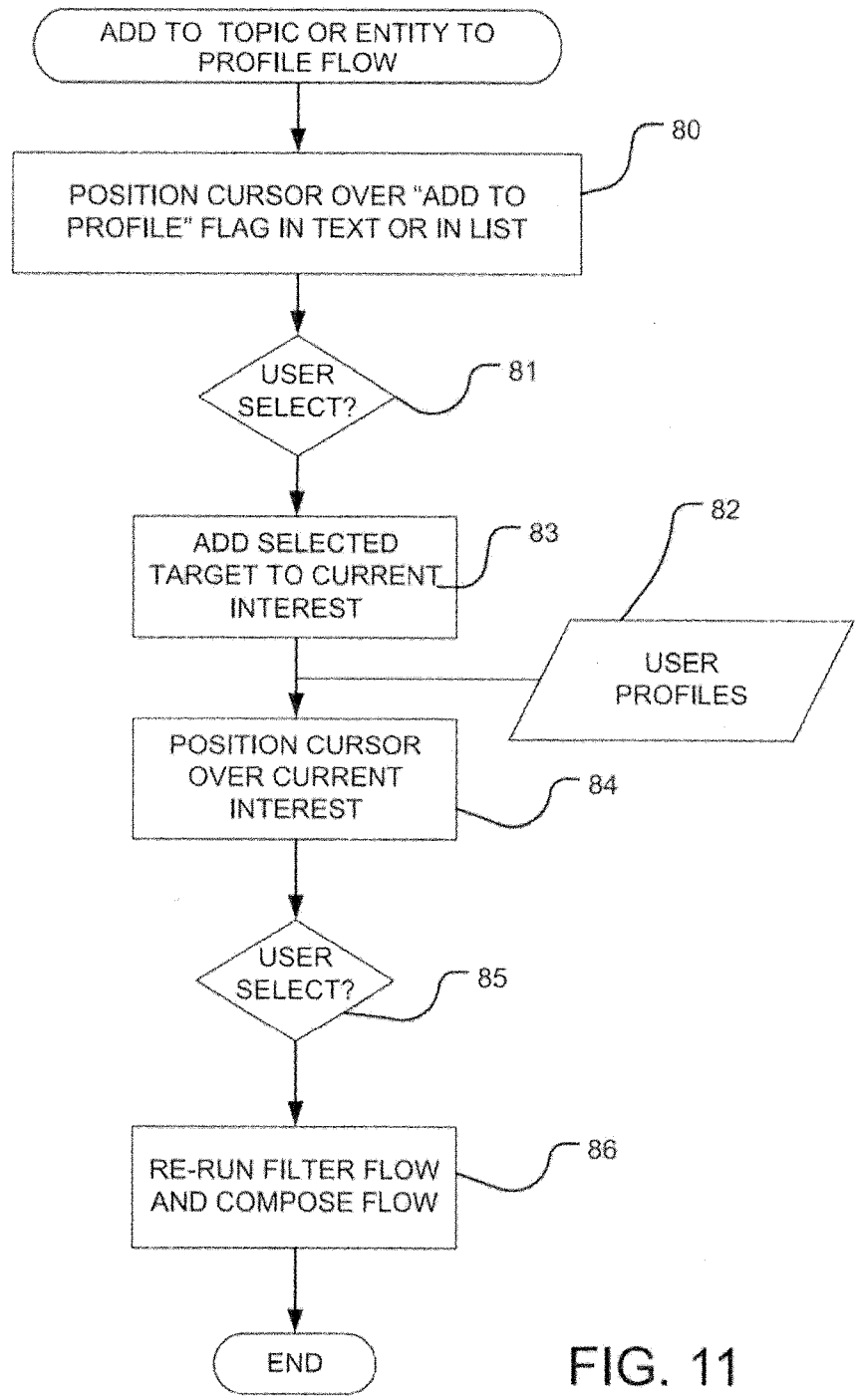
FIG. 11 is a simplified flowchart of a process used for adding a typed-attribute to an interest node using the tools presented by the executable document used for rendering the graphical user interface.

FIG. 11 is a simplified flowchart of logic implemented by a computer program executed by server 11A-C for adding a topic type attribute or entity type attribute as a target in an interest node in the user's profile data structure. The algorithm determines whether the cursor is positioned over mark-up, such as an "add to profile" flag, in the text or in a list on the graphical user interface (block 80), using a communication protocol such as HTTP by which a user terminal issues messages to the server indicating cursor positions. When the cursor is positioned over such flag, the algorithm determines whether the user selects the flag by clicking with a mouse or otherwise (block 81) using a communication protocol with the user terminal. If the user does select the flag, then the selected typed-attribute is added as a target in the user profile data structure 82 to the current interest node (block 83). Also, the algorithm determines (block 84) whether the cursor is positioned over the current interest node (or other interest node in the displayed list). If the user selects the current interest node by clicking a mouse or otherwise (block 85), the system re-runs the filter flow and the compose flow described above (block 86). In this manner, the filtered set of information files is updated in response to the most recent set of targets for the interest node. At step 83, the system automatically regenerates an instance of the graphical user interface to show the new target within the interest node on the display within a short period of time.

Figure 12:
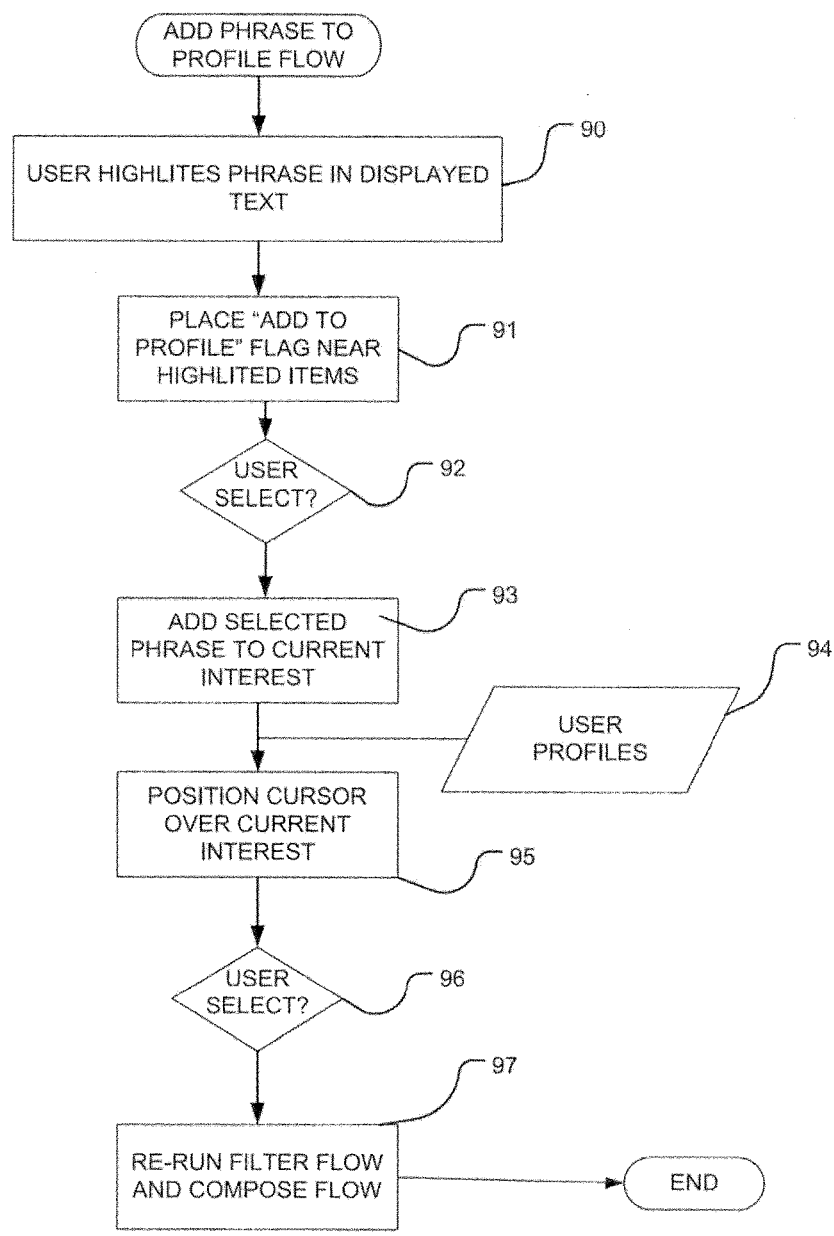
FIG. 12 is a simplified flowchart of a process used for adding a phrase to an interest node.

FIG. 12 is a simplified flowchart of logic implemented by a computer program executed by server 11A-C for adding a phrase to an interest node within a profile. In this flowchart, the system determines whether the user selects a phrase in the displayed text in the current instance of the graphical user interface (block 90). A click and drag mouse operation can be used to select a phrase for example. When the system detects that phrase is selected, the system presents a new instance of the graphical user interface with an "add to profile" flag near the highlighted phrase (block 91). The system determines whether the user selects the flag (block 92). If the user selects the flag, then the selected phrase is added as a target in the current interest node (block 93). The user profile data structure 94 is updated with a selected phrase. The system that determines whether the user is positioning the cursor over the current interest (block 95). If the user selects the current interest (block 96), then the system reruns the filter flow and the compose flow as described above.

Figure 13:
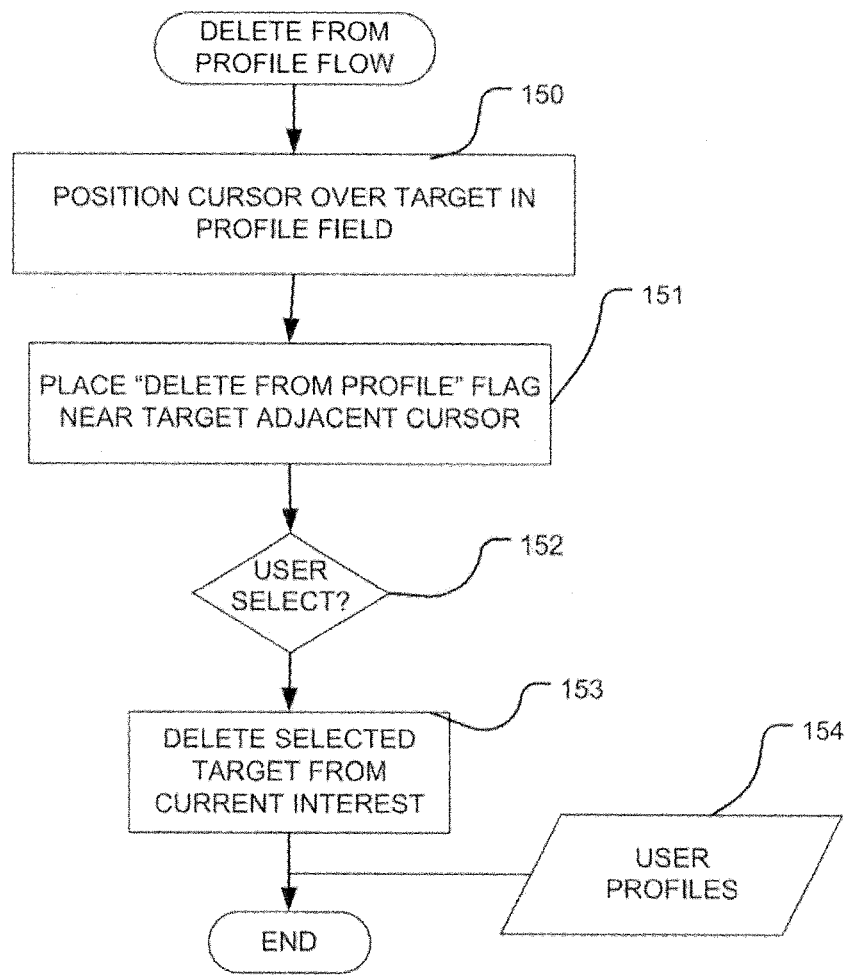
FIG. 13 is a simplified flowchart of a process used for deleting a target from an interest node using the tools presented by the executable document used for rendering the graphical user interface.

FIG. 13 is a simplified flowchart of logic implemented by a computer program executed by server 11A-C for deleting a target from an interest node in the user's profile. In this program, the system determines (block 150) whether the user is positioning a cursor over a target in the profile field (e.g. pane 105 in FIG. 4). If the cursor is positioned over a target, then the instance of the graphic interface is updated by placing a "delete from profile" flag (such as a down arrow) adjacent the selected target (block 151). If the user selects a "delete from profile" flag (block 152), then the selected target is deleted from the current interest (block 153). The user profile database 154 is updated to reflect the deletion. Also, the graphical user interface can be regenerated to present the updated list of targets for the user node.

Figure 14:
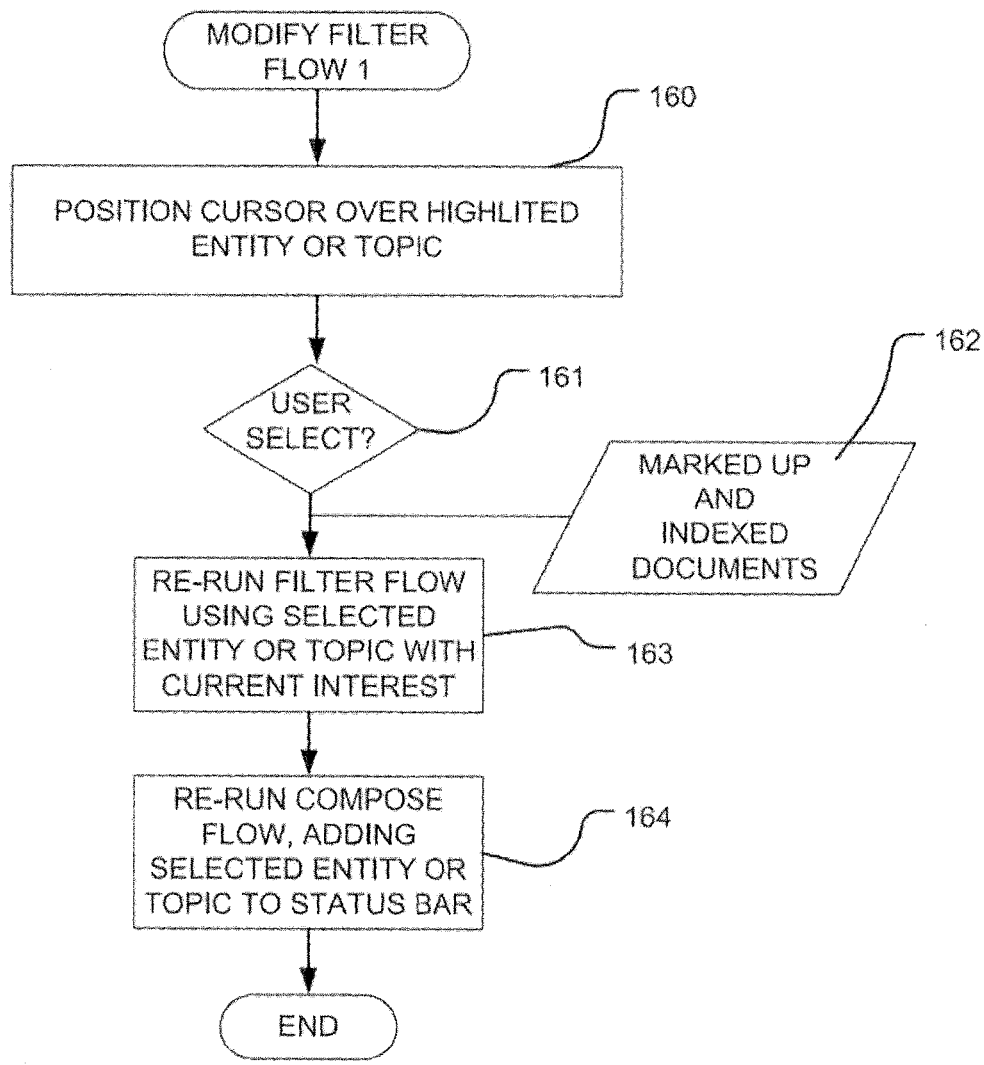
FIG. 14 is a simplified flowchart of logic executed during an interaction in which the user modifies the filtering process by selecting a typed-attribute not included in the interest node as a target.

FIG. 14 is a simplified flowchart of logic implemented by a computer program executed by server 11A-C during an interaction in which the user modifies the filtering process by selecting a target not included in the interest node. The program determines whether the user is positioning a cursor over a highlighted (or otherwise annotated) entity or topic (block 160). The algorithm determines whether the user selects the highlighted entity or topic (block 161). The algorithm reruns the filter flow using the tagged and indexed documents 162, the current interest node selected by the user, and the selected entity or topic (block 163). The algorithm also reruns the compose flow, adding the selected entity or topic to the status bar adjacent the label for the current selected interest node (block 164).

Figure 15:
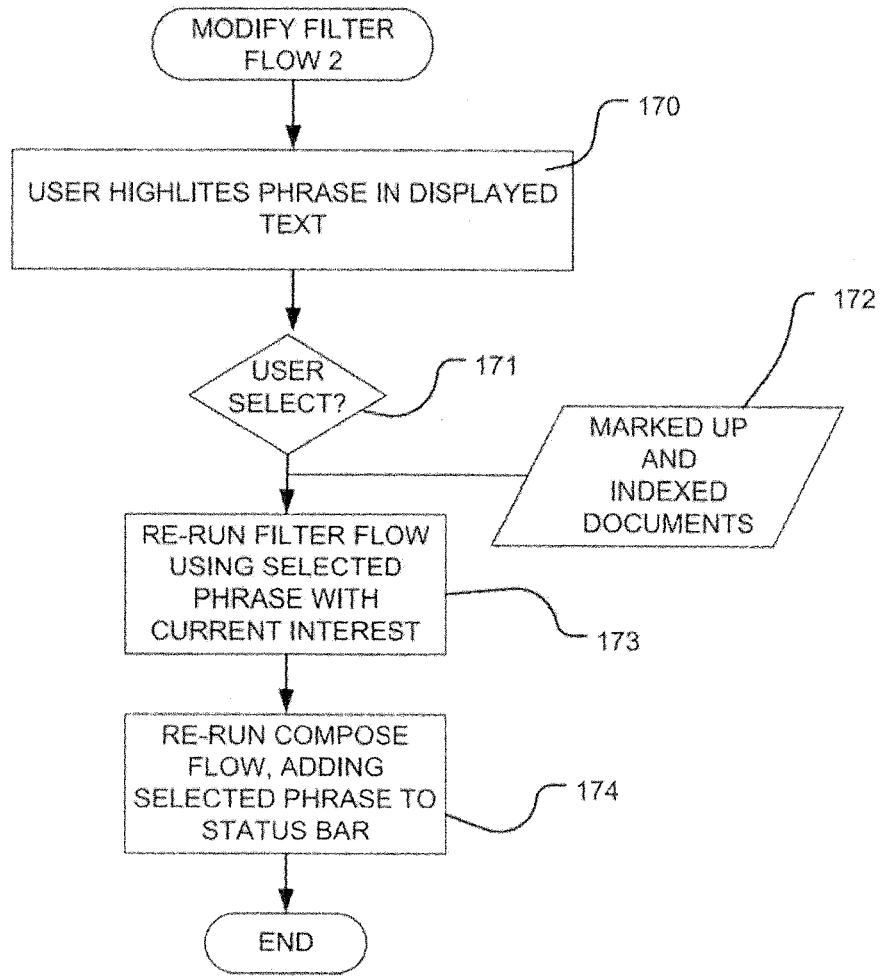
FIG. 15 is a simplified flowchart of logic executed during an interaction in which the user modifies the filtering process by selecting a phrase not included in the interest node.

FIG. 15 is a simplified flowchart of logic implemented by a computer program executed by server 11A-C during an interaction in which the user modifies the filtering process by selecting a phrase from text displayed on the current instance of the graphical user interface. The process begins by determining whether the user is highlighting a phrase in the displayed text (block 170). Next, the process detects whether the user selects the highlighted phrase by clicking a mouse or otherwise (block 171). The algorithm reruns the filter flow (block 173) using the tagged and indexed documents (block 172), the current interest node selected by the user, and in the selected phrase. The algorithm also reruns the compose flow, adding the selected phrase to the status bar adjacent the label for the current selected interest node (block 174).

Figure 16:
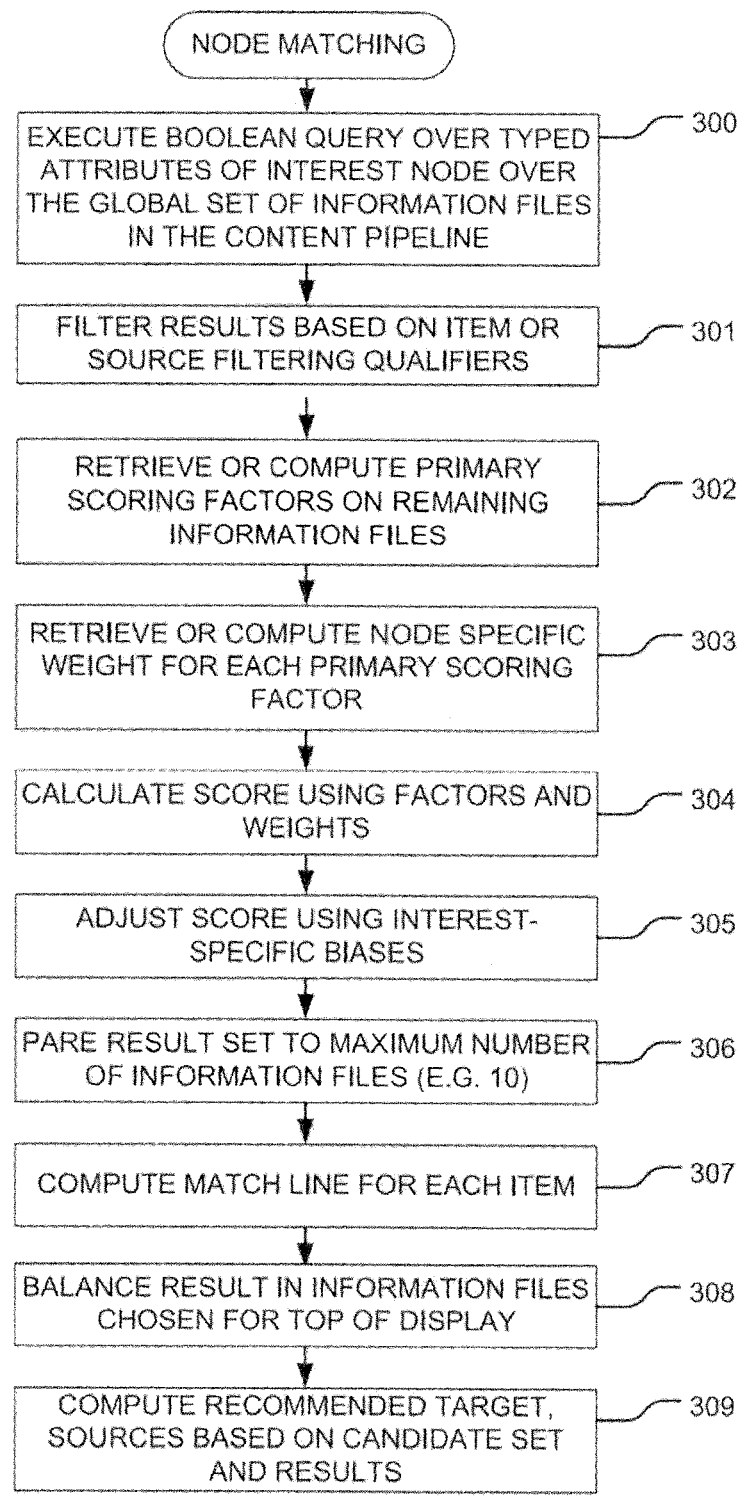
FIG. 16 is a simplified flowchart of a process for producing a filtered set of information files for based on a particular interest node.

FIG. 16 illustrates a more detailed example of an algorithm executed by logic implemented by computer programs in the personalization engine for producing a filtered set of information files for an interest node, referred to as node matching. The procedure includes generating a candidate set of information files by producing a Boolean query over the sources and targets in the information node with "boosts", and then executing the query using a traditional search engine to produce the candidate set (block 300). Typically, up to 100 strong candidate information files, referred to as items in the description of this algorithm, are generated using this step. Next, the candidate set is filtered based on item or source filtering qualifiers (block 301). An item qualifier may include a time window or item genre for example. Source qualifiers may include source type attributes, source ranking attributes, source provenance, i.e. whether the source is local or global, and so on. Next, a score is computed for each item. This involves retrieving or computing primary scoring factors for each item (block 302). Primary scoring factors may include search relevance that can be implemented by traditional content relevance factors returned by search engines, authority based on the characteristics of the item and the source of the item, popularity based on external and internal data relating to the item the amount of traffic associated with it, and recency based on the date of publication of the item. Next, a node-specific weight is retrieved for each primary score factor (block 303). These weights may be assigned by the user with qualifier attributes, or provided by the system. A score is then computed using the factors and weights for each item (block 304). Next, the score for each item is adjusted using interest-specific biases including for example a user preference related to sources which can cause increase or decrease of the weight, the publishing period for the source (i.e. is it daily, monthly etc.) and source depth or breadth biases (block 305). The results set is pared by selecting up to a maximum number of items (e.g. 10) based on the scores (block 306). Using the pared set, match lines are computed for each remaining item (block 307). The match line is meant to help the user understand an item and why it is returned for the interest node. The match line consists of targets and qualifiers that may be salient to the item, and to discriminate the item from other results. Next, the pared set of items is analyzed to balance the results to be chosen for the top of the display. Thus a new result score is computed based on balancing factors including recency, liveliness and diversity, in a manner that avoids conflict with the qualification processes produced using the interest node qualifiers (block 308). Based on the balancing score, the results are rearranged to increase the result score for the top 3 items in the list. Liveliness factors and diversity factors can include aspects of content and source diversity based on item and source metadata. As a final step in the node matching process of FIG. 16, the pared set of items is processed to compute recommended targets and sources (block 309). The pared set of items is stored in a cache as a filtered set of information files to be returned in response to a request for a "channel" display of files related to the interest node, or an "overview" display of files related to an entire interest profile.

Figure 17:
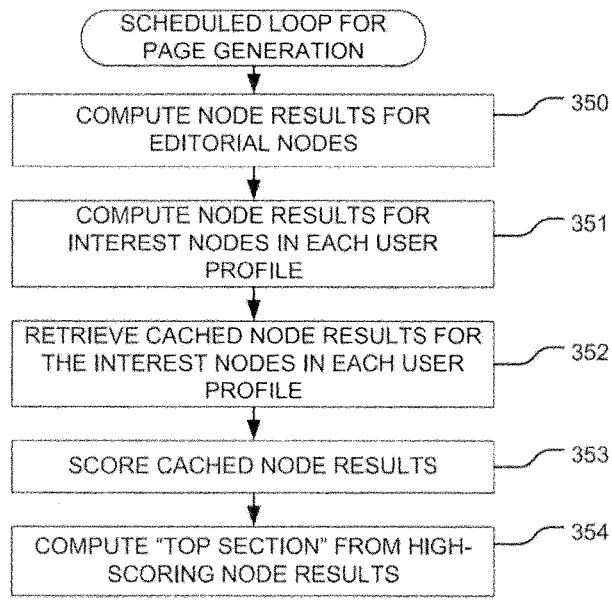
FIG. 17 is a simplified flowchart for process executed by a personalization engine for computing cached sets of information files to be used for the generation of the pages requested by a user.

FIG. 17 illustrates one example of a scheduled loop process used for page generation. The process begins by computing node results for editorial nodes. Editorial nodes are nodes provided by the server for general interest news for display on overview pages or other types of pages (Block 350). Editorial nodes are processed using the node matching algorithm of FIG. 16. Next, node results are computed for interest nodes in each user profile using the process of FIG. 16 (block 351). This involves computing a node result and storing it in a cache with metadata indicating the title, source, and date, the article summary in general and node specific forms, the match lines are computed by the node matching process, and typed-attributes corresponding to the targets are annotated within the summary and title. Next, a front page is generated for each user. This involves retrieving the cached node results for each interest node in the user's profile (block 352). Then each item in the cached node result set is scored based on the result score described above in connection with the node matching algorithm, based on numbers of files that currently match the node relative to trailing typical numbers in a way that highlights new activity related to the interest node, user activity level on interest node, activity level across other users in related channels, and editorial data indicating importance of the contents (block 353). Finally, a "top section" is computed from the high-scoring node results in which the top few items are identified (block 354).

Figure 18:
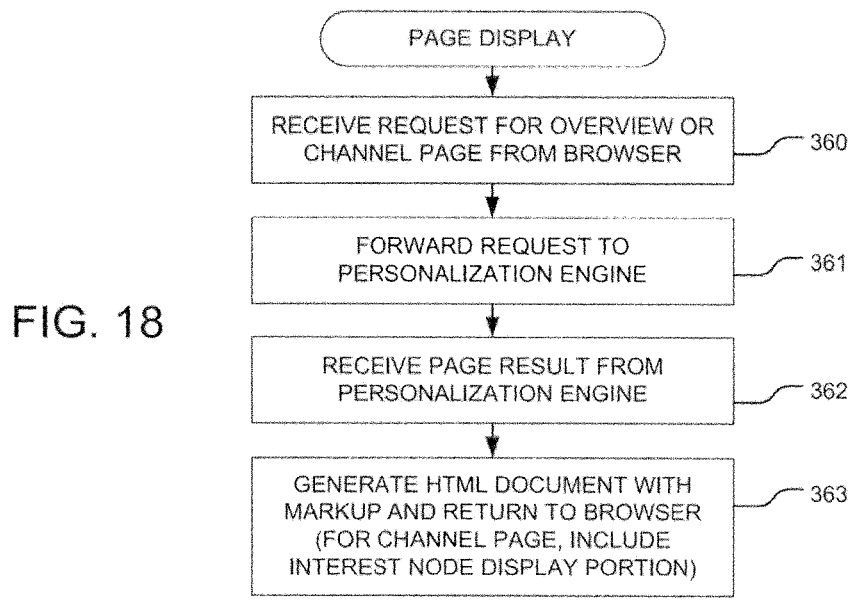
FIG. 18 is a simplified flowchart of a process used for producing electronic document can be rendered by a browser at a user terminal, in response to specific request for page by the user.

FIG. 18 shows one example of a page display process executed by a web application supporting the personalization engine. In this process, the web application receives a request for an overview or channel page from the browser (block 360). The web application forwards the request to the personalization engine (block 361). The personalization engine returns a page result produced using the page generation process (block 362). Finally, the web application generates an HTML document or other executable document used for rendering the display, with markup as described above, and returns the document to the browser (block 363). The markup in the document is customized for the type of page display. For example, in a channel page, the markup can include an interest node display portion to allow the user to see and edit the interest node as described above. Other elements of the document include the navigation bar, login buttons, search boxes and so on. Examples of the markup elements included in the electronic document defining the graphical user interface are shown in FIGS. 3-8 above.

Technology for open profile personalization for content delivery is provided that enables the users to leverage more sophisticated content analysis than possible and prior art, by surfacing various kinds typed-attributes of the information files and of sets of information files. The typed-attributes are used as arguments in a plurality of procedures to filter and rank information files.

Channel sharing is achieved by supporting a number of different Channel Use Cases, including:
  Personal Channels which can support broad and deep interest with all user activity kept private;
  Collaborative Channels that can be shared among people in personal, social, or professional groups;
  Editor/Power User Guided Channels in which channel owners(s) control the filter function and can actively curate the flow;

Popularity-based Channels that provide tuning and flow automatically; and

Collaborative Filtered Channels provide "filtering" within nodes based on statistics over aggregate clickstream within the channel.

More particularly, Personal Channels are strictly personal to the user in that each user's activities are kept private by precluding access by other users. However, Personal Channels can be converted to Collaborative Channels and/or can be updated as are Popularity-based Channels and/or Collaborative Filtered Channels.

Collaborative Channels provide access by a group of users and further allow for the editing or updating of the channel by any member of the group. These channels are advantageous for communicating relevant information to groups of users having similar interests.

Editor/Power User Guided Channels allow a particular user or users, known as owner(s), within a group to filter or curate the flow of information. A non-owner user of the channel may modify the channel to create his or her personal channel and still receive the filtered and curated content of the pre-modified channel in accordance with the owner(s) actions.

Popularity-based Channels update channels with information that has been determined to be popular based on popularity factors which include: (1) item external popularity, e.g. aggregate data obtained from other sources; (2) item internal popularity, e.g. based on actions by users with the system; and (3) the number of sources covering the event.

Collaborative Filtered Channels determine content and information based on the aggregate statistics of the clickstream within the channel, e.g. the counted number of clicks an item or event obtains within a given period of time. The aggregate statistics measured can be liveliness factors which can include, for example, source liveliness rank, item funness, and item potential viral-ness.

The machines are adapted to execute programs, and to compose and deliver executable documents in support of channel sharing as shown in FIGS. 19-44.

Figure 19:
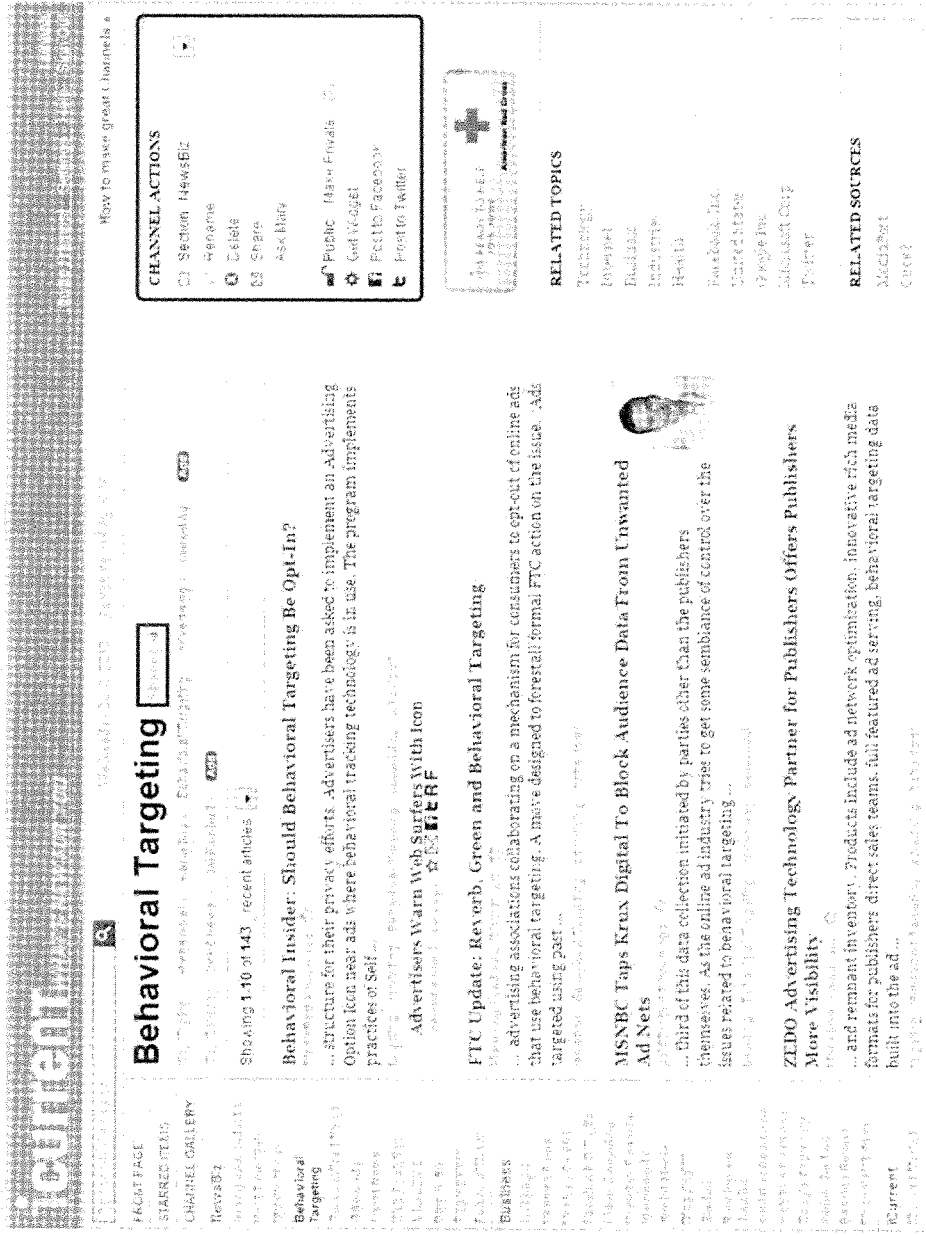

FIG. 19 is a screen shot of a Behavioral Targeting shared channel. As can be seen, there is the notation "Sharing" adjacent to the channel title and along the right rail under the heading "CHANNEL ACTIONS" there is a share command. By clicking on the "Share" CHANNEL ACTIONS command more users can be invited when the pop-up screen for inviting a user appears, as shown in FIG. 20.

Figure 20:
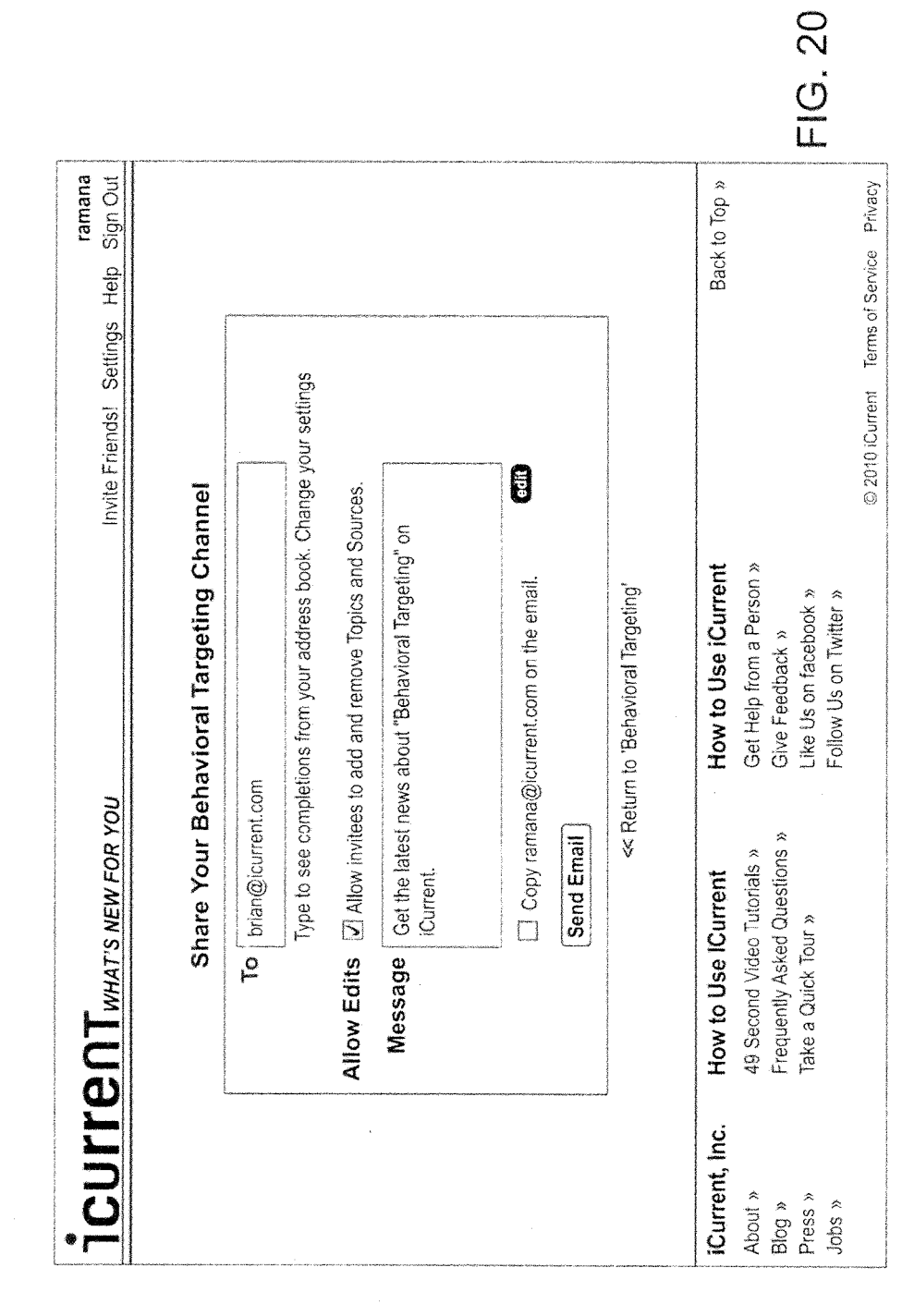
Figure 21:

The invite user screen shown in FIG. 20 allows input from an address book of linked email accounts and the invited user can be authorized to modify the channel by clicking the "Allow Edits" box on the screen. A personal message can be sent to the invitee via the "Message" box and a copy of the invitation email can be sent to the user issuing the invitation by clicking on the box at the bottom of the "Message" box. FIG. 21 is an updated screen shot showing that the invitation has been sent to the email address entered into the invite user screen.

FIG. 22 is a screen shot that appears if the Share CHANNEL ACTIONS command is clicked again for a shared channel. In this screen all users are listed that share the channel and a box is provided adjacent to the name of each user for allowing the channel owner to selectively provide the editing function each of the named users. The editing function allows topics to be changed but other rights can also be conveyed.

Figure 23:
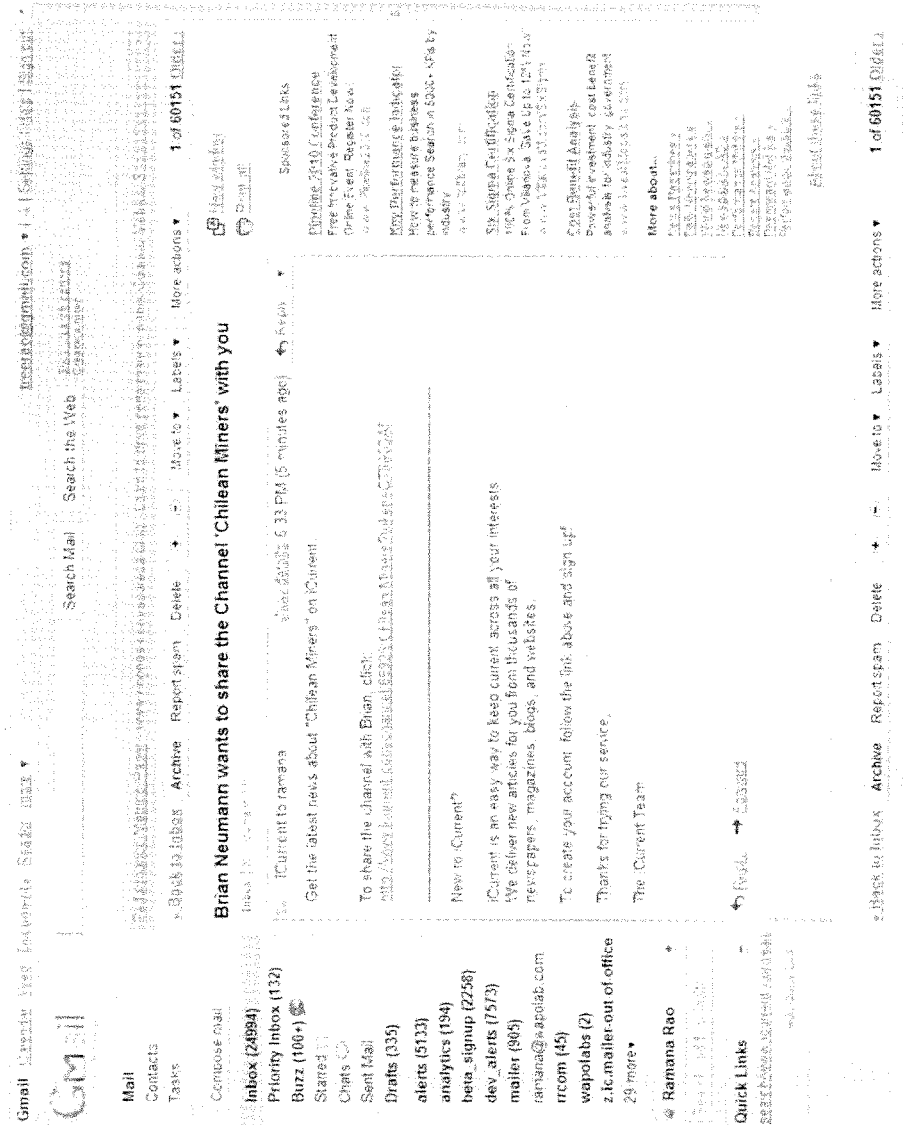
Figure 24:
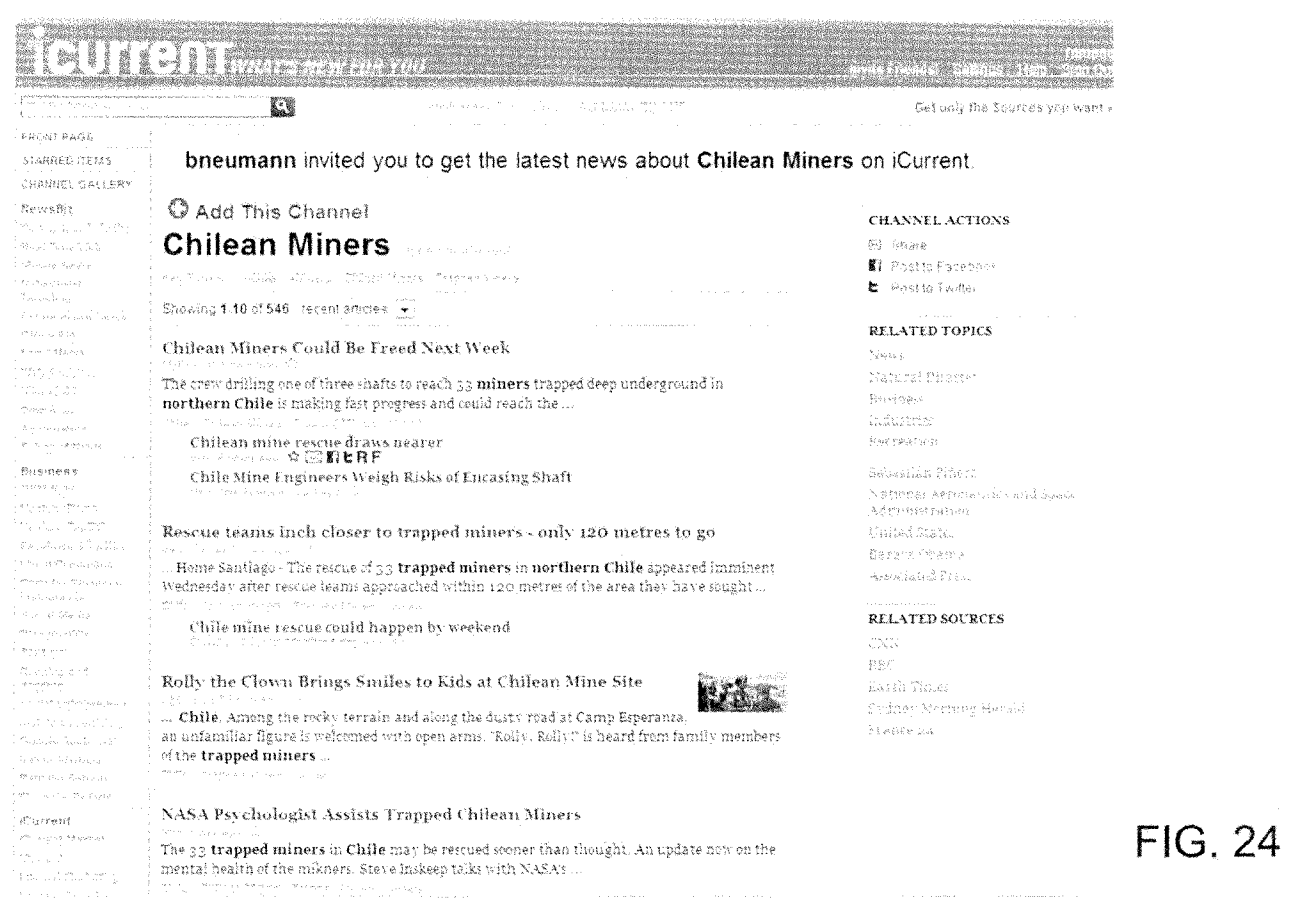
Figure 25:
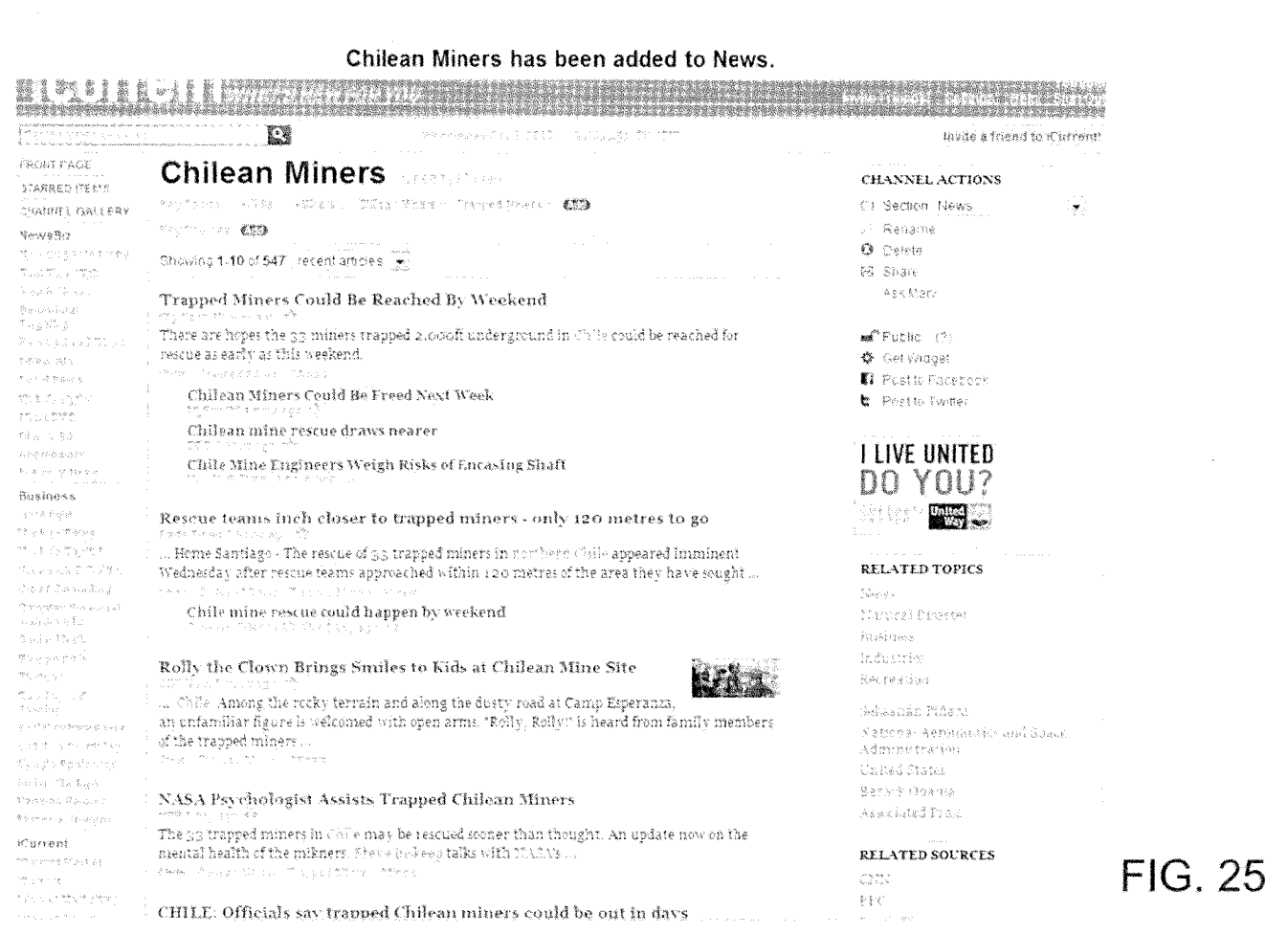

FIG. 23 is a screen shot showing an example of an invitation sent to an invited user of the channel. As shown in FIG. 23, the invited user is instructed to click the provided channel link to accept the invitation to share the channel which results in the invited user having the channel on site. As shown in the screen shot of FIG. 24, the invited user is shown the channel before it is added by the invited user and by clicking the add (+) button leads to adding the channel as shown in FIG. 25.

Figure 26:
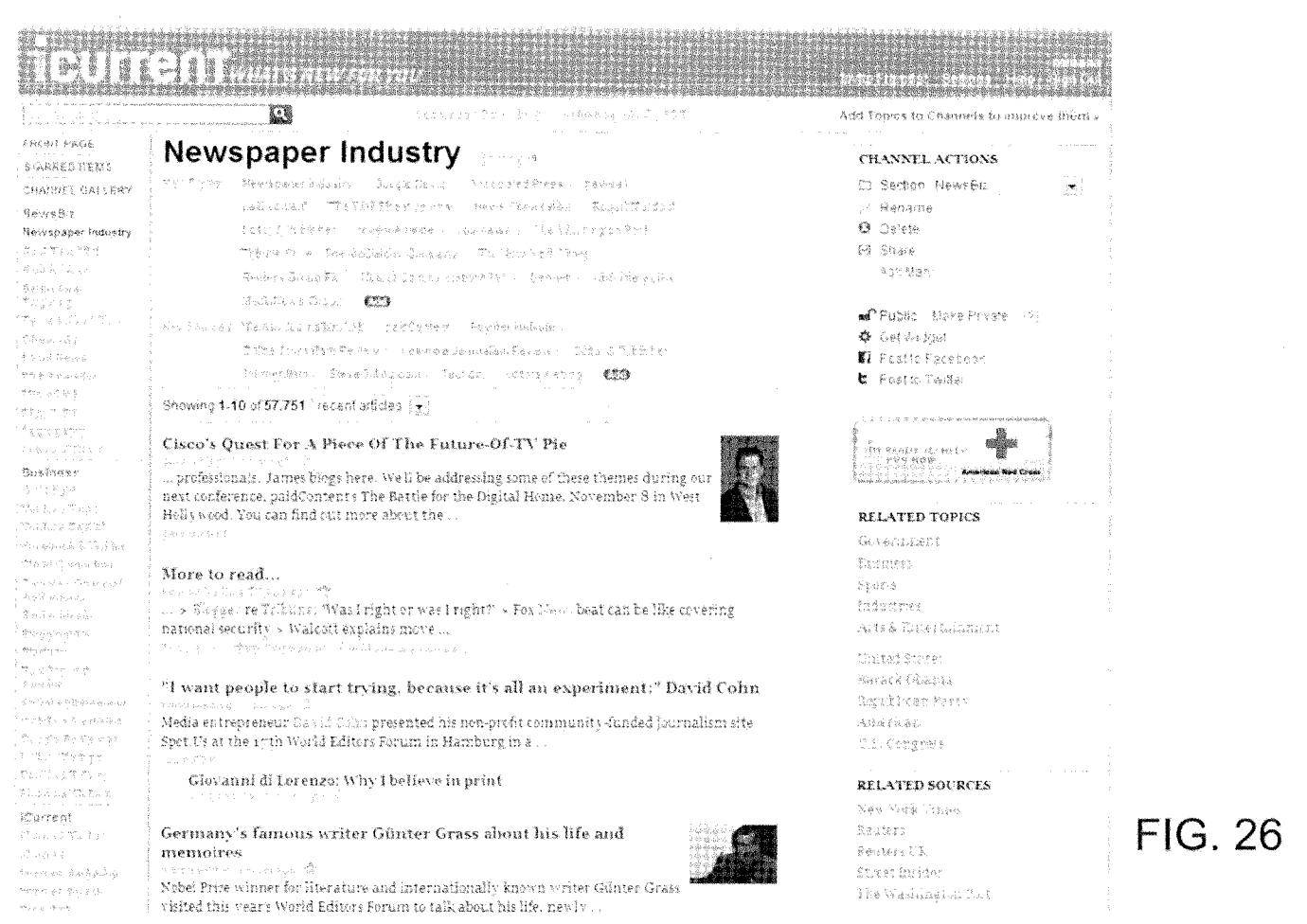
Figure 27:
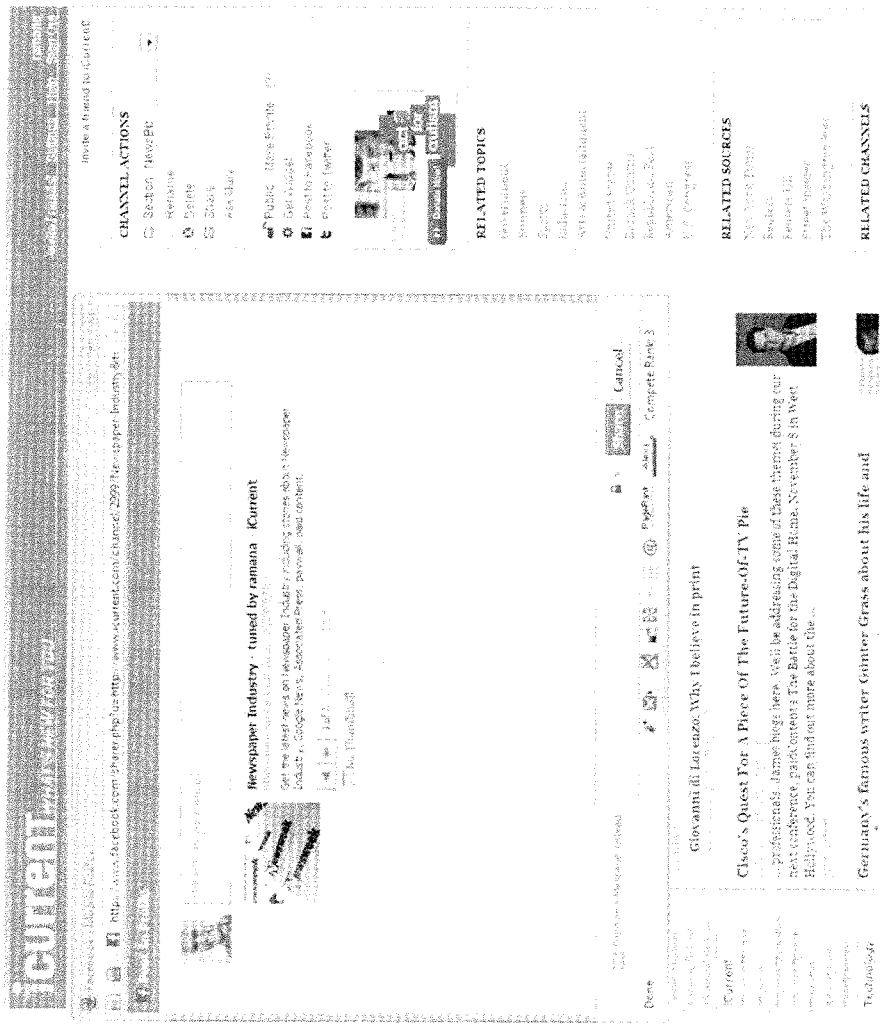

In addition, a personal channel can be made public and distributed in various ways. For example, as shown in FIG. 26, a personal channel which happens to have been shared has also been made public through CHANNEL ACTIONS in the right rail. The channel can be made private again by taking the Make Private action under CHANNEL ACTIONS in the right rail. As shown in FIG. 27, the channel can also be posted to Facebook, and from that link anybody can follow it.

FIG. 28 shows a function in which a user can set up a "widget" which is web code that can be incorporated into most blog packages by a majority of serious bloggers to include results of a channel in their blog pages. As shown in FIG. 28, the screen allows for adjusting the presentation and provides a preview of the widget in the window on the right side of the screen.

Figure 29:
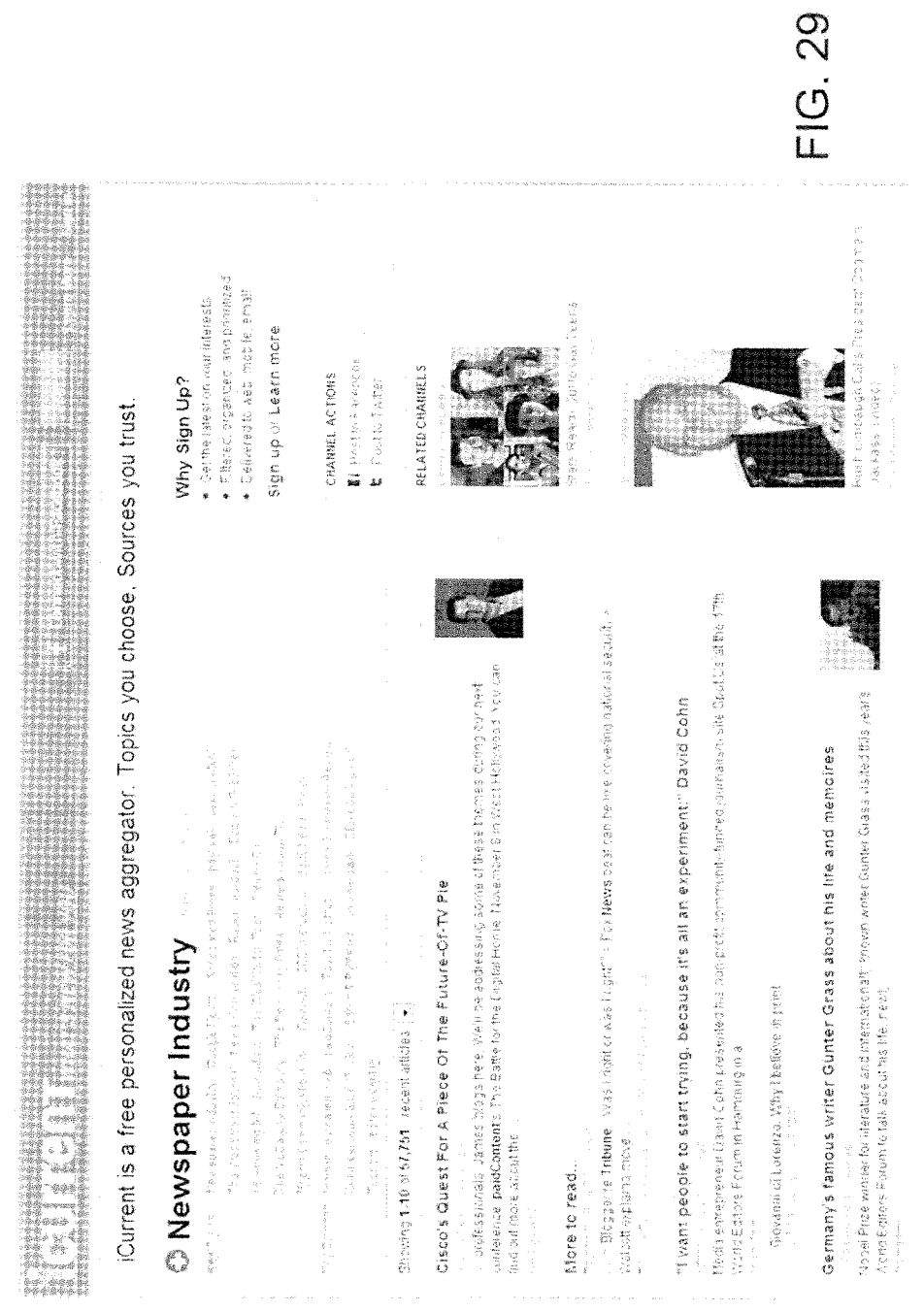
Figure 30:
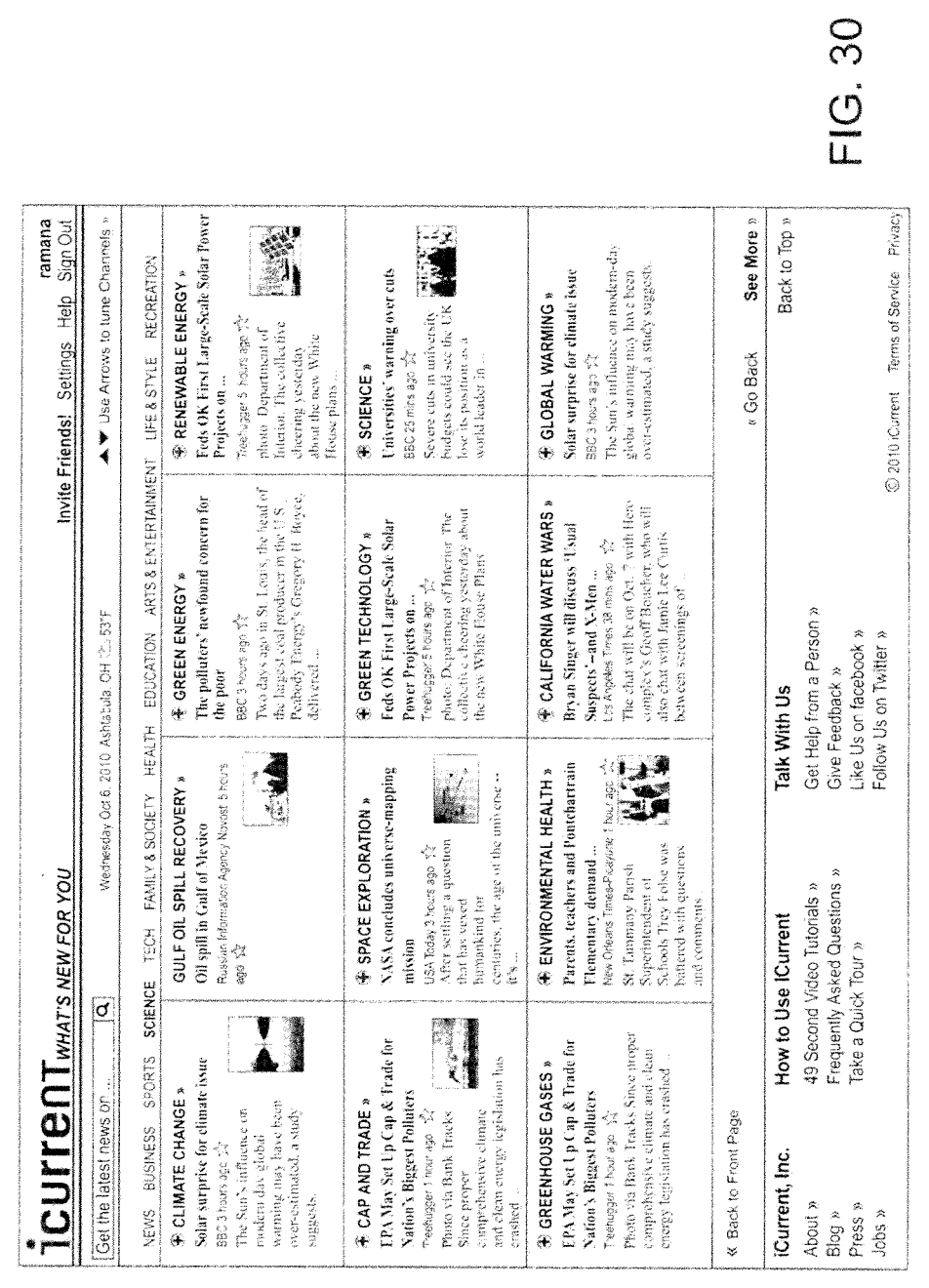

FIG. 29 depicts a channel that is public on the "icurrent" site so that it can be discovered through a search or links to that page as they appear anywhere including on the web or in email or twitter. FIG. 30 illustrates that the site can show a gallery of public pages and currently shows all the channels curated by, for example, icurrent editors, but the display could also include public channels provided by other users.

Figure 31:
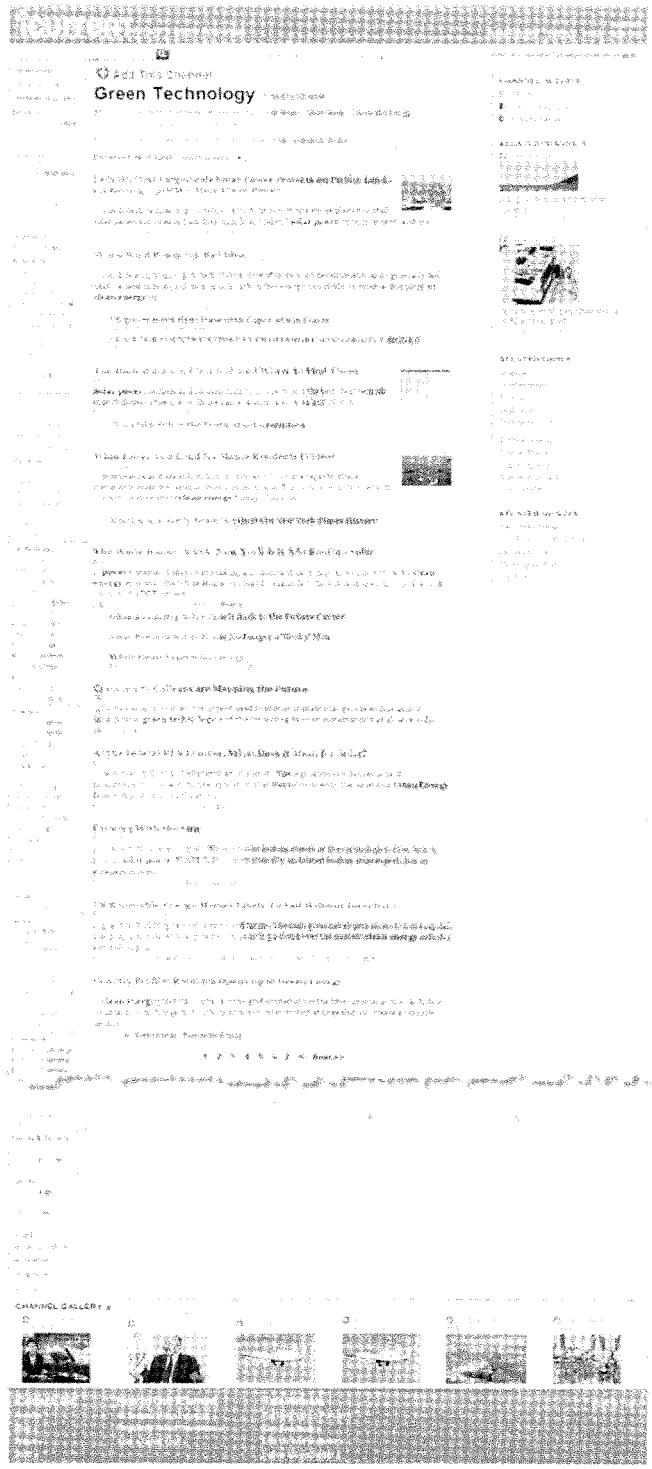
Figure 32:
Figure 34:
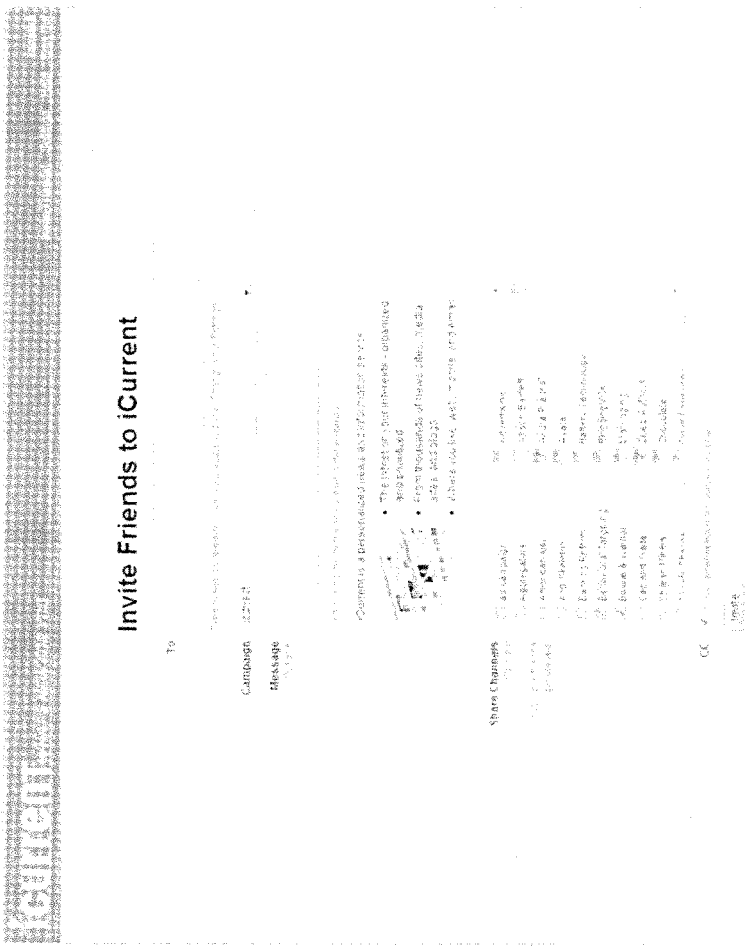

FIG. 31 shows an example of viewing a public channel in the gallery while logged in and FIG. 32 shows the same channel while not logged in. FIG. 33 shows another section in the gallery. FIG. 34 shows that a user can invite another person to icurrent with a whole set of other channels to get the invitee started.

Figure 35:
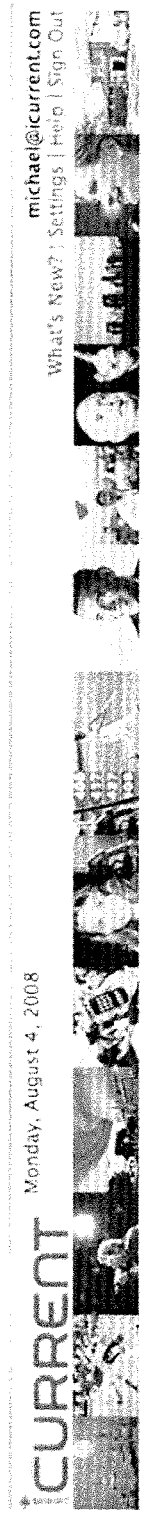
Figure 36:
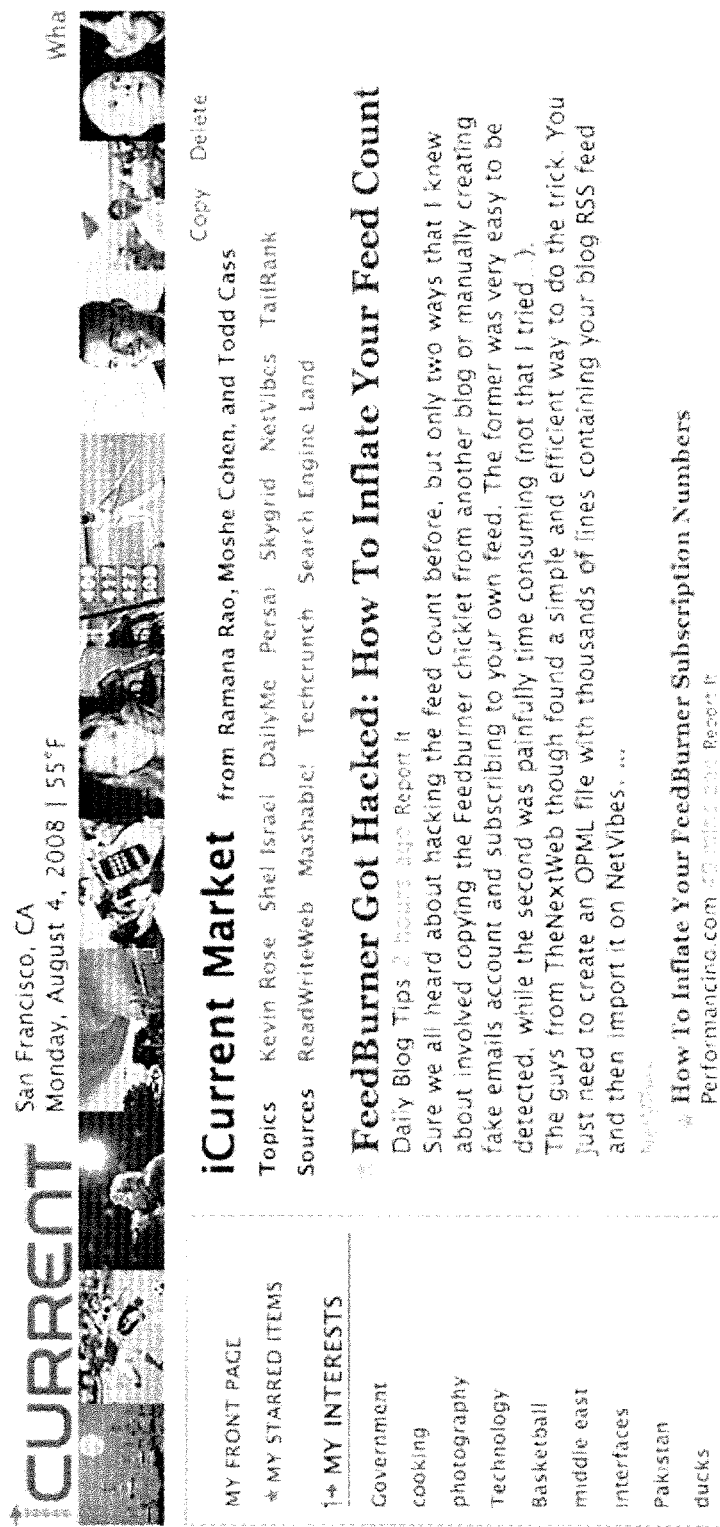

FIGS. 35-43 are images of alternative views of web pages rendered according to implementations of various aspects of the technology. More particularly, FIG. 35 shows a screen for sharing the interest "ducks" and FIG. 36 shows a screen of shared topics from identified sources.

Figure 37:
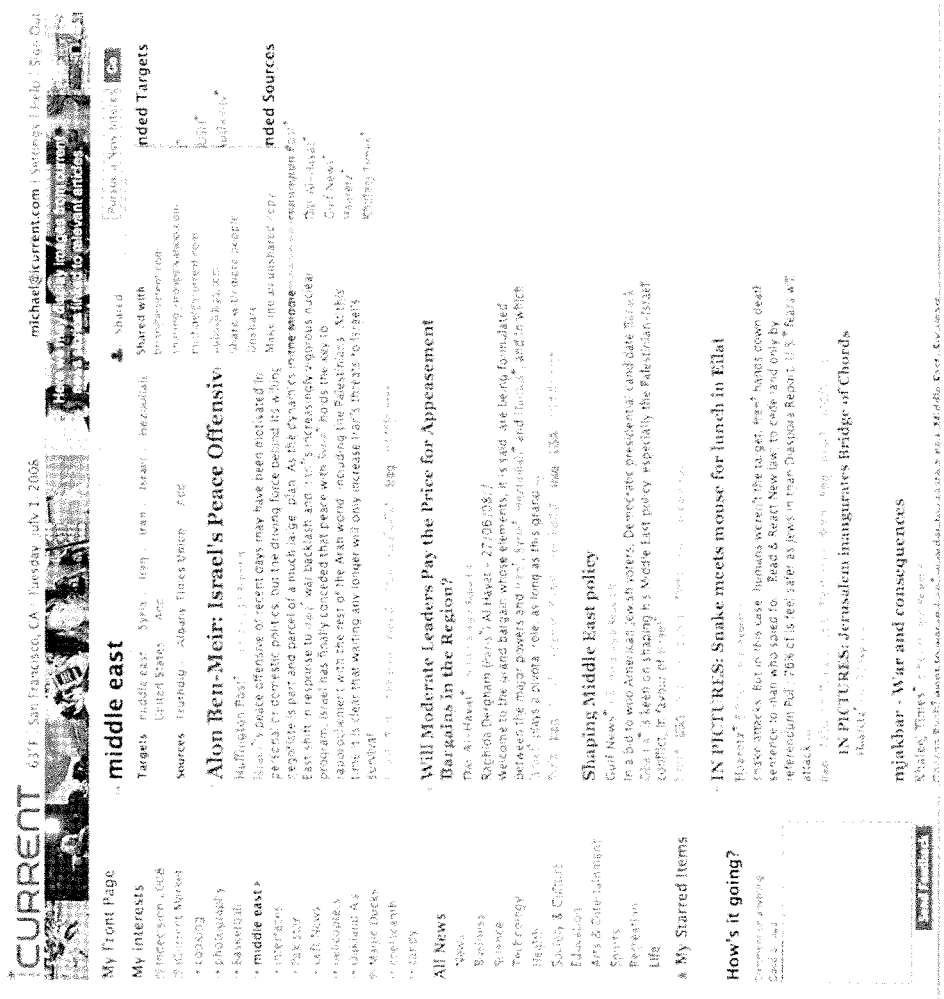
Figure 38:
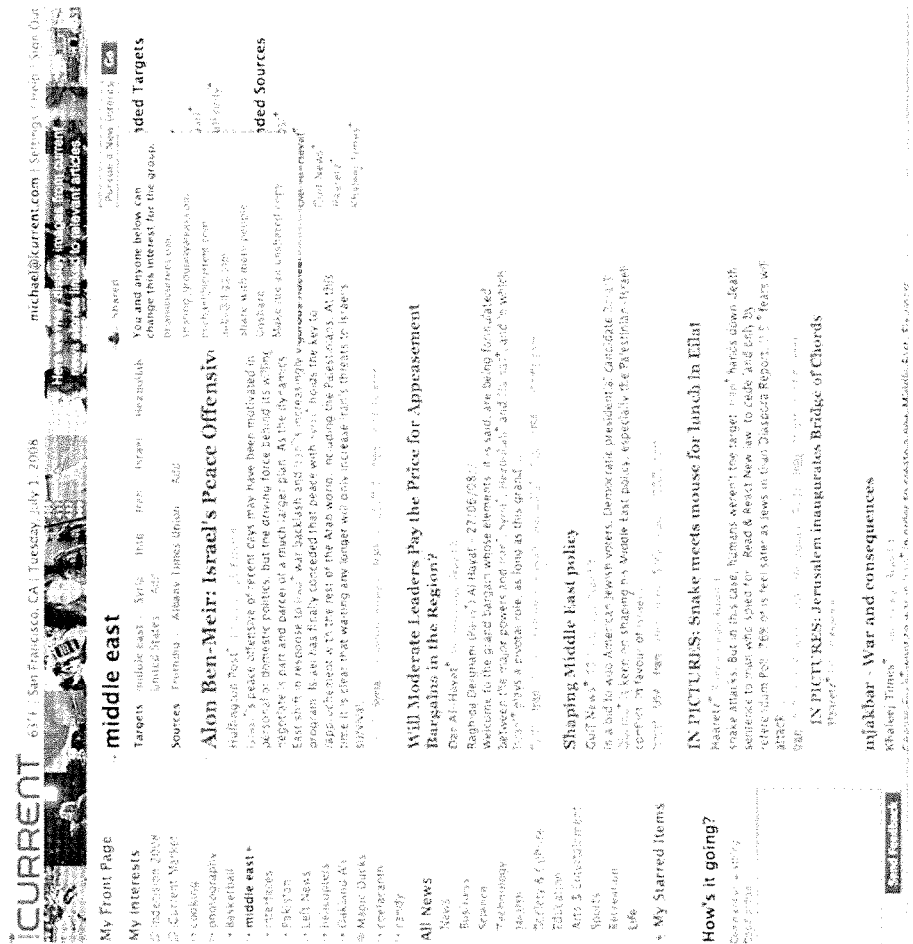
Figure 39:
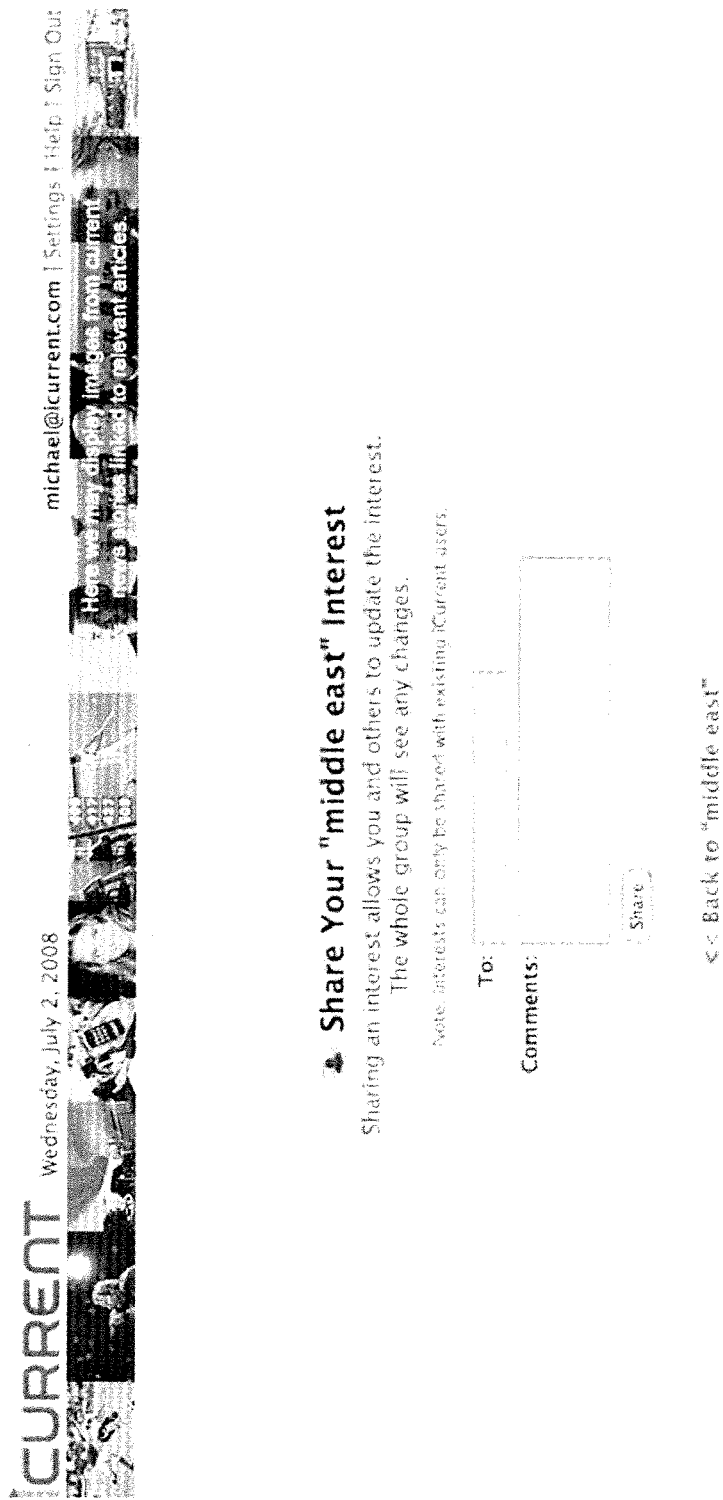

FIG. 37 shows a shared channel with the topic "middle east" where a drop down box indicates with whom the channel is shared. FIG. 38 shows a second drop down box for the channel "middle east" in which those users with editing capability are identified, and FIG. 39 shows a screen for sharing the "middle east" interest with additional users.

Figure 40:
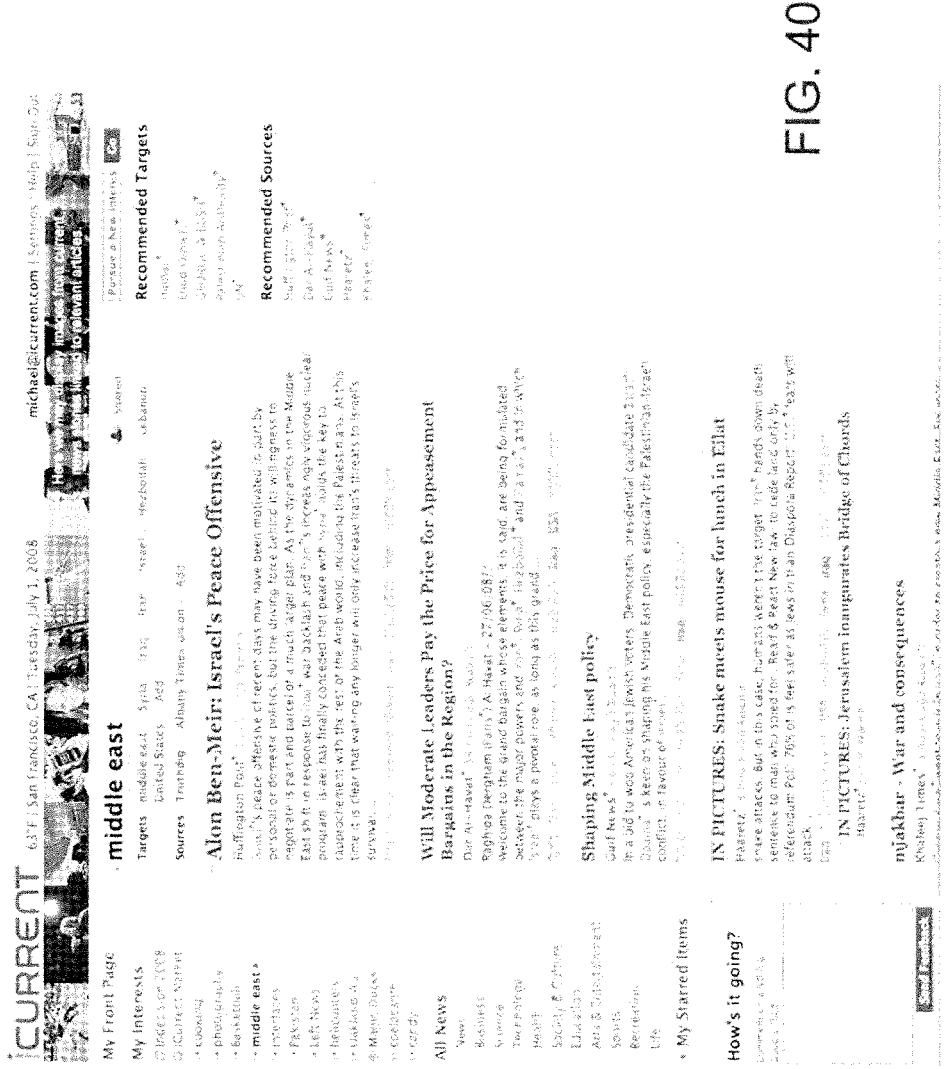
Figure 41:
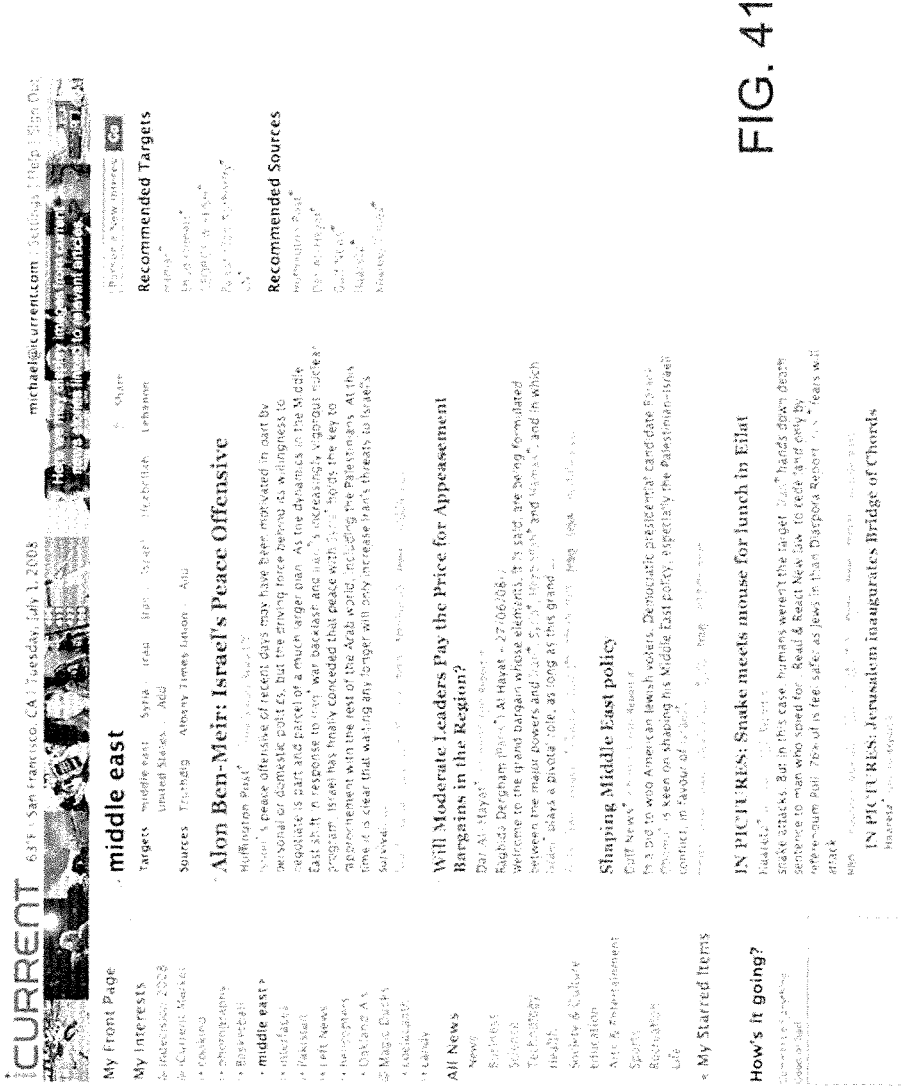

FIG. 40 shows the "middle east" target with identified "Recommended Targets" and "Recommended Sources" and has a "Shared" icon in the title block which indicates that the channel is shared. FIG. 41 shows the same web page as FIG. 40, but with a "Share" icon in the title block which indicates that the channel is not yet shared.

Figure 42:
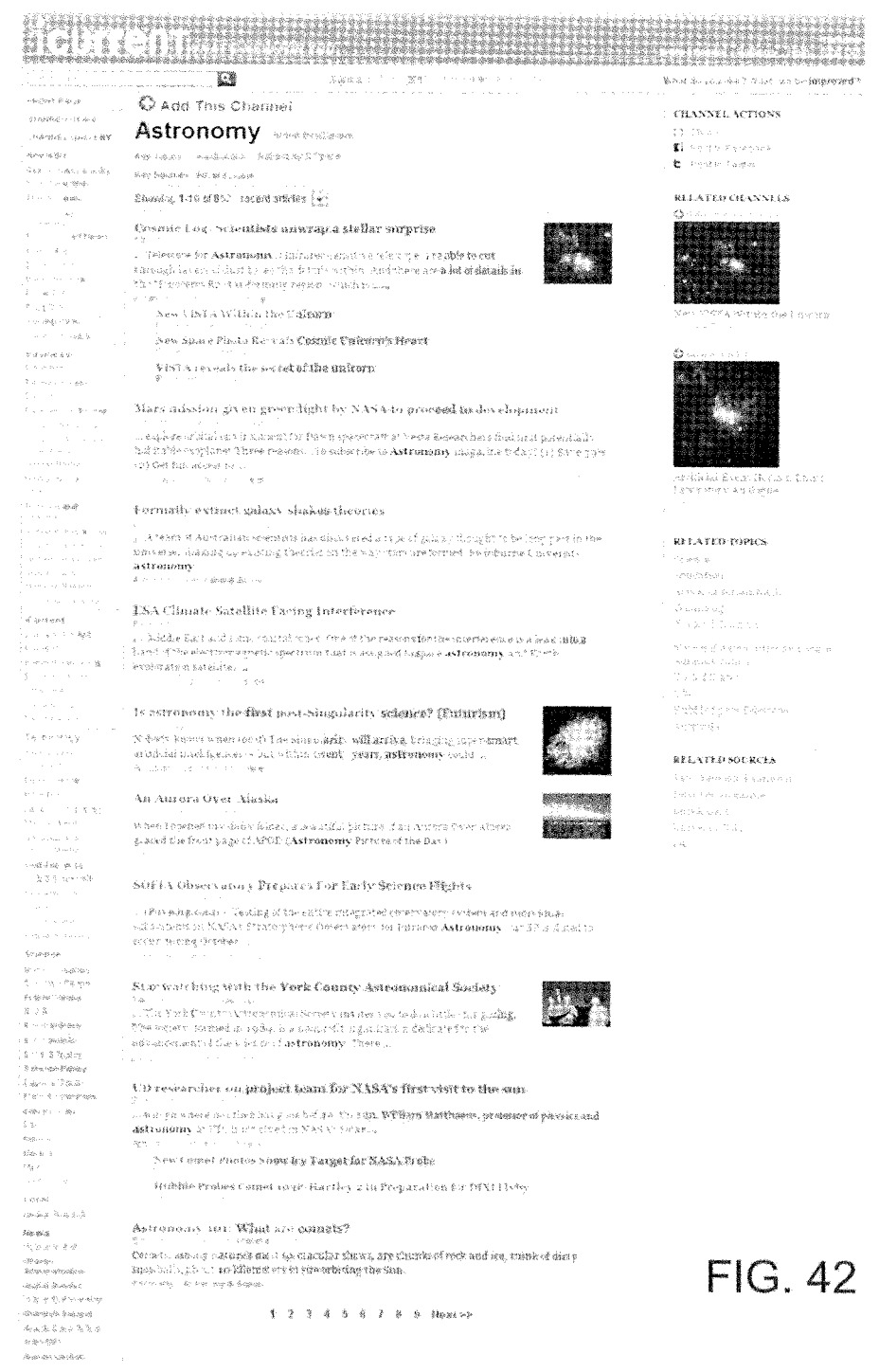
Figure 43:
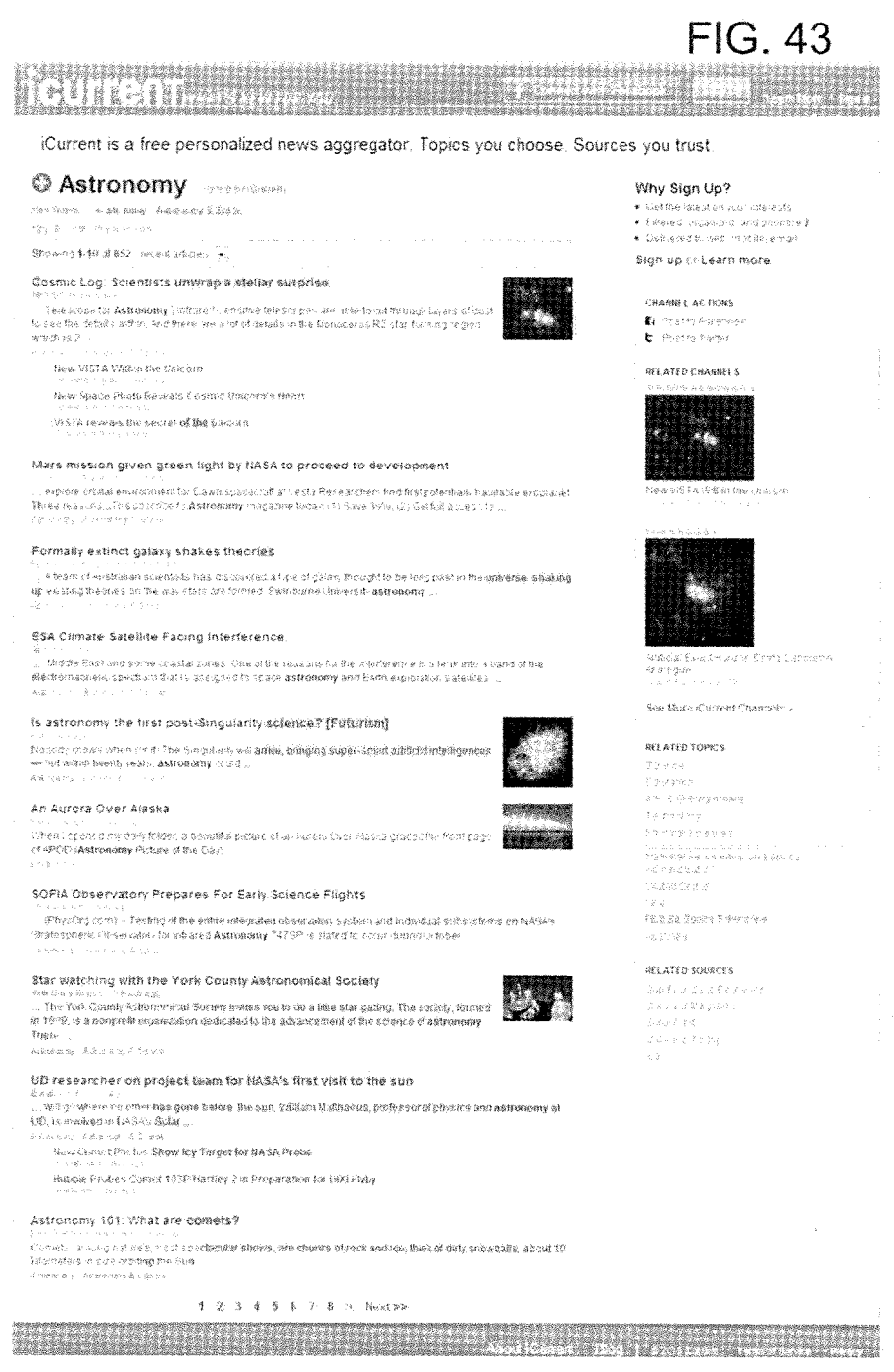

FIG. 42 shows a user logged in to channel "Astronomy" and FIG. 43 shows a screen for inviting a user to login to "Astronomy."

FIG. 44 shows a screen inviting a user to add a widget to display the latest headlines on the user's blog or website.

Database Tables

These are persistent data structures that capture the data utilized to implement the above described screens. The persistent data structures are given in MySQL table definition syntax and can be as follows.

Table 'user'

```
CREATE TABLE IF NOT EXISTS 'user' (
    'id' INT UNSIGNED NOT NULL AUTO_INCREMENT ,
    'username' VARCHAR(20) NULL ,
```

| Table 'user' |
|---|
| 'password' VARCHAR(32) BINARY NULL COMMENT 'MD5 encrypted password' ,<br>'email' VARCHAR(100) NOT NULL ,<br>'first_name' VARCHAR(25) NULL ,<br>'last_name' VARCHAR(50) NULL ,<br>...<br>'fbuid' BIGINT UNSIGNED NULL ,<br>...<br>PRIMARY KEY ('id') ,<br>INDEX 'user_username_idx' ('username' ASC) ,<br>INDEX 'user_email_idx' ('email' ASC) )<br>ENGINE = InnoDB<br>PACK_KEYS = 0<br>ROW_FORMAT = DEFAULT; |

| Table 'share_token' |
|---|
| CREATE TABLE IF NOT EXISTS 'share_token' (<br>'id' BIGINT NOT NULL AUTO_INCREMENT ,<br>'channel_id' INT UNSIGNED NOT NULL ,<br>'token' CHAR(12) NOT NULL ,<br>'sender' INT UNSIGNED NULL ,<br>'recipient' VARCHAR(100) NOT NULL ,<br>'allow_write' TINYINT(1) NOT NULL DEFAULT 0 ,<br>'shared' TIMESTAMP NOT NULL ,<br>PRIMARY KEY ('id') ,<br>CONSTRAINT 'fk_{55FE07BF-CFA3-4EDA-8C44-F815F35CB36F}'<br>  FOREIGN KEY ('channel_id' )<br>  REFERENCES 'channel' ('id' )<br>  ON DELETE CASCADE<br>  ON UPDATE NO ACTION)<br>ENGINE = InnoDB<br>PACK_KEYS = 0<br>ROW_FORMAT = DEFAULT; |

| Table 'invitation' |
|---|
| CREATE TABLE IF NOT EXISTS 'invitation' (<br>'id' INT NOT NULL AUTO_INCREMENT ,<br>'recipient' VARCHAR(100) NOT NULL ,<br>'invited' TIMESTAMP NOT NULL DEFAULT CURRENT_TIMESTAMP ,<br>'invited_by' INT UNSIGNED NULL ,<br>'token' CHAR(8) NOT NULL , -- refers to share_token table<br>'token_issued' TIMESTAMP NULL ,<br>'used' TIMESTAMP NULL ,<br>'used_by' INT UNSIGNED NULL ,<br>'campaign' VARCHAR(50) NULL ,<br>PRIMARY KEY ('id') )<br>ENGINE = InnoDB; |

| Table 'channel' |
|---|
| CREATE TABLE IF NOT EXISTS 'channel' (<br>'id' INT UNSIGNED NOT NULL AUTO_INCREMENT ,<br>'parent_id' INT UNSIGNED NULL ,<br>'label' VARCHAR(40) NOT NULL ,<br>'created' TIMESTAMP NOT NULL DEFAULT CURRENT_TIMESTAMP ,<br>'urlpart' VARCHAR(40) NOT NULL ,<br>'type' ENUM('user', 'editorial', 'test', 'demo', 'section') NOT NULL DEFAULT 'user' ,<br>'active' TINYINT(1) NOT NULL DEFAULT 1 ,<br>'public' TINYINT(1) NOT NULL DEFAULT 0 ,<br>'require_sources' TINYINT(1) NOT NULL DEFAULT 0 ,<br>'owner_id' INT UNSIGNED NULL ,<br>'owner_username' VARCHAR(20) NULL ,<br>PRIMARY KEY ('id') , |

| Table 'channel' |
|---|
| INDEX 'channel_urlpart_idx' ('urlpart' ASC) ,<br>INDEX 'fk_channel_channel' ('parent_id' ASC) ,<br>CONSTRAINT 'fk_channel_channer'<br>  FOREIGN KEY ('parent_id' )<br>  REFERENCES 'channel' ('id' )<br>  ON DELETE NO ACTION<br>  ON UPDATE NO ACTION)<br>ENGINE = InnoDB<br>PACK_KEYS = 0<br>ROW_FORMAT = DEFAULT; |

| Table 'channel_user' |
|---|
| CREATE TABLE IF NOT EXISTS 'channel_user' (<br>'channel_id' INT UNSIGNED NOT NULL ,<br>'user_id' INT UNSIGNED NOT NULL ,<br>'username' VARCHAR(20) NOT NULL ,<br>'allow_write' TINYINT(1) NOT NULL DEFAULT 0 ,<br>PRIMARY KEY ('channel_id', 'user_id') ,<br>INDEX 'fk_channel_user_channe' ('channel_id' ASC) ,<br>CONSTRAINT 'fk_channel_user_channel'<br>  FOREIGN KEY ('channel_id' )<br>  REFERENCES 'channel' ('id' )<br>  ON DELETE NO ACTION<br>  ON UPDATE NO ACTION)<br>ENGINE = InnoDB; |

| Table 'subscribed_channel' |
|---|
| CREATE TABLE IF NOT EXISTS 'subscribed_channel' (<br>'channel_id' INT UNSIGNED NOT NULL ,<br>'user_id' INT UNSIGNED NOT NULL ,<br>'user_section_id' INT UNSIGNED NOT NULL ,<br>'label' VARCHAR(40) NOT NULL ,<br>'label_edited' TINYINT(1) NOT NULL DEFAULT 0 ,<br>'urlpart' VARCHAR(40) NOT NULL ,<br>'shared' TINYINT(1) NOT NULL DEFAULT 0 ,<br>'public' TINYINT(1) NOT NULL DEFAULT 0 ,<br>'multiwriter' TINYINT(1) NOT NULL DEFAULT 0 ,<br>'allow_write' TINYINT(1) NOT NULL DEFAULT 0 ,<br>'is_owner' TINYINT(1) NOT NULL DEFAULT 0 ,<br>'email_delivery' TINYINT(1) NOT NULL DEFAULT 1 ,<br>'mobile_delivery' TINYINT(1) NOT NULL DEFAULT 1 ,<br>'order' SMALLINT NOT NULL DEFAULT -1 ,<br>'subscribed' TIMESTAMP NOT NULL DEFAULT CURRENT_TIMESTAMP ,<br>PRIMARY KEY ('channel_id', 'user_id') ,<br>INDEX 'fk_subscribed_channel_user_section' ('user_section_id' ASC) ,<br>CONSTRAINT 'fk_{4322668A-507C-4C136-B99A-B18D1C2DDC9B}'<br>  FOREIGN KEY ('channel_id' )<br>  REFERENCES 'channel' ('id' )<br>  ON DELETE NO ACTION<br>  ON UPDATE NO ACTION,<br>CONSTRAINT 'fk_{7897971E-AC94-43E0-B054-4489B27255D3}'<br>  FOREIGN KEY ('user_id' )<br>  REFERENCES 'profile' ('user_id' )<br>  ON DELETE CASCADE<br>  ON UPDATE NO ACTION,<br>CONSTRAINT 'fk_subscribed_channel_user_section'<br>  FOREIGN KEY ('user_section_id' )<br>  REFERENCES 'user_section' ('id' )<br>  ON DELETE CASCADE<br>  ON UPDATE NO ACTION)<br>ENGINE = InnoDB<br>PACK_KEYS = 0<br>ROW_FORMAT = DEFAULT; |

| Table 'gallery_posting' |
| --- |

```
CREATE TABLE 'gallery_posting' (
  'channel_id' INT UNSIGNED NOT NULL ,
  'type' ENUM('editorial', 'user') NOT NULL DEFAULT 'editorial'
  'for_frontpage' TINYINT(1) NOT NULL DEFAULT 0 ,
  'for_gallery' TINYINT(1) NOT NULL DEFAULT 0 ,
  'section_id' INT UNSIGNED NOT NULL ,
  'un_region' ENUM('Africa', 'Americas', 'Asia', 'Europe', 'Oceania') NULL ,
  'un_subregion' ENUM('Eastern Africa', 'Middle Africa', 'Northern Africa', 'Southern
Africa', 'Western Africa', 'Northern America', 'Caribbean', 'Central America', 'South
America', 'Central Asia', 'Eastern Asia', 'Southern Asia', 'South-Eastern Asia', 'Western
Asia', 'Eastern Europe', 'Northern Europe', 'Southern Europe', 'Western Europe', 'Australia
and New Zealand', 'Melanesia', 'Micronesia', 'Polynesia') NULL ,
  'country' INT(3) ZEROFILL NULL ,
  'us_region' ENUM('Northeast', 'Midwest', 'South', 'West') NULL ,
  'us_division' ENUM('New England', 'Mid-Atlantic', 'East North Central', 'West North
Central', 'South Atlantic', 'East South Central', 'West South Central', 'Mountain', 'Pacific')
NULL ,
  'us_state' CHAR(2) NULL ,
  'dma_code' INT(3) ZEROFILL NULL ,
  'featured_scope' ENUM('un_region', 'un_subregion', 'country', 'us_region', 'us_division',
'us_state', 'dma') NULL ,
  'posted' TIMESTAMP NOT NULL DEFAULT '0000-00-00 00:00:00' ,
  'updated' TIMESTAMP NOT NULL DEFAULT CURRENT_TIMESTAMP ON
UPDATE CURRENT_TIMESTAMP ,
  'featured' TIMESTAMP NOT NULL DEFAULT '0000-00-00 00:00:00' ,
  PRIMARY KEY ('channel_id') ,
  INDEX 'fk_gallery_posting_channel' ('channel_id' ASC) ,
  CONSTRAINT 'fk_gallery_posting_channel'
    FOREIGN KEY ('channel_id' )
    REFERENCES 'channel' ('id' )
    ON DELETE NO ACTION
    ON UPDATE NO ACTION)
ENGINE = InnoDB;
```

Code Sections

During the sharing of a channel, a share token is generated and stored in a database. When a user accepts the invitation, the token is looked up and the user is added to set of valid users for that channel by creating records in the channel user and subscribe channel tables. The procedures for these operative steps can be as follows.

```
def generate_auth_token(self, uid, id, recipients, allow_write=False):
    """ Generates an authorization token for the given channel.
    Arguments:
    uid -- the id of the user
    id -- the id of the channel
    allow_write -- allows users who access the channel via this token \
    to have write permissions.
    Raises:
    ChannelNotFoundError -- if the channel doesn't exist
    AuthorizationError -- if the given user can't edit the channel
    """
    token = self._channelstore.generate_auth_token(uid, id, recipients, allow_write)
    return token
@close_session
def generate_auth_token(self, uid, channelids, recipients, allow_write=False,
token=None):
    """ Generates a share token for the given channel.
    Arguments:
    uid - the id of the user performing the operation
    channelid - the id of the channel
    recipients - recipients of the auth token
    allow_write - whether the recipients have write permission on the channel
    """
    if not type(channelids) is list:
        channelids = [channelids]
    # Generate a token for the share
    # NOTE: Reducing to 8 to match length of invitation token.
    if not token:
        token = generate_token(length=8)
    for channelid in channelids:
        channel = self._get_channel(channelid)
        # ensure that it's a public channel or that the user
        # generating the token has write permission
        if channel.type != 'editorial':
            self._authorize_write(channel, uid)
```

```
        for recipient in recipients:
            sharetoken = ShareToken( )
            sharetoken.channel_id = channelid
            sharetoken.token = token
            sharetoken.recipient = recipient
            sharetoken.allow_write = allow_write
            sharetoken.sender = uid
                self._session.save(sharetoken)
        self._session.commit( )
        return token
    def get_token(self, uid, id, token):
        return self._channelstore.get_token(uid, id, token)
    @close_session
    def get_token(self, uid, channelid, token):
        token = self._session.query(ShareToken).filter_by(token=token,
                                        channel_id=channelid).first( )
        if token:
            return {'sender': token.sender,
                    'recipient': token.recipient,
                    'allow_write': token.allow_write}
        return None
```

The procedures for calls that are invoked to subscribe or unsubscribe a user to a channel can be as follows.

```
def subscribe(self, uid, id, authtoken, sectionid=False, readonly=False):
    """ Adds the specified user as an channel reader.
    Arguments:
    uid -- the id of the user
    id -- the id of the channel
    sectionid -- id of the associated section. required for user channels.
    authtoken -- the authorization token to access the channel
    readonly -- for tokens that permit write access, specifies that the
                user wishes to only read the channel.
    Raises:
    ChanneNotFoundError -- if the channel doesn't exist
    AuthorizationError -- if the user isn't authorized to the channel
    """
    self._channelstore.add_user(uid, id, authtoken, readonly)
    channel = self._channelstore.get(uid, id)
    allow_write = self._channelstore.get_allow_write(uid, channel.id)
    if not sectionid:
        sectionid = self._get_default_usersection(uid, channel)
    self._profilestore.subscribe(uid, channel, sectionid, allow_write=
    allow_write)
def unsubscribe(self, uid, id):
    """ Unsubscribes the given user from the channel.
    Arguments:
    uid -- the id of the user
    id -- the id of the channel
    Raises:
    ChannelNotFoundError -- if the channel doesn't exist
    """
    channel = self._channelstore.get(uid, id)
    self._profilestore.unsubscribe(uid, channel)
    self._channelstore.remove_user(uid, id)
```

The procedures for changing the user's write permission to control a channel can be as follows.

```
def set_allow_write(self, uid, id, userid, allow):
    """ Toggles write permission on the channel for the user specified by
    userid.
    Arguments:
    uid - the id of the user performing the operation
    id - the id of the channel
    userid - the id of the user being given write permission
    allow - toggles the write permission bit
    """
    self._channelstore.set_allow_write(uid, id, userid, allow)
    channel = self._channelstore.get(uid, id)
    self._profilestore.set_allow_write(userid, id, allow)
    self._profilestore.update_subscribed_channel(channel)
```

The procedures for making a channel public can be as follows.

```
def set_public(self, uid, id, public):
    # TODO: separation of "public" channel from being "public" in profile
    # for users following gallery channels?
    self._channelstore.set_public(uid, id, public)
    channel = self._channelstore.get(uid, id)
    self._profilestore.set_public(uid, id, public)
    self._profilestore.update_subscribed_channel(channel)
```

The procedures for looking up the users of a channel, and the users that can write to the channel can be as follows.

```
def get_users(self, uid, id):
    """"Returns a list of (userid, username, allow_write) tuples for the
    channel.
    This operation requires write permissions.
    Arguments:
    uid -- the id of the user
    id -- the id of the interset
    Raises:
    ChannelNotFoundError -- if the channel doesn't exist.
    AuthorizationError -- if the user doesn't have owner/write permission
    """
    return self._channelstore.get_users(uid, id)
def get_writers(self, uid, id, authtoken=False):
    """"Returns (used id, username) tuples for writers of the channel.
    This operation requires read permissions.
    Arguments:
    uid -- the id of the user
    id -- the id of the interset
    Raises:
    ChannelNotFoundError -- if the channel doesn't exist.
    AuthorizationError -- if the user doesn't have owner/write permission
    """
    return self._channelstore.get_writers(uid, id, authtoken=authtoken)
```

For all operations that access channels, access of the channel is performed by looking up the channel. At that point, read or write access is confirmed depending on whether the operation modifies the channel or not. The procedures for performing these operative steps can be as follows.

```
@close_session
def get (self, uid, channelid, authtoken=None):
    return self.__get(uid,channelid,authtoken)
def __get (self, uid, channelid, authtoken=None):
    channel = self.__get_cached_channel(channelid)
    self.__authorize_read(channel, uid, authtoken=authtoken)
    return channel
def __authorize_read(self, channel, uid, authtoken=None):
    if authtoken:
        sharetoken = self.__session.query(ShareToken).filter_by(token=
                        authtoken, channel_id=channel.id).first( )
        if not sharetoken:
            raise AuthorizationError(channel.id, uid)
        else:
            if authorize_read(channel, uid):
                return True
            raise AuthorizationError(channel.id, uid)
    def __authorize_write(self, channel, uid):
        if authorize_write(channel, uid):
            return True
        raise WriteAuthorizationError(channel.id, uid)
def authorize_read(channel, uid):
    # if it's not a user channel or if its posted, it's public
    if channel.type != 'user':
        return True
    if channel.public:
        return True
    # otherwise check the user table
    for uuid, allow_write in iter_users(channel):
        if uuid == uid:
            return True
    # TEMP: To allow icewarmd to use the owner_id to gain
    #       authorization to the interest, check the user channel here
    #       see testSpawnRefCount in test-channel-service.py
    if channel.type == 'user' and channel.owner_id == uid:
        return True
    return False
def authorize_write(channel, uid):
    if channel.type != 'user' and uid==0:
        return True
    if uid == channel.owner_id:
        return True
```

-continued

```
    for uuid, allow_write in iter_users(channel):
        if uuid == uid and allow_write:
            return True
    return False
def iter_users (channel):
    for user in channel.users:
        if type(user) is dict:
            yield user['user_id'], user['allow_write']
        else :
            yield user.user_id, user.allow_write
```

When an editor uses an internal editorial app to build and make a channel available in the gallery, the editor will "post" the channel which creates a gallery posting record. The gallery posting records control what is available in the channel gallery. The procedures can be as follows.

```
def gallery_post( self, name, targets, sources, section_id,
geographic_focus=None, featured_scope=None ):
    posted_id = self.__channelstore.create(0, name, targets, sources,
    type='editorial')
    posting_args = { }
    if featured_scope: posting_args['featured_scope'] = featured_scope
    if geographic_focus:
        geoargs = self.__convert_geoscope_to_posting_args-
        (geographic_focus)
        posting_args.update(geoargs)
    self.__estore.post(posted_id, secction_id)
    self.__channelstore.add_user(0, posted_id)
    return posted_id
def gallery_unpost( self, chanid ) :
    self.__estore.unpost(chanid)
    self.__channelstore.remove_user(0, chanid)
def gallery_reattach( self, chanid, section_id ) :
    self.__estore.post(chanid, section_id)
    self.__channelstore.add_user(0, chanid)
----
```

When a user invites another user to iCurrent, they can do so with a selection of one or wore channels, and the procedures can be as follows.

```
def invite(self, uid, recipients, campaign, channels=None, comments=None, cc=False,
allow_write=False):
    retval = { }
    existing_users = [ ]
    error_users = [ ]
    successful = [ ]
    user = self.__userstore.get(uid)
    cids = channels
    channelobjs = [self.__channelstore.get(uid, cid) for cid in cids]
    for recipient in recipients:
        if self.__userstore.check_email_registered(recipient):
            existing_users.append(recipient)
            continue
        try:
            token = self.__userstore.invite(uid, recipient, campaign=campaign)
            if channels:
                for cid in channels:
                    self.__channelstore.generate_auth_token(uid, cid, [recipient], allow_write,
token=token)
        except NoInviteTokenError:
            error_users.append(recipient)
            continue
        self.mailer.send_invitation(user, token, recipient, channels=channelobjs,
comments=comments, cc=cc, campaign=campaign)
        successful.append(recipient)
    # reprovision user tokens if necessary
    # user = self.__userstore.get(uid)
    # if not user.privs.unlimited_invites and user.privs.invite_tokens and
user.numinvites == 0:
    #    log.debug("Reprovisioning user:%s with 2 tokens." % user.id)
    #    self.__userstore.provision_invite_token(user.id)
```

```
    if len(recipients) == len(successful):
        retval['status'] = 'success'
    elif len(recipients) > 0:
        retval['status'] = 'partial_success'
    else:
        retval['status'] = 'failure'
    retval['successful'] = successful
    retval['existing_users'] = existing_users
    retval['errors'] = error_users
    return retval
def get_invitation(self, token):
    invitation = self._userstore.get_invitation(token)
    # also get all authorized channels
    channels = self._channelstore.list_by_token(token)
    if channels:
        invitation['channels'] = [{'id': channel[0], 'label': channel[1]} for channel in channels]
    return invitation
Spawn Code
  @close_session
  def spawn(self, uid, parentid, targets, sources, authtoken=None, type='user'):
      if type =='user' and not uid:
          raise NoneUIDError( )
      username = self._get_username(uid)
      parent = self._get_channel(parentid)
      self._authorize_read(parent, uid, authtoken=authtoken)
      if type == 'user':
          self._remove_user(uid, parentid)
          self._session.commit( )
      channel = Channel(uid, username)
      channel.type = type
      for source in sources:
          source['type'] = 'source'
      channel.add_quels(targets+sources)
      channel.owner_id = uid
      channel.owner_username = username
      self._set_unique_label_urlpart(uid, channel, type, parent.label)
      channel.parent = parent
      self._session.save(channel)
      self._session.commit( )
      if type == 'user':
          self._remove_user(uid, parentid)
          # add permissions
          channeluser = ChannelUser(uid, username, allow_write=True)
          channel.users.append(channeluser)
          self._session.save(channeluser)
          self._session.commit( )
      elif type not in ['test', 'demo', 'editorial']:
          raise ValueError, "Type must be one of user, test, editorial, or demo."
      self._cache_channel(channel.id)
      return channel.id
```

Widget users need to copy and paste into their web page or blog templates the html code given below, and the procedures can be as follows.

```
<script src="http://widgets.icurrent.com/v1/widget.js"></script>
<script>
new IC.Widget({
    title: 'Newspaper Industry',
    type: 'channel',
    cid: '2999',
    version: 1 ,
    width: 250,
    height: 300,
    appearance: {
        style: 'widget',
        container: {
            background: '#588CD1',
            text: '#FFFFFF'
        },
        headlines: {
            background: '#FFFFFF',
            link: '#05337C',
            visited: '#656595'
            byline: '#808080'
        }
    }
}).render( );
</script>
```

Channels can be supplemented by the addition of data structures supporting commenting by users. These comments are supported by actions invoked by user selectable markup on screens composed and presented to users with appropriate authority access rights. Commenting technology includes widgets by which users input text, and the text is presented in association with the channels. These commenting tools can be implemented using, commercially available commenting packages or techniques.

Figure 45:
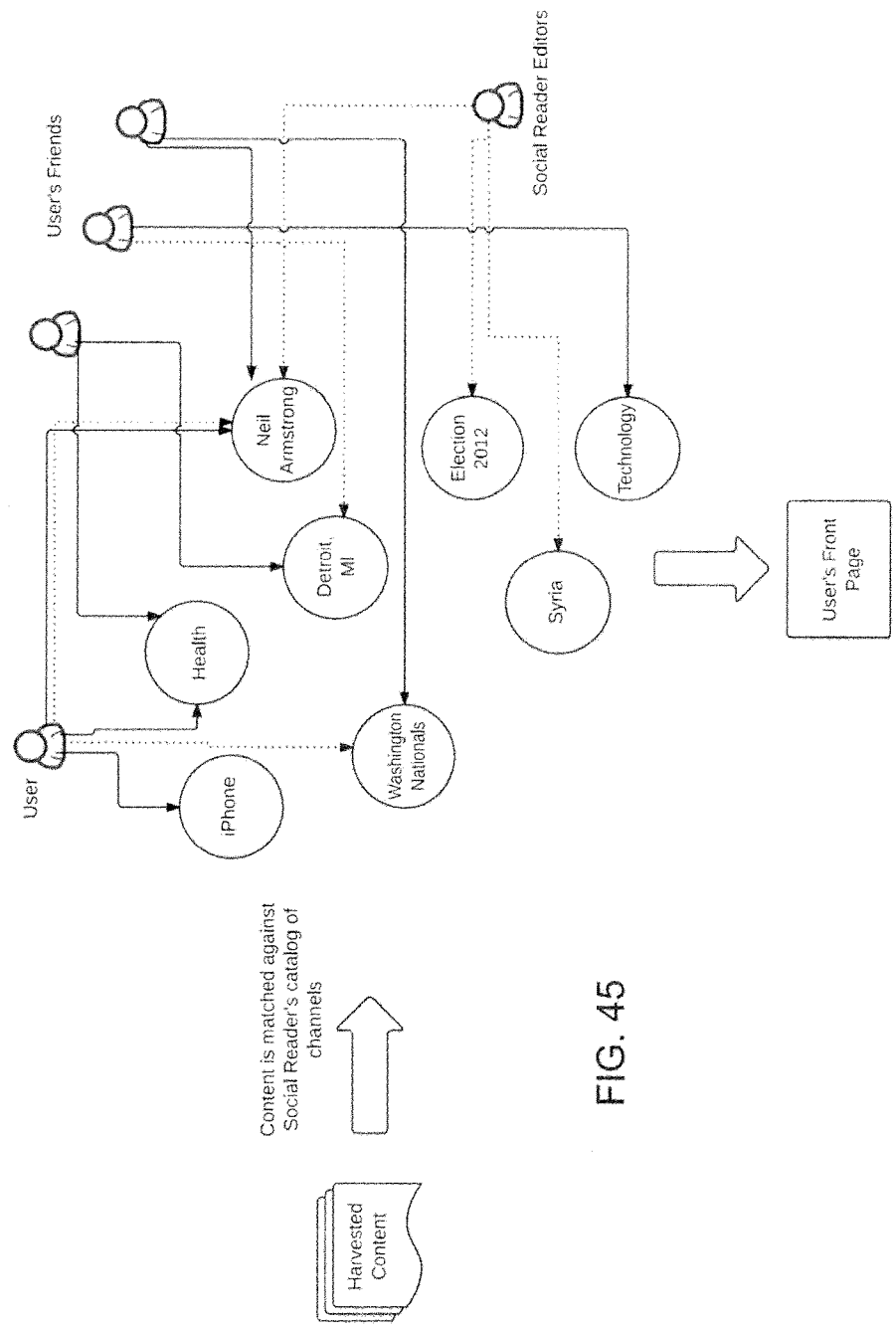
FIG. 45 is a schematic block diagram showing channel creation via user subscription, interface with social media, and editor selection.

FIG. 45 shows that harvested content is matched against channels selected or subscribed to by a user, the user's friends, and/or Social Reader editors. The user's created or subscribed channels are shown in solid lines for topics including iPhone, Health, and Neil Armstrong. The user's reading activity (as shown by a dotted line) includes the user's subscribed Neil Armstrong channel and a friend's Washington Nationals channel. The user and the user friend's channels are provided access to each others channels through social media such as, for example, Facebook, but in the case of the friend's Washington Nationals channel the user has not accepted or subscribed to that channel even though content of that channel is displayed on the user's GUI and information within the channel has been read by the user.

Also shown in FIG. 45, the user's friend that created or subscribed to the Washington Nationals channel (as shown by a solid line) has accepted the user's created or subscribed channel Neil Armstrong (as shown by a solid line). Another friend of the user (at the top of the FIG. 45) that created or subscribed to the Detroit, Mich. channel (as shown by a solid line) has accepted the user's Health channel (as shown by a solid line).

The friend of the user (at the far right portion of FIG. 45) that created or subscribed to the Washington Nationals channel (as shown by a solid line) has accepted the user's Neil Armstrong channel (as shown by a solid line). Another friend of the user who created or subscribed to the Technology channel has read information content (as shown by a dotted line) from the user's friend that create or subscribed to the Detroit, Mich. channel.

Social Reader editors (who are analogous to print media editors) recommend particular channels to all subscribers of Social Reader. In FIG. 45, the Social Reader editors have recommended Neil Armstrong, Election 2012, and Syria channels to all the users of Social Reader. Thus, the Neil Armstrong channel has been provided to the user by express subscription and by the editors, and to a friend of the user by the user (through social media) and by the editors.

Figure 46:

The interlaced channels and information content read shown for example in FIG. 45 is displayed on the user's GUI in a front page format. FIG. 46 shows a screen shot of the user's Front Page, depicted as such in hold letters in the top title block. The Front Page identifies information content accessed by the user and/or the user's friends. At the right hand side of the title block the user is identified as Spiro Roiniotis and each information content entry identifies previous readers of the information content (at the bottom) and the most recent time that the information content was accessed (under the title). A find topics window just below the Front Page title block provides a searching mechanism for channels or articles.

Figure 47:

FIG. 47 shows an Articles Page for a particular topic or channel, e.g., Brittany Spears. The first block below the channel indicator displays the most recent article available about Brittany Spears and the blocks below displays additional articles concerning Brittany Spears that can be selected by clicking on the article title, recent activities of the user's collective social media friends.

Figure 48:
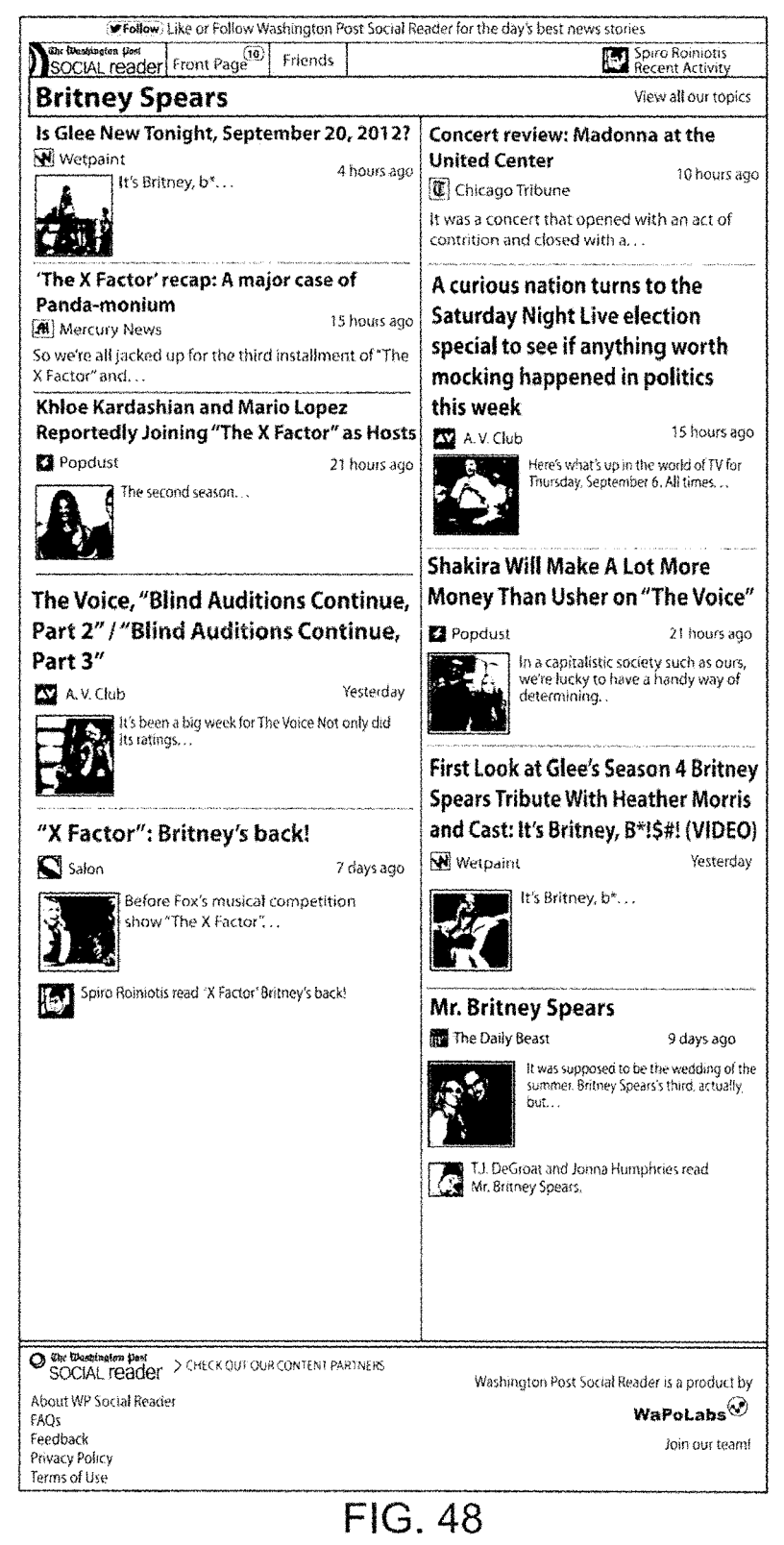

FIG. 48 shows a Brittany Spears channel page which includes recent activities related to or about Brittany Spears. A particular article can be selected to view and read by clicking on the article title.

Figure 49:
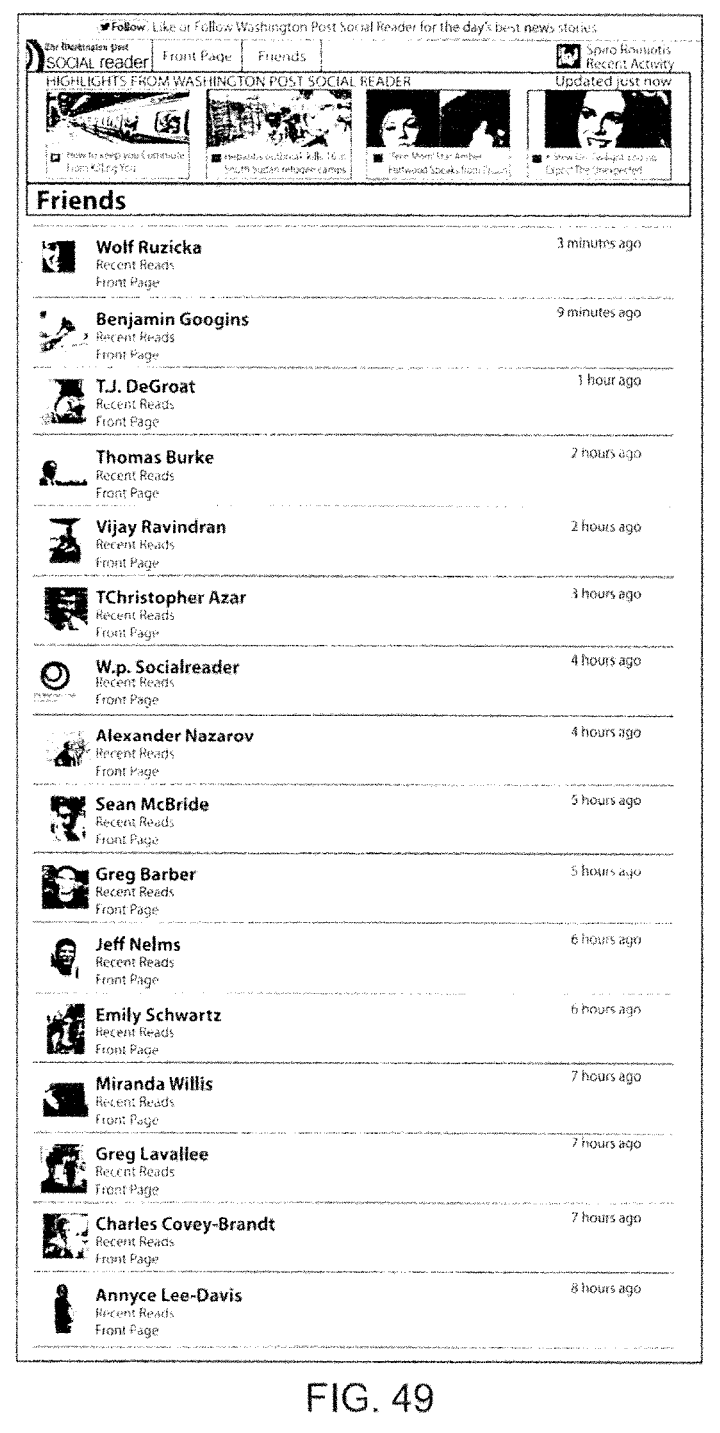
Figure 50:
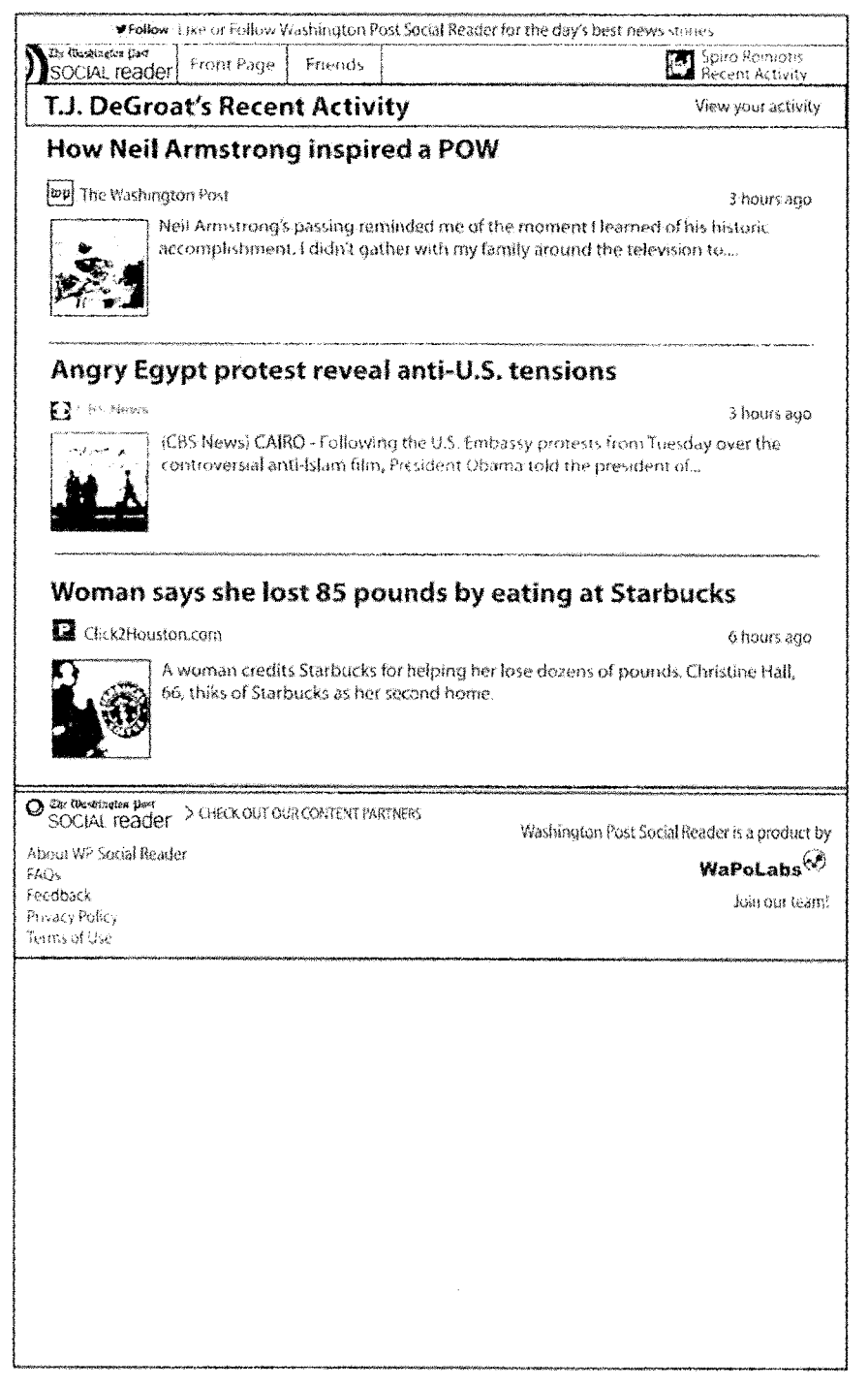

FIG. 49 shows a listing of the user's social media friends and the time of their most recent activity. FIG. 50 shows recent activity of a particular friend, T. J. DeGroat including the title of the information content and when it was last accessed.

While the present invention is disclosed by reference to the preferred exemplary embodiments and examples detailed above, it is to be understood that these examples are intended in an illustrative rather than in a limiting sense it is contemplated that modifications and combinations will readily occur to those skilled in the art, which modifications and combinations will be within the spirit of the invention and the scope of the following claims. For example, while the exemplary embodiments have been described as utilizing the social media, Facebook, the invention is not limited to this social media and can be implemented using other social media such as, for example, My Space and LinkedIn.

What is claimed:

1. A non-transitory data processing system that interfaces with a social media network service via a social media network interface, comprising:

storage to store information files and associated metadata, the metadata indicating information about the associated information files and including typed-attributes usable in processing the information files;

a database, accessed through said social media network interface, including a plurality of individually addressable personalized user records, each one of said individually addressable personalized user records including respective hierarchically organized profile data structures, the profile data structures including therewithin a plurality of hierarchically organized named interest nodes each of which constitutes a user-tunable channel, each named interest node data structure being logically connected with at least one target data structure which includes one or more target attribute values and at least one qualifier data structure which includes one or more qualifier attribute values, wherein the at least one target data structure is logically connected with at least one typed-attribute which corresponds to the at least one qualifier data structure, wherein each said one or more target attribute values represents a value to be matched in a stored information file or associated metadata, and wherein each said qualifier attribute value is configured to rank, filter, compose and/or deliver information files that are selected based on a corresponding one of said target attribute values;

logic executable to, in response to a request from a user for a page view or a change made by the user to an interest node in said plurality of individually addressable personalized user records, dynamically produce a filtered set of information files by (1) selecting one of said individually addressable personalized user records including a hierarchy of interest nodes associated with the user, and (2) processing the information files and associated metadata in the storage by matching said selected typed attributes in the metadata of the stored information files with in the hierarchy of interest nodes of the selected personalized user record, a respective target data structure from each of (a) an expressly selected interest node by the user representing a respectively corresponding user-tunable channel, (b) an interest node selected as in (a) by a user friend of the user in said social media service and shared with the user as a shared user-tunable channel, and (c) an interest node selected by a human editor of the data processing system and provided to the user, and (3) further processing the matched information files and associated metadata by filtering the matched information files based on a respective qualifier data structure from each of (a), (b) and (c), wherein (a), (b) and (c) are interest nodes in the hierarchically organized named interest nodes included in the selected individually addressable personalized user record;

logic executable to compose and send executable documents via said social media interface according to a communication protocol to a user terminal for rendition of a graphical user interface (GUI) at a user terminal, wherein the executable documents comprise data specifying a representation of the filtered set of information files including information files from (a), (b) and (c), arranged according to a relevancy determined according to at least one parameter associated with each of (a), (b) and (c) and a representation of user selectable mark-up identifying typed-attributes represented by said metadata associated with the filtered set of information files and wherein the GUI includes a front page format viewable to the user that reflects the filtered set of information files; and logic to receive messages via said social media network interface according to a communication protocol indicating selection of particular mark-up in the graphical interface at the user terminal, and executable to modify the one or more selected interest nodes representing a respectively corresponding user-tunable channel in response to said messages to add a target corresponding to the typed-attribute identified by the particular mark-up, wherein the system identifies the source of the interest nodes including at least one each of the three sources (a), (b), and (c) detailed above, and wherein the identified source of each of the interest nodes is displayed on the front page format of the GUI, wherein a particular interest node shared among a plurality of user friends of said social media service allows access for editing or updating of the interest node to any of said plurality of user friends who have accepted an invitation to share the particular interest node, and wherein the system is configured to share interest nodes with other users by activating a share command associated with an interest node to be shared.

2. The system of claim 1, wherein said targets comprise typed-attributes including entity type attributes identifying entities named in the associated information files.

3. The system of claim 1, wherein said targets comprise typed-attributes including topic type attributes identifying topics from a taxonomy addressed in the associated information files.

4. The system of claim 1, wherein said targets comprise typed-attributes including entity type attributes identifying entities named in the associated information files, and topic type attributes identifying topics from a taxonomy addressed in the associated information files.

5. The system of claim 1, wherein said targets comprise typed-attributes including entity type attributes identifying entities named in the associated information files, topic type attributes identifying topics from a taxonomy addressed in the associated information files, source type attributes identifying sources of the associated information files, and phrase type attributes identifying key words or phrases used in the associated information files.

6. The system of claim 1, including logic executable to receive information files and associated metadata from sources of information files via a data network interface, and store the received information files and associated metadata in said storage.

7. The system of claim 1, including logic executable to process information files stored in said storage to produce metadata identifying targets reflecting information about the associated information files.

8. The system of claim 1, wherein the at least one qualifier is a typed-attribute usable by logic to rank information files, and the system including said logic executable to rank information files using said at least one qualifier, and to select information files for the filtered set using said rank.

9. The system of claim 8, wherein the profile data structure includes user specified qualifiers, and said logic executable to rank information files applies said user specified qualifiers.

10. The system of claim 8, wherein the executable documents include data structures specifying user selectable mark-up enabling the user to produce messages to the data processing system to add or modify qualifiers in the profile data structure.

11. The system of claim 8, wherein the executable documents include data structures specifying user selectable mark-up for generating an indication of interest in specific information files represented on the graphical interface, and executable elements to produce a menu in response to said indication enabling the user to produce messages to the data processing system to add or modify qualifiers in the selected interest node representing a respectively corresponding user-tunable channel.

12. The system of claim 1, wherein the selected interest node representing a respectively corresponding user-tunable channel includes delivery qualifiers, said delivery qualifiers being typed-attributes usable by logic executable to process information files using said delivery qualifiers to produce said filtered set of information files, said delivery qualifiers including time and location factors in the selected interest node representing a respectively corresponding user-tunable channel.

13. The system of claim 1, wherein the interest nodes in the profile data structure includes data structures arranged to contain sets of targets, and said executable document includes data structures specifying user selectable mark-up for generating an indication that the user intends to create an interest node representing a respectively corresponding user-tunable channel, and further including logic executable to create a new interest node representing a respectively corresponding user-tunable channel in a profile data structure associated with the user in response to said indication.

14. The system of claim 1, wherein the graphical user interface includes at least one display showing the selected named interest node and the at least one typed-attribute logically connected therewith.

15. The system of claim 14, wherein the graphical user interface includes at least one display having an input region for inputting search terms to modify the filtered set of information files.

16. The system of claim 1, wherein the front page format of the GUI identifies information content accessed by the user and the one or more other users of the social media service.

17. The system of claim 1, wherein a human editor who shares a particular interest node among a plurality of users of said social media service retains control of the selected interest node and actively curates the flow of information.

18. The system of claim 1, wherein the GUI displays the user's social media friends and the time of their most recent activity.

19. The data processing system according to claim 1, wherein the logic executable to produce a filtered set of information files comprises calculating a relevancy score for respective ones of the information files based upon parameters including at least one parameter from the said social media service, and selecting the filtered set of information files based upon the calculated relevancy scores.

20. A computer implemented method for processing information files of a data processing system characterized by containing or pertaining to targets of analysis, said method comprising:
    using at least one processor with accessible input/output and at least one data store to perform the following:
    storing information files and associated metadata in computer readable storage, the metadata including targets indicating information about the associated information files and including typed-attributes usable by logic to process the information files;
    storing, via a social network interface to a social network service, a database of individually addressable personalized user records, each of said individually addressable personalized user records including a plurality of hierarchically organized profile data structures, the profile data structures including therewith in a plurality of hierarchically organized named interest nodes each of which constitutes a user-tunable channel, each named interest node data structure being logically connected with at least one target data structure which includes one or more target attribute values and at least one qualifier data structure which includes one or more qualifier attribute values, wherein the at least one target data structure is logically connected with at least one typed-attribute which corresponds to the at least one qualifier data structure, wherein each said one or more target attribute values represents a value to be matched in a stored information file or associated metadata, and wherein each said qualifier attribute value is configured to rank, filter, compose and/or deliver information files that are selected based on a corresponding one of said target attribute values;
    upon modifying an interest node in said plurality of individually addressable personalized user records or receiving a request for a page view, dynamically filtering the information files and metadata using said at least one target to produce a filtered set of information files by (1) selecting one of said individually addressable personalized user records including a hierarchy of interest nodes associated with the user, and (2) processing the information files and the metadata in the storage by matching said selected typed attributes in the metadata of the stored information files with, in the hierarchy of interest nodes of the selected personalized user record, a respective target data structure from each of (a) at least one interest node selected by the user, (b) an interest node selected as in (a) by a user friend of the user in said social media service and shared with the user as a shared interest node, and (c) at least one interest node selected by human editors of the data processing system provided to the user, representing a respectively corresponding user-tunable channel to produce a filtered set of information files, by executing a procedure on the data processing system in communication with the storage and the database, and (3) further processing the matched information files and associated metadata by filtering the matched information files based on a respective qualifier data structure from each of (a), (b) and (c), wherein (a), (b) and (c) are interest nodes in the hierarchically organized named interest nodes included in the selected individually addressable personalized user record;
    composing, using the data processing system, a first executable document for rendition of a graphical user interface (GUI), including a representation of the filtered set of information files including information files from (a), (b) and (c), arranged according to a relevancy determined according to (a), (b) and (c) with user selectable mark-up identifying typed-attributes represented in the filtered set of information files and a representation of the profile data structure wherein the GUI includes a front page format viewable to the user that reflects the filtered set of information files;
    sending said first executable document via the social network interface from the data processing system to a user terminal;
    modifying, using the data processing system, the selected interest node representing a respectively corresponding user-tunable channel in the profile data structure in response to an indication of a selected mark-up by adding the identified target;
    composing, using the data processing system, a second executable document for rendition of a graphical user interface using said modified interest node representing a respectively corresponding user-tunable channel; and
    sending said second executable document across the data network from the data processing system to the user terminal,
    wherein the system identifies the source of the interest nodes including at least one each from the three sources (a), (b), and (c) detailed above, and wherein the identified source of each of the interest nodes is displayed on the front page format of the GUI,
    wherein a particular interest node shared among a plurality of user friends of said social media service allows access for editing or updating of the interest node to any of said plurality of user friends who have accepted an invitation to share the particular interest node,
    wherein the user shares interest nodes the other users by activating a share command associated with an interest node to be shared.

21. The method of claim 20, including analyzing the information files to produce at least some of the associated metadata.

22. The method of claim 20, wherein said second executable document includes a representation of a second filtered set of information files with user selectable mark-up identifying typed-attributes represented in the second filtered set of information files, and a representation of the modified interest node.

23. The method of claim 20, wherein said first executable document includes a first pane displaying the representation of the selected interest node, a second pane displaying the representation of the filtered set of information files, and a third pane including a list of mark-up identifying typed-attributes represented in the filtered of information files.

24. The method of claim 20, wherein said first executable document includes a status bar indicating the selected interest node representing a respectively corresponding user-tunable channel, and including changing the filtered set of information files in response to said indication of the selected mark-up, and wherein said second executable document includes a representation of the changed filtered set of information files and an indication in the status bar of a target corresponding to the typed-attribute identified by the selected mark-up.

25. The method of claim 20, wherein said user selectable mark-up include a first mark-up marking a particular typed-attribute and selectable to cause execution of a program to change the filtered set of information files in response to the particular typed-attribute, and a second annotation marking said particular typed-attribute selectable to cause execution of a program to update the selected interest node representing a respectively corresponding user-tunable channel with the target corresponding to the particular typed-attribute.

26. The method of claim 20, wherein said targets comprise typed-attributes including entity type attributes identifying entities named in the associated information files.

27. The method of claim 20, wherein said targets comprise typed-attributes including topic type attributes identifying topics from a taxonomy addressed in the associated information files.

28. The method of claim 20, wherein said targets comprise typed-attributes including entity type attributes identifying entities named in the associated information files, and topic type attributes identifying topics from a taxonomy addressed in the associated information files.

29. The method of claim 20, wherein said targets comprise typed-attributes including entity type attributes identifying entities named in the associated information files, topic type attributes identifying topics from a taxonomy addressed in the associated information files, source type attributes identifying sources of the associated information files, and phrase type attributes identifying key words or phrases used in the associated information files.

30. The method of claim 20, wherein the graphical user interface includes at least one display showing the selected named interest node and the at least one typed-attribute logically connected therewith.

31. The method of claim 30, wherein the graphical user interface includes at least one display having an input region for inputting search terms to modify the filtered set of information files.

32. The method of claim 20, wherein the front page format of the GUI identifies information content accessed by the user and the at least one other user of the social media service.

33. The method of claim 20, wherein a human editor who shares a particular interest node among a plurality of users of said social media service retains control of the selected interest node and actively curates the flow of information.

34. The system of claim 20, wherein the GUI displays the user's social media friends and the time of their most recent activity.

* * * * *